(12) United States Patent
Chen et al.

(10) Patent No.: US 12,493,168 B2
(45) Date of Patent: Dec. 9, 2025

(54) IMAGE CAPTURING SYSTEM LENS ASSEMBLY, IMAGING APPARATUS AND ELECTRONIC DEVICE

(71) Applicant: LARGAN PRECISION CO., LTD., Taichung (TW)

(72) Inventors: I-Chieh Chen, Taichung (TW); Hsin-Hsuan Huang, Taichung (TW); I-Hsuan Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 399 days.

(21) Appl. No.: 18/195,420

(22) Filed: May 10, 2023

(65) Prior Publication Data
US 2024/0241348 A1    Jul. 18, 2024

(30) Foreign Application Priority Data

Jan. 13, 2023  (TW) .................................. 112101487

(51) Int. Cl.
*G02B 9/64* (2006.01)
*G02B 13/00* (2006.01)
*G02B 13/02* (2006.01)
*G02B 13/06* (2006.01)

(52) U.S. Cl.
CPC ........... *G02B 9/64* (2013.01); *G02B 13/0045* (2013.01); *G02B 13/02* (2013.01); *G02B 13/06* (2013.01)

(58) Field of Classification Search
None
See application file for complete search history.

(56) References Cited

U.S. PATENT DOCUMENTS

| | | |
|---|---|---|
| 4,426,136 A | 1/1984 | Hirose |
| 6,091,550 A | 7/2000 | Hayashi et al. |
| 6,549,344 B2 | 4/2003 | Tsutsumi |
| 7,310,188 B2 | 12/2007 | Yamamoto et al. |
| 7,626,768 B2 | 12/2009 | Kawakami |
| 9,185,279 B2 | 11/2015 | Masuda et al. |
| 9,989,739 B2 | 6/2018 | Lai et al. |
| 10,254,512 B2 | 4/2019 | Lai et al. |
| 10,473,896 B2 | 11/2019 | Chang et al. |
| 10,477,106 B2 | 11/2019 | Nomura |
| 10,598,907 B2 | 3/2020 | Chiang et al. |

(Continued)

FOREIGN PATENT DOCUMENTS

| | | |
|---|---|---|
| CN | 104880805 A | 9/2015 |
| CN | 105866931 A | 8/2016 |

(Continued)

*Primary Examiner* — Darryl J Collins
(74) *Attorney, Agent, or Firm* — Troutman Pepper Locke LLP; Tim Tingkang Xia, Esq.

(57) ABSTRACT

An image capturing system lens assembly is disclosed, comprising seven lens elements, the seven lens elements being, in order from an object side to an image side: a first lens element, a second lens element, a third lens element, a fourth lens element, a fifth lens element, a sixth lens element, and a seventh lens element. Each of the seven lens elements has an object-side surface facing the object side and an image-side surface facing the image side. An axial distance between the object-side surface of the first lens element and an image surface is TL, a focal length of the image capturing system lens assembly is f, and the following condition is satisfied: 6.00<TL/f<28.00.

28 Claims, 27 Drawing Sheets

(56) References Cited

U.S. PATENT DOCUMENTS

| | | |
|---|---|---|
| 10,606,033 B2 | 3/2020 | Lai et al. |
| 10,652,458 B2 | 5/2020 | Kang et al. |
| 11,067,777 B2 | 7/2021 | Lyu et al. |
| 11,143,847 B1 | 10/2021 | Mercado |
| 11,150,467 B2 | 10/2021 | Saito |
| 11,356,586 B2 | 6/2022 | Cutler |
| 12,360,344 B2 * | 7/2025 | Yao .................. G02B 9/64 |
| 2017/0212334 A1 * | 7/2017 | Imaoka ............... G02B 13/08 |
| 2018/0231748 A1 | 8/2018 | Chang et al. |
| 2019/0049698 A1 * | 2/2019 | Chen .............. G02B 13/0045 |
| 2019/0187442 A1 * | 6/2019 | Jia ..................... G02B 9/64 |
| 2021/0072509 A1 | 3/2021 | Chae et al. |
| 2021/0231917 A1 | 7/2021 | Suzuki |
| 2021/0373292 A1 | 12/2021 | Lin et al. |
| 2023/0176334 A1 * | 6/2023 | Lee ............... G02B 13/0045 359/708 |

FOREIGN PATENT DOCUMENTS

| | | | |
|---|---|---|---|
| CN | 107462969 | A | 12/2017 |
| CN | 107918198 | A | 4/2018 |
| CN | 110542978 | A | 12/2019 |
| CN | 210572981 | U | 5/2020 |
| CN | 111522128 | A | 8/2020 |
| CN | 112882204 | A | 6/2021 |
| CN | 114488473 | A | 5/2022 |
| CN | 216595697 | U | 5/2022 |
| CN | 114879346 | A | 8/2022 |
| CN | 115113380 | A | 9/2022 |
| CN | 115145012 | A | 10/2022 |
| JP | 59155817 | A | 9/1984 |
| JP | 0296107 | A | 4/1990 |
| JP | 3368138 | B2 | 1/2003 |
| JP | 2005345577 | A | 12/2005 |
| JP | 3867462 | B2 | 1/2007 |
| JP | 5433193 | B2 | 3/2014 |
| JP | 5682806 | B2 | 3/2015 |
| TW | 1651564 | B | 2/2019 |
| TW | 1663420 | B | 6/2019 |

* cited by examiner

US 12,493,168 B2

IMAGE CAPTURING SYSTEM LENS ASSEMBLY, IMAGING APPARATUS AND ELECTRONIC DEVICE

RELATED APPLICATIONS

This application claims priority to Taiwan Application Serial Number 112101487, filed on Jan. 13, 2023, which is incorporated by reference herein in its entirety.

BACKGROUND

Technical Field

The present disclosure relates to an image capturing system lens assembly and an imaging apparatus, and more particularly, to an image capturing system lens assembly and an imaging apparatus applicable to electronic devices.

Description of Related Art

With the advancement in semiconductor process technology, performances of image sensors have been improved, and pixels have been reduced to even smaller sizes. Therefore, imaging optical systems with high image quality have become an indispensable part of modern electronic devices. With the rapid development of science and technology, the application range of electronic devices equipped with imaging optical systems have become wider, and the requirements for optical lens assemblies have become more diverse. It is difficult for conventional imaging optical systems to achieve a balance among multiple requirements, such as image quality, sensitivity, aperture size, volume or field of view. The present disclosure provides an image capturing system lens assembly, which, with the appropriate lens arrangement, can achieve a wide viewing angle, miniaturization, large aperture and high image quality for a wider range of applications.

SUMMARY

According to one aspect of the present disclosure, an image capturing system lens assembly comprises seven lens elements. The seven lens elements in order from an object side to an image side along an optical path are a first lens element, a second lens element, a third lens element, a fourth lens element, a fifth lens element, a sixth lens element and a seventh lens element. Each of the first through seventh lens elements has an object-side surface facing the object side and an image-side surface facing the image side.

Preferably, the fifth lens element has negative refractive power. A focal length of the image capturing system lens assembly is f, a focal length of the seventh lens element is f7, an axial distance between the object-side surface of the first lens element and an image surface is TL, an axial distance between the third lens element and the fourth lens element is T34, an axial distance between the object-side surface of the first lens element and the image-side surface of the seventh lens element is TD, a curvature radius of the object-side surface of the fifth lens element is R9, and the following conditions are satisfied:

$$7.50 < TL/f < 23.00;$$
$$-2.50 < f/f7 < 0.16;$$
$$0.18 < T34/TD < 0.60; \text{ and}$$
$$-0.03 < f/R9 < 1.50.$$

According to one aspect of the present disclosure, an imaging apparatus comprises the aforementioned image capturing system lens assembly, a reflective element and an image sensor.

According to another aspect of the present disclosure, an electronic device comprises the aforementioned imaging apparatuses.

According to one aspect of the present disclosure, an image capturing system lens assembly comprises seven lens elements. The seven lens elements in order from an object side to an image side along an optical path are a first lens element, a second lens element, a third lens element, a fourth lens element, a fifth lens element, a sixth lens element and a seventh lens element. Each of the first through seventh lens elements has an object-side surface facing the object side and an image-side surface facing the image side.

Preferably, the seventh lens element has negative refractive power: preferably, the image-side surface of the fifth lens element is concave in a paraxial region thereof. An axial distance between the object-side surface of the first lens element and an image surface is TL, a focal length of the image capturing system lens assembly is f, half of a maximum field of view of the image capturing system lens assembly is HFOV, a maximum of axial distances between every two adjacent lens elements of the first through seventh lens elements is ATmax1, a composite focal length of the first lens element, the second lens element and the third lens element is f123, a composite focal length of the fourth lens element, the fifth lens element, the sixth lens element and the seventh lens element is f4567, and the following conditions are satisfied:

$$8.80 < TL/f < 23.00;$$
$$80.0 \text{ degrees} < HFOV < 140.0 \text{ degrees};$$
$$2.30 < ATmax1/f < 15.00; \text{ and}$$
$$-10.00 < f123/f4567 < 0.20.$$

According to one aspect of the present disclosure, an image capturing system lens assembly comprises seven lens elements. The seven lens elements in order from an object side to an image side along an optical path are a first lens element, a second lens element, a third lens element, a fourth lens element, a fifth lens element, a sixth lens element and a seventh lens element. Each of the first through seventh lens elements has an object-side surface facing the object side and an image-side surface facing the image side.

Preferably, the second lens element has negative refractive power, an axial distance between the third lens element and the fourth lens element is the maximum axial distance between two adjacent lens elements, a reflective element is arranged between the third lens element and the fourth lens element, a focal length of the image capturing system lens assembly is f, a focal length of the seventh lens element is f7, an axial distance between the object-side surface of the first lens element and an image surface is TL, a maximum effective radius on the object-side surface of the fourth lens element is Y4R1, a maximum effective radius on the image-side surface of the seventh lens element is Y7R2, the f-number of the image capturing system lens assembly is Fno, and the following conditions are satisfied:

$$6.00 < TL/f < 28.00;$$
$$-3.00 < f/f7 < 0.22;$$
$$1.30 < Y7R2/Y4R1 < 4.50; \text{ and}$$
$$1.00 < Fno < 2.60.$$

DETAILED DESCRIPTION

Figure 1A:
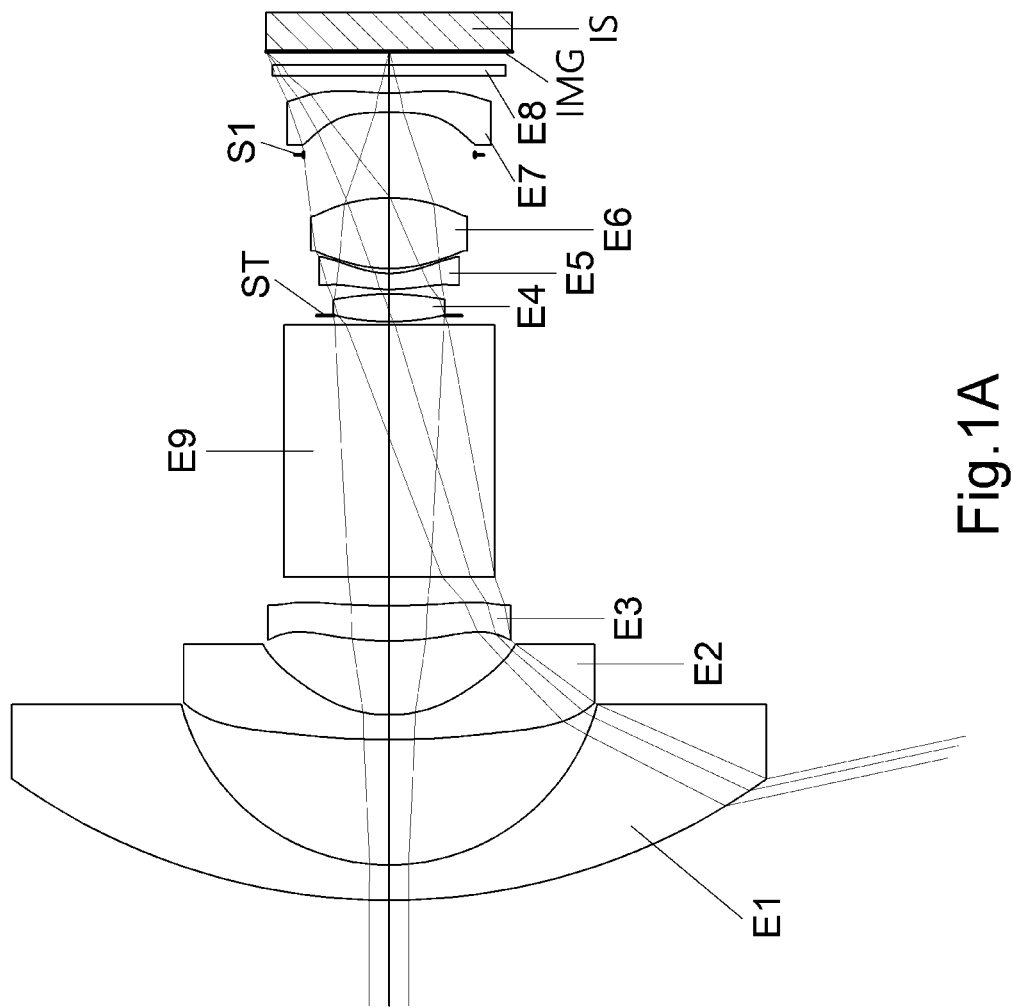
FIG. 1A is a schematic view of an imaging apparatus according to the 1st embodiment of the present disclosure.
Figure 1B:
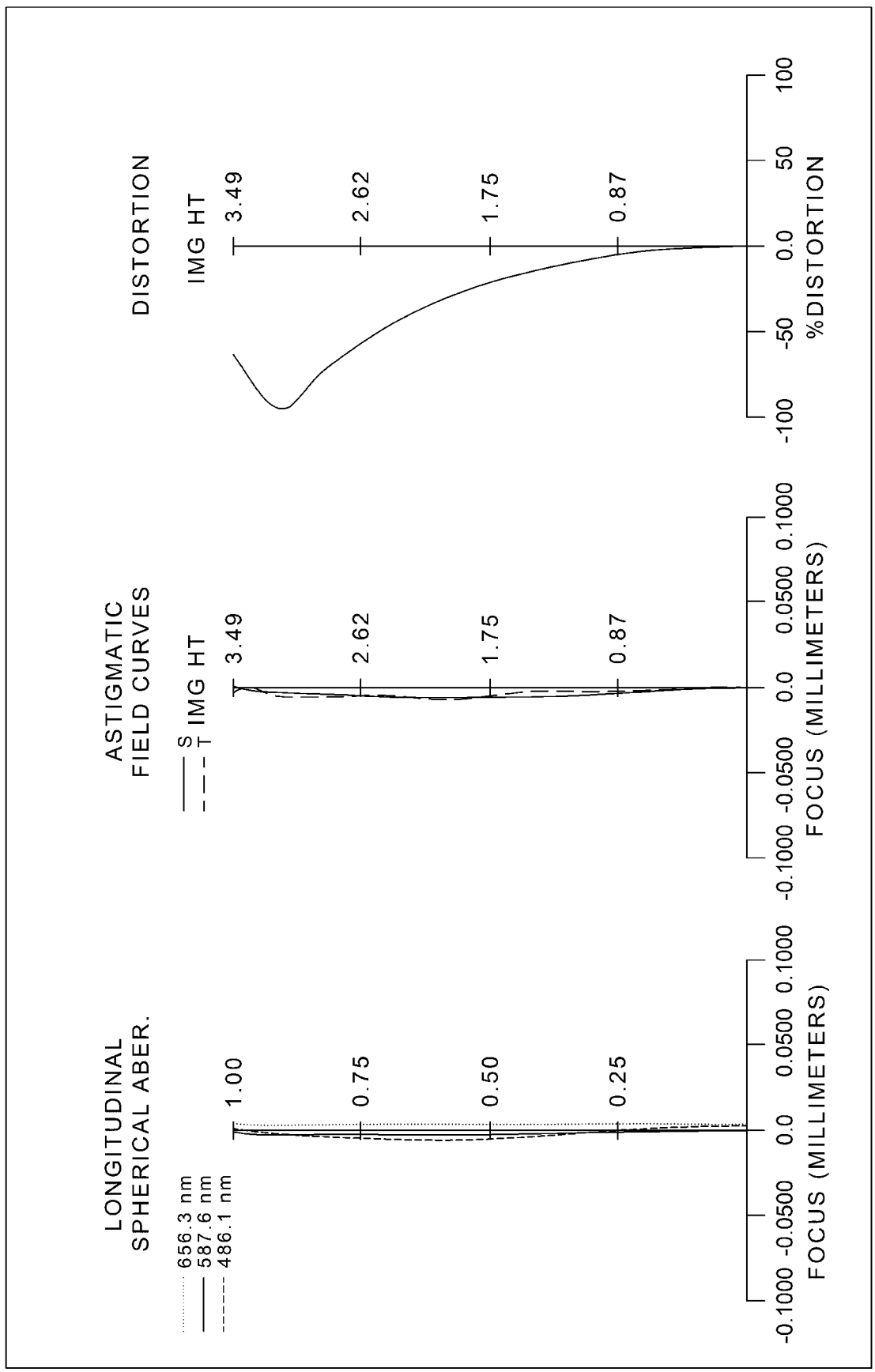
FIG. 1B shows longitudinal spherical aberration curves, astigmatic field curves and a distortion curve of the imaging apparatus according to the 1st embodiment.

The present disclosure provides an image capturing system lens assembly including seven lens elements. The seven lens elements in order from an object side to an image side along an optical path are a first lens element, a second lens element, a third lens element, a fourth lens element, a fifth lens element, a sixth lens element and a seventh lens element. Each of the first through seventh lens elements has an object-side surface facing the object side and an image-side surface facing the image side.

The second lens element has negative refractive power, so that it can complement the first lens element to favorably increase the field of view.

The image-side surface of the second lens element is concave in a paraxial region thereof, so that the surface shapes of the second lens element can be adjusted to favorably correct astigmatism aberrations.

The third lens element has positive refractive power, so that the refractive power distribution on the object side of the image capturing system lens assembly can be balanced to favorably reduce the sensitivity of the lens assembly.

The object-side surface of the fourth lens element is convex in a paraxial region thereof, so that the surface shapes of the fourth lens element can be adjusted to favorably increase the aperture.

The fifth lens element has negative refractive power, so that it can complement the fourth lens element to favorably correct aberrations such as spherical aberrations.

The object-side surface of the fifth lens element is convex in a paraxial region thereof, so that the shape of the object-side surface of the fifth lens element can be adjusted to modify the light traveling direction, and comatic aberrations along the central optical path near the field can be favorably reduced.

The image-side surface of the fifth lens element is concave in a paraxial region thereof, so that aberrations generated by the lens elements on the object side can be effectively balanced to improve image quality.

The seventh lens element has negative refractive power so that the refractive power of the seventh lens element can be adjusted, which can help balance the refractive power distribution on the image side of the image capturing system lens assembly and help correct aberrations such as spherical aberrations.

The image-side surface of the seventh lens element is aspheric and is convex in an off-axis region thereof, so that the seventh lens element can be designed with more flexibility and focal points in paraxial and off-axis regions can be effectively balanced to correct field curvatures.

The seventh lens element is made of plastic material and both the object-side surface and the image-side surface thereof are aspheric, so that manufacturing costs can be effectively reduced and flexibility in design can be enhanced, which can help improve image quality and mass production capacity.

Every two adjacent lens elements of the first through seventh lens elements have an air gap between them, so that an easier assembling process can be ensured to increase the assembly yield.

A focal length of the image capturing system lens assembly is f, and an axial distance between the object-side surface of the first lens element and an image surface is TL. When the following condition is satisfied: $6.00<TL/f<28.00$, a balance between the total track length and field of view can be achieved, and the system can be equipped with a wide-angle feature. Moreover, the following condition can be satisfied: $7.50<TL/f<23.00$. Moreover, the following condition can be satisfied: $8.80<TL/f<23.00$. Moreover, the following condition can be satisfied: $8.80<TL/f<22.00$.

A focal length of the image capturing system lens assembly is f, and a focal length of the seventh lens element is f7. When the following condition is satisfied: $-3.00<f/f7<0.22$, the refractive power of the seventh lens element can be adjusted to balance the refractive power distribution on the image side of the image capturing system lens assembly, so that aberrations such as spherical aberrations can be corrected. Moreover, the following condition can be satisfied: $-2.50<f/f7<0.16$. Moreover, the following condition can be satisfied: $-1.50<f/f7<0.10$. Moreover, the following condition can be satisfied: $-0.90<f/f7<0.00$. Moreover, the following condition can be satisfied: $-0.50<f/f7<-0.03$.

An axial distance between the third lens element and the fourth lens element is T34, and an axial distance between the object-side surface of the first lens element and the image-side surface of the seventh lens element is TD. When the following condition is satisfied: $0.18<T34/TD<0.60$, the proportion of the axial distance between the third lens element and the fourth lens element in the system can be adjusted, so that enough space can be obtained to provide more flexibility for space arrangement. Moreover, the following condition can be satisfied: $0.20<T34/TD<0.50$. Moreover, the following condition can be satisfied: $0.27<T34/TD<0.45$.

A focal length of the image capturing system lens assembly is f, and a curvature radius of the object-side surface of the fifth lens element is R9. When the following condition is satisfied: $-0.03<f/R9<1.50$, the shape of the object-side surface of the fifth lens element can be adjusted to modify the light traveling direction, so that comatic aberrations along the central optical path near the field can be favorably reduced. Moreover, the following condition can be satisfied: $0.05<f/R9<1.00$. Moreover, the following condition can be satisfied: $0.10<f/R9<0.60$.

The f-number of the image capturing system lens assembly is Fno. When the following condition is satisfied: $1.00<Fno<2.60$, the size of the aperture can be adjusted, so that the amount of light entering the system can be increased to expand the range of applications. Moreover, the following condition can be satisfied: $1.00<Fno<2.20$. Moreover, the following condition can be satisfied: $1.30<Fno<2.20$. Moreover, the following condition can be satisfied: $1.50<Fno<2.00$.

Half of a maximum field of view of the image capturing system lens assembly is HFOV. When the following condition is satisfied: $55.0$ degrees$<HFOV<140.0$ degrees, the image capturing range can be increased and more spatial information of the surrounding environment can be received, thereby enabling applications in various fields. Moreover, the following condition can be satisfied: $65.0$ degrees$<HFOV<140.0$ degrees. Moreover, the following condition can be satisfied: $65.0$ degrees$<HFOV<130.0$ degrees. Moreover, the following condition can be satisfied: $80.0$ degrees$<HFOV<140.0$ degrees. Moreover, the following condition can be satisfied: $80.0$ degrees$<HFOV<125.0$ degrees. Moreover, the following condition can be satisfied: $90.0$ degrees$<HFOV<120.0$ degrees.

A maximum of axial distances between every two adjacent lens elements of the first through seventh lens elements is ATmax1, and a second maximum of axial distances between every two adjacent lens elements of the first through seventh lens elements is ATmax2. When the following condition is satisfied: $1.25<ATmax1/ATmax2$, the maximum axial distance between two adjacent lens elements can be adjusted to provide enough space for containing a reflective element, so that directional changes of the optical path can be favorably achieved to reduce the thickness of the system.

A maximum effective radius on the object-side surface of the first lens element is Y1R1, and a maximum effective radius on the image-side surface of the fifth lens element is Y5R2. When the following condition is satisfied: $2.80<Y1R1/Y5R2<20.00$, the effective diameter ratio between the object side and middle section of the system can be adjusted, so that the field of view can be enlarged to adapt to ultra-wide angle applications. Moreover, the following condition can be satisfied: $4.00<Y1R1/Y5R2<15.00$.

An Abbe number of the sixth lens element is V6, and an Abbe number of the seventh lens element is V7. When the following condition is satisfied: $1.25<V6/V7<4.00$, the materials of the sixth lens element and the seventh lens element can be adjusted to achieve a balance between chromatic aberrations and astigmatism. Moreover, the following condition can be satisfied: $1.60<V6/V7<3.00$.

An axial distance between the fifth lens element and the sixth lens element is T56, and an axial distance between the sixth lens element and the seventh lens element is T67. When the following condition is satisfied: $1.30<T67/T56<30.00$, positions and distribution of the lens elements on the image side of the system can be adjusted, so that a balance between the size of the system and image quality can be favorably achieved. Moreover, the following condition can be satisfied: $1.40<T67/T56<25.00$. Moreover, the following condition can be satisfied: $2.00<T67/T56<10.00$.

A maximum image height of the image capturing system lens assembly is ImgH. When the following condition is satisfied: $2.70$ [mm]$<ImgH<7.00$ [mm], the image surface of the system can have an appropriate size to meet product application needs. Moreover, the following condition can be satisfied: $3.00$ [mm]$<ImgH<5.50$ [mm].

A displacement in parallel with the optical axis from an axial vertex on the object-side surface of the seventh lens element to a boundary of the optically effective area of the object-side surface of the seventh lens element is SAG71, and a central thickness of the seventh lens element along the optical path is CT7. When the following condition is satisfied: $-6.00<SAG71/CT7<0.01$, the ratio of the object-side surface in an off-axis region of the seventh lens element to the central thickness of the seventh lens element can be adjusted, so that the peripheral shape of the lens element can be favorably controlled to correct off-axis aberrations. Moreover, the following condition can be satisfied: $-4.00<SAG71/CT7<-0.50$.

A maximum of axial distances between every two adjacent lens elements of the first through seventh lens elements is ATmax1, and a focal length of the image capturing system lens assembly is f. When the following condition is satisfied: $2.30<ATmax1/f<15.00$, the ratio of the maximum axial distance between two adjacent lens elements to the focal length can be adjusted, so that enough space can be provided between the lens elements to achieve more diverse arrangements. Moreover, the following condition can be satisfied: $2.70<ATmax1/f<9.00$. Moreover, the following condition can be satisfied: $2.90<ATmax1/f<6.00$.

A composite focal length of the first lens element, the second lens element and the third lens element is f123, and a composite focal length of the fourth lens element, the fifth lens element, the sixth lens element and the seventh lens element is f4567. When the following condition is satisfied: $-10.00<f123/f4567<0.20$, lens elements at the front end and rear end of the system can cooperate with each other to correct aberrations. Moreover, the following condition can be satisfied: $-8.50<f123/f4567<0.00$. Moreover, the following condition can be satisfied: $-7.00<f123/f4567<-0.30$. Moreover, the following condition can be satisfied: $-6.00<f123/f4567<-1.10$.

An axial distance between the third lens element and the fourth lens element is T34, and a central thickness of the third lens element along the optical path is CT3. When the following condition is satisfied: $0.30<T34/CT3<20.00$, the ratio of the axial distance between two adjacent lens elements to the central thickness of a lens element in the middle section of the system can be adjusted, so that the lens element can have a proper thickness to maintain the manufacturing yield. Moreover, the following condition can be satisfied: $0.90<T34/CT3<15.00$. Moreover, the following condition can be satisfied: $1.50<T34/CT3<11.00$.

A curvature radius of the object-side surface of the fifth lens element is R9, and a curvature radius of the image-side surface of the fifth lens element is R10. When the following condition is satisfied: $0.90<(R9+R10)/(R9-R10)<5.00$, the curvature radii of the object-side surface and the image-side surface of the fifth lens element can be adjusted to favorably correct aberrations, such as astigmatism, in the peripheral region. Moreover, the following condition can be satisfied: $1.50<(R9+R10)/(R9-R10)<3.20$ A focal length of the fourth lens element is f4, and an axial distance between the sixth lens element and the seventh lens element is T67. When the following condition is satisfied: $0.20<f4/T67<20.00$, the ratio of the focal length to the axial distance between two adjacent lens elements on the image side of the system can be adjusted, so that a balance between reducing manufacturing tolerances and minimizing the temperature effect. Moreover, the following condition can be satisfied: $0.80<f4/T67<14.00$. Moreover, the following condition can be satisfied: $1.20<f4/T67<9.00$.

The first lens element is made of glass material, and a refractive index of the first lens element is N1. When the following condition is satisfied: $1.680<N1<2.500$, the material properties of the first lens element can be adjusted, so that it has a scratch-resistant feature to prevent abrasion from affecting imaging. Moreover, the following condition can be satisfied: $1.730<N1<2.200$.

A maximum effective radius on the object-side surface of the fourth lens element is Y4R1, and a maximum effective radius on the image-side surface of the seventh lens element is Y7R2. When the following condition is satisfied: $1.30<Y7R2/Y4R1<4.50$, the effective diameter ratios of the lens elements at the rear section of the system can be adjusted, so that the image surface can be favorably enlarged. Moreover, the following condition can be satisfied: $1.50<Y7R2/Y4R1<2.80$.

A curvature radius of the image-side surface of the second lens element is R4, a curvature radius of the image-side surface of the fifth lens element is R10, and an axial distance between the sixth lens element and the seventh lens element is T67. When the following condition is satisfied: $1.00<(R4+R10)/T67<18.00$, the surface shapes of the second lens element and the fifth lens element and the proportion of the axial distance between the sixth lens element and the seventh lens element can be adjusted, so that the structural strength of the system can be enhanced to improve the system stability. Moreover, the following condition can be satisfied: $1.50<(R4+R10)/T67<7.00$.

An Abbe number of the second lens element is V2, and an Abbe number of the seventh lens element is V7. When the following condition is satisfied: $1.10<V2/V7<3.50$, the arrangement regarding the materials of the image capturing system lens assembly can be adjusted to correct chromatic aberrations.

A maximum effective radius on the object-side surface of the first lens element is Y1R1, a maximum effective radius on the image-side surface of the first lens element is Y1R2, and a central thickness of the first lens element along the optical path is CT1. When the following condition is satisfied: $2.50<(Y1R1-Y1R2)/CT1<15.00$, the respective ratio of the object-side surface and image-side surface to the central thickness of the first lens element can be adjusted, so that the shape of the first lens element can be controlled to adapt to ultra-wide angle applications. Moreover, the following condition can be satisfied: $3.30<(Y1R1-Y1R2)/CT1<10.00$.

The image capturing system lens assembly according to the present disclosure comprises a reflective element disposed between the first lens element and the seventh lens element to provide the system with different optical paths, so that more flexibility for the space arrangement of the lens assembly can be obtained to help reduce mechanical limitations.

The image capturing system lens assembly according to the present disclosure comprises an aperture stop disposed between the reflective element and the image surface. The position of the aperture stop in the image capturing system lens assembly can be adjusted, so that a balance between increasing relative illumination in the peripheral region and increasing the field of view can be achieved.

The aperture stop can have a long axis and a short axis in different directions perpendicular to the optical axis, and the effective radius of the long axis is larger than the effective radius of the short axis, so that the shape of the stop can be adjusted to help reduce stray light.

An axial distance between the third lens element and the fourth lens element of the image capturing system lens assembly is T34. When T34 is a maximum among all axial distances between two adjacent lens elements and a reflective element is disposed between the third lens element and the fourth lens element, the position of the reflective element in the lens assembly can be adjusted to satisfy product application needs.

The present disclosure provides an imaging apparatus comprising the aforementioned image capturing system lens assembly and an image sensor disposed on or near the image surface.

The present disclosure provides an imaging apparatus comprising the aforementioned image capturing system lens assembly, a reflective element and an image sensor, wherein an axial distance between the object-side surface of the first lens element and an image surface is TL, and an axial distance between the object-side surface of the first lens element and the reflective element is TLR. When the following condition is satisfied: TLR/TL<0.75, the axial length of the system after the optical axis is folded can be adjusted to help reduce the thickness of the device, so that a wider range of applications can be realized. Moreover, the following condition can be satisfied: TLR/TL<0.65.

The present disclosure further provides an electronic device comprising three or more imaging apparatuses, wherein the three or more imaging apparatuses include the aforementioned imaging apparatus and face the same direction, so that telephoto and wide-angle features can be provided.

The present disclosure further provides an electronic device comprising two imaging apparatuses arranged opposite to each other, wherein a distance from the center of the object-side surface of the first lens element of one imaging apparatus to the center of the object-side surface of the first lens element of the other imaging apparatus is Da. When the following condition is satisfied: Da<40 [mm], the thickness of the electronic device can be controlled to satisfy product application needs. Moreover, the following condition can be satisfied: Da<33 [mm]. Moreover, the following condition can be satisfied: Da<25 [mm].

Figure 9:
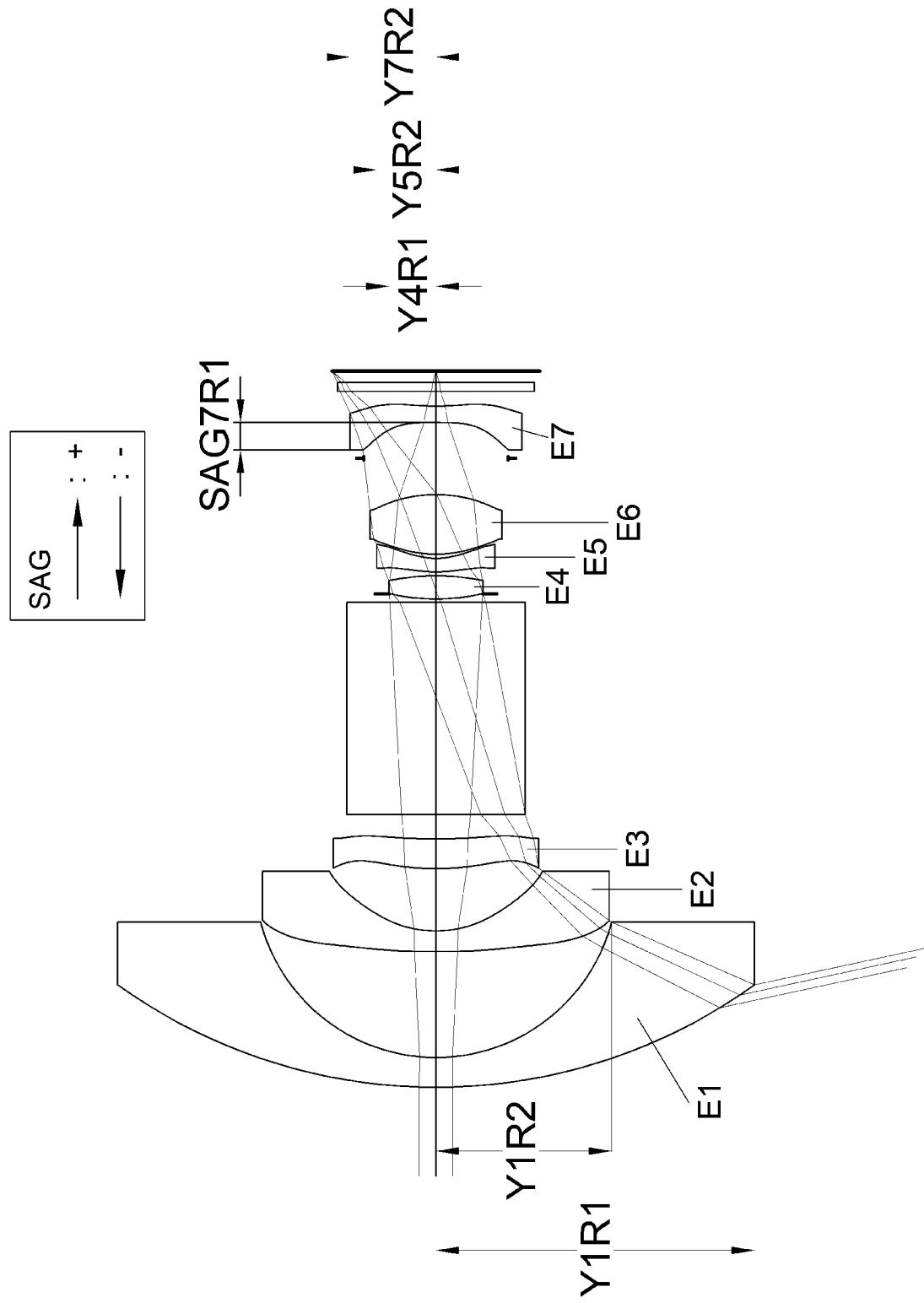
FIG. 9 is a schematic view illustrating the parameters SAG7R1, Y1R1, Y1R2, Y4R1, Y5R2 and Y7R2 of the image capturing system lens assembly, with the 1st embodiment of the present disclosure as an example.

FIG. 9 is a schematic view illustrating the parameters SAG7R1, Y1R1, Y1R2, Y4R1, Y5R2 and Y7R2 of the image capturing system lens assembly, with the 1st embodiment of the present disclosure as an example. A displacement in parallel with the optical axis from an axial vertex on the object-side surface of the seventh lens element to a boundary of the optically effective area of the object-side surface of the seventh lens element is SAG7R1, wherein a displacement toward the image side has a positive value and a displacement toward the object side has a negative value: a maximum effective radius on the object-side surface of the first lens element is Y1R1: a maximum effective radius on the image-side surface of the first lens element is Y1R2; a maximum effective radius on the object-side surface of the fourth lens element is Y4R1: a maximum effective radius on the image-side surface of the fifth lens element is Y5R2; and a maximum effective radius on the image-side surface of the seventh lens element is Y7R2.

The image capturing system lens assembly according to the present disclosure may comprise at least one reflective element, such as a prism or a mirror, to provide more flexibility for its space arrangement. The reflective element may be disposed between an imaged object and an image surface to favorably minimize the size of the system. The optical path can be reflected at least once by the reflective element, and (the normal line of) the reflective surface and the optical axis can form an angle of various degrees depending on space arrangement needs. The angle between the optical axis vector near the object side and the optical axis vector near the image side can be of any angle, not limited to 0, 90 or 180 degrees. Moreover, in order to effectively reduce space, the length and width of the mirror can be unequal, and the length, width and height of the prism can be unequal to each other, so as to reduce weight and volume of the lens assembly and fit the arrangement of other components in the electronic device. The surface shape of the reflective element can be flat, aspheric or freeform depending on requirements such as optical design requirements, but is not limited thereto. The reflective element can composed of one or more prism depending on design requirements. The material of the prism, such as glass or plastic material, can be selected according to design requirements. A lens barrel or lens element of the image capturing system lens assembly can be cut to reduce the length in a single axial direction, so that the size of the lens assembly can be favorably reduced to further miniaturize the lens assembly. Further, a prism capable of altering the optical path does not constitute a lens element of the image capturing system lens assembly. The image capturing system lens assembly according to the present disclosure may further comprise a light blocking element, which can have a non-circular opening. The opening can have different sizes of effective diameter in different axial directions perpendicular to the optical axis to help reduce stray light, and the inner hole can have a serrated or undulating structure among others.

Figure 10A:
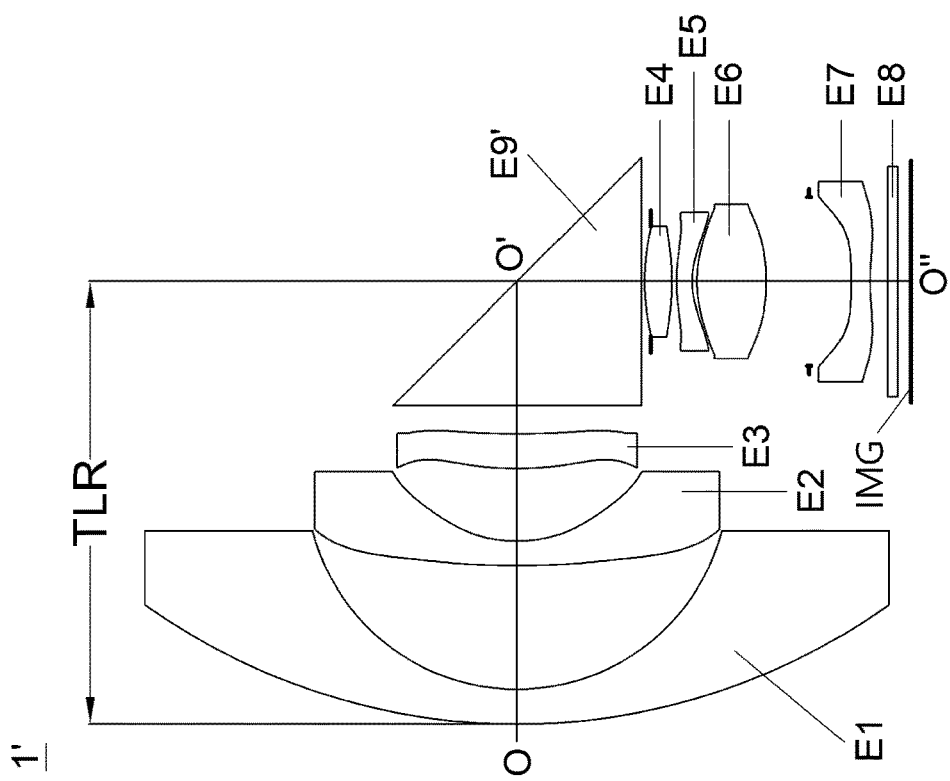
FIG. 10A is a schematic view illustrating the parameter TL of the image capturing system lens assembly, with the 1st embodiment of the present disclosure as an example.
Figure 10B:
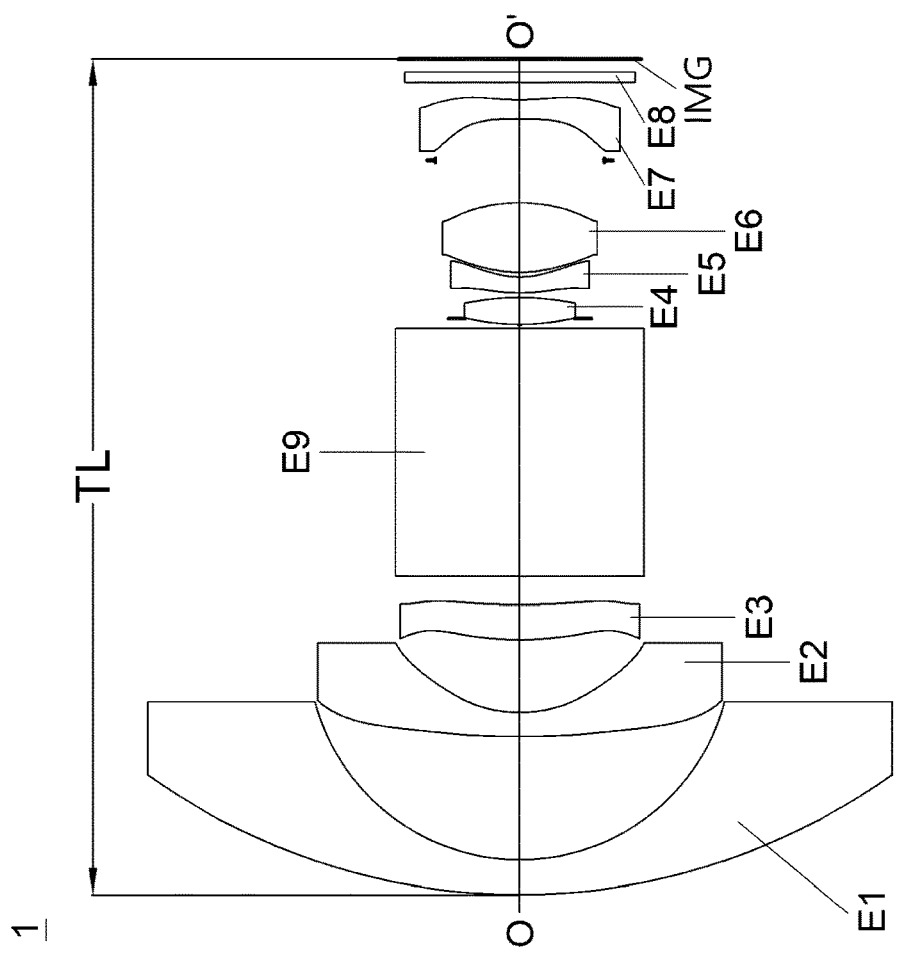
FIG. 10B is a schematic view illustrating the parameter TLR of the image capturing system lens assembly having a folded optical axis, with a variation of the 1st embodiment of the present disclosure as an example.

FIG. 10A is a schematic view illustrating the parameter TL of the image capturing system lens assembly, with the 1st embodiment of the present disclosure as an example. A reflective element E9, such as a prism, capable of folding the optical axis, is disposed in the lens assembly. The schematic view simplifies the folding of the optical axis and presents an equivalent optical system, in which an axial distance between the object-side surface of the first lens element and an image surface is TL. FIG. 10B is a schematic view illustrating the parameter TLR of the image capturing system lens assembly having a folded optical axis, with a variation of the 1st embodiment of the present disclosure as an example. A reflective element E9', which is a prism of a certain shape and capable of folding the optical axis, is disposed in the lens assembly. The angle between the optical axis vector near the object side and the optical axis vector near the image side is 90 degrees, and an axial distance between the object-side surface of the first lens element and the reflective element E9' is TLR.

Figure 11A:
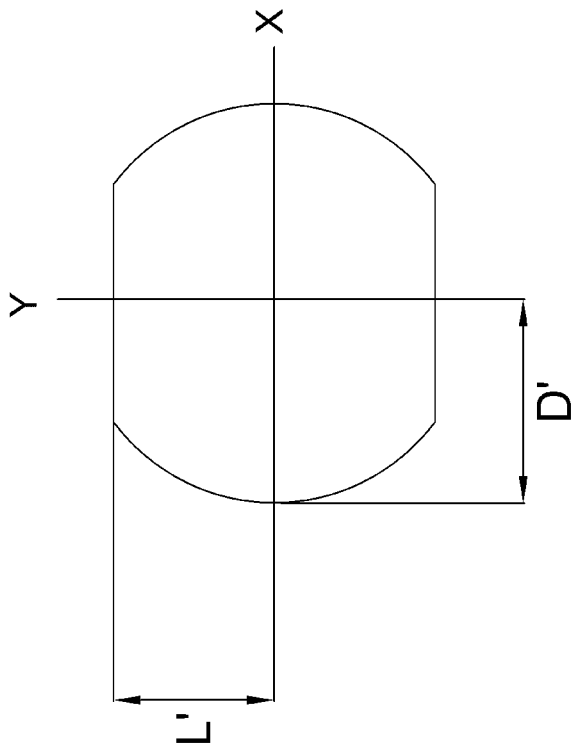
FIG. 11A is a schematic view illustrating a non-circular aperture according to the present disclosure.

FIG. 11A is a schematic view illustrating a non-circular aperture stop according to the present disclosure. The effective radius of the aperture stop on the long axis is D, the effective radius of the aperture stop on the short axis is L, and D is larger than L.

Figure 11B:
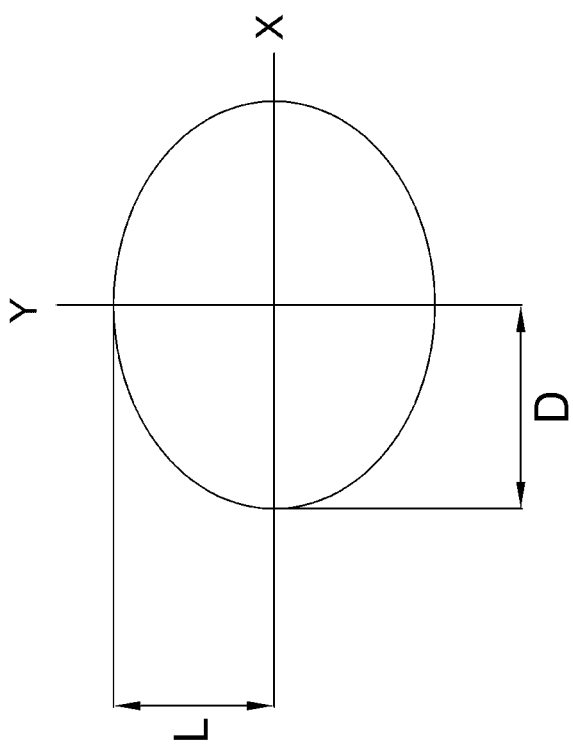
FIG. 11B is a schematic view illustrating another non-circular aperture according to the present disclosure.

FIG. 11B is a schematic view illustrating another non-circular aperture stop according to the present disclosure. The effective radius of the aperture stop on the long axis is D', the effective radius of the aperture on the short axis is L', and D' is larger than L'.

The aforementioned features of the image capturing system lens assembly can be utilized in numerous combinations so as to achieve corresponding effects.

According to the image capturing system lens assembly of the present disclosure, the object side and the image side refer to the direction along the optical axis.

According to the image capturing system lens assembly of the present disclosure, the optical elements thereof can be made of glass or plastic material. When the optical elements are made of glass material, the distribution of the refractive power of the image capturing system lens assembly may be more flexible to design and the effect of external environmental temperature on imaging can be reduced. Technologies such as grinding or molding can be used for producing glass optical elements. When the optical elements are made of plastic material, manufacturing costs can be effectively reduced. Furthermore, surfaces of each optical element can be arranged to be spherical or aspheric (ASP). Arranging the spherical surfaces can reduce difficulties in manufacturing while arranging the aspheric surfaces can result in more control variables for eliminating aberrations and to further decrease the required quantity of optical elements; also, the total track length of the image capturing system lens assembly can be effectively reduced. Processes such as plastic injection molding or molded glass lens can be used for making the aspheric surfaces.

According to the image capturing system lens assembly of the present disclosure, if a surface of an optical element is aspheric, it means that the surface has an aspheric shape throughout its optically effective area, or a portion(s) thereof.

According to the image capturing system lens assembly of the present disclosure, additives may be selectively added to the material of any one (or more) optical element to produce light absorption or light interference effects, so as to change the transmittance of said optical element in a particular wavelength range of light, and to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the optical elements. Thus, additives can prevent unwanted disrupting light in particular wavelength ranges affecting the final image. In addition, additives may be evenly mixed in the plastic material for manufacturing optical elements with an injection molding process. In addition, additives may also be added to a coating on the surface of a lens element to provide the aforementioned effects.

According to the image capturing system lens assembly of the present disclosure, the image capturing system lens assembly can include at least one stop, such as an aperture stop, a glare stop or a field stop, so as to favorably reduce the amount of stray light and thereby improve the image quality.

According to the image capturing system lens assembly of the present disclosure, an aperture stop can be configured as a front stop or a middle stop. The front stop disposed between an imaged object and the first optical element can provide a longer distance between an exit pupil of the image capturing system lens assembly and the image surface, so that the generated telecentric effect can improve the image-sensing efficiency of an image sensor, such as a CCD or CMOS sensor. The middle stop disposed between the first optical element and the image surface is favorable for enlarging the field of view of the image capturing system lens assembly, thereby providing the image capturing system lens assembly with the advantage of a wide-angle lens.

An aperture control unit may be disposed in the image capturing system lens assembly of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the image capturing system lens assembly.

According to the image capturing system lens assembly of the present disclosure, when the optical element has a convex surface and the region of convex shape is not specified, it indicates that the surface can be convex in the paraxial region thereof. When the optical element has a concave surface and the region of concave shape is not specified, it indicates that the surface can be concave in the paraxial region thereof. Likewise, when the region of refractive power or focal length of an optical element is not specified, it indicates that the region of refractive power or focal length of the optical element can be in the paraxial region thereof.

According to the image capturing system lens assembly of the present disclosure, at least one reflective element capable of altering the optical path, such as a prism or a reflective mirror, can be optionally provided on the optical path between the imaged object and the image surface, wherein the surface shape of the reflective element or reflective mirror can be flat, spherical, aspheric or freeform. Then, the image capturing system lens assembly can be provided with more flexibility for its space arrangement, so that minimization of electronic devices is not limited by the total track length of the image capturing system lens assembly.

According to the image capturing system lens assembly of the present disclosure, the image surface of the image capturing system lens assembly, based on the corresponding image sensor, can be a plane or a curved surface with an arbitrary curvature, especially a curved surface being concave facing the object side. Meanwhile, the image capturing system lens assembly of the present disclosure may optionally include one or more image correction components (such as a field flattener) between the image surface and the optical element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and arranged near the image surface.

One or more optical elements can be provided in the image capturing system lens assembly of the present disclosure to limit the forms of light passing through the system. The aforesaid optical element may be (but is not limited to) a filter or a polarizer, and may be provided in the form of a single piece, a composite component or a thin film, but is not limited thereto. The aforesaid optical element can be disposed on the object side or image side of the image capturing system lens assembly or alternatively between the lens elements of the assembly to control specific forms of light to pass through, so as to meet different application needs.

The image capturing system lens assembly of the present disclosure can comprise at least one of an optical lens element, an optical element or a carrier, which includes a low reflection layer disposed on at least one surface thereof. The low reflection layer can effectively reduce the stray light generated by light reflection at the interface. The low reflection layer can be disposed on the non-effective area of the object-side surface or the image-side surface of the aforesaid optical lens element, or on a connecting surface between the object-side surface and the image-side surface. The aforesaid optical element can be a light blocking element, an annular spacer element, a barrel element, a cover glass, a blue glass, a filter/color filter, an optical path folding element, a prism, or a mirror. The aforesaid carrier can be a lens assembly carrier, a micro lens disposed on the image sensor, or a glass sheet surrounding the substrate of the image sensor or used for protecting the image sensor.

According to the above description of the present disclosure, the following specific embodiments are provided for further explanation, longitudinal spherical aberration curves, astigmatic field curves and a distortion curve of the imaging apparatus 1 according to the 1st embodiment.

In FIG. 1A, the imaging apparatus 1 includes an image capturing system lens assembly of the present disclosure and an image sensor IS. The image capturing system lens assembly includes, in order from an object side to an image side along an optical path, a first lens element E1, a second lens element E2, a third lens element E3, a reflective element E9, an aperture stop ST, a fourth lens element E4, a fifth lens element E5, a sixth lens element E6, a seventh lens element E7, a stop S1, a filter E8, and an image surface IMG.

The first lens element E1 has negative refractive power and is made of glass material. The first lens element E1 has an object-side surface being convex in a paraxial region thereof, and an image-side surface being concave in a paraxial region thereof. Both the object-side surface and the image-side surface are spherical.

The second lens element E2 has negative refractive power and is made of plastic material. The second lens element E2 has an object-side surface being convex in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof, and an image-side surface being concave in a paraxial region thereof. Both the object-side surface and the image-side surface are aspheric.

The fourth lens element E4 has positive refractive power and is made of glass material. The fourth lens element E4 has an object-side surface being convex in a paraxial region thereof, and an image-side surface being convex in a paraxial region thereof. Both the object-side surface and the image-side surface are aspheric.

The fifth lens element E5 has negative refractive power and is made of plastic material. The fifth lens element E5 has an object-side surface being convex in a paraxial region thereof, and an image-side surface being concave in a paraxial region thereof. Both the object-side surface and the image-side surface are aspheric.

The sixth lens element E6 has positive refractive power and is made of plastic material. The sixth lens element E6 has an object-side surface being convex in a paraxial region thereof, and an image-side surface being convex in a paraxial region thereof. Both the object-side surface and the image-side surface are aspheric.

The seventh lens element E7 has negative refractive power and is made of plastic material. The seventh lens element E7 has an object-side surface being concave in a paraxial region thereof, and an image-side surface being concave in a paraxial region thereof and convex in an off-axis region thereof. Both the object-side surface and the image-side surface are aspheric.

The filter E8 is disposed between the seventh lens element E7 and the image surface IMG. The filter E8 is made of glass material and does not affect the focal length of the image capturing system lens assembly. The reflective element E9, which is a prism, is disposed between the third lens element E3 and the aperture stop ST. The image sensor IS is disposed on or near the image surface IMG.

The detailed optical data of the 1st embodiment are shown in TABLE 1A, wherein the units of the curvature radius, the thickness and the focal length are expressed in mm, f is a focal length of the image capturing system lens assembly, Fno is an f-number of the image capturing system lens assembly, HFOV is half of the maximum field of view, and surfaces #0 to #21 refer to the surfaces in order from the object side to the image side. The aspheric surface data are shown in TABLE 1B, wherein k is the conic coefficient in the equation of the aspheric surface profiles, and A4-A24 refer to the 4th to 24th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1A and TABLE 1B for the 1st embodiment. Explanations in this regard will not be provided again.

TABLE 1A (1st Embodiment)
f = 2.08 mm, Fno = 1.84, HFOV = 102.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 18.3703 | (SPH) | 1.000 | Glass | 1.804 | 46.6 | −11.81 |
| 2 | | 6.1089 | (SPH) | 3.570 | | | | |
| 3 | Lens 2 | 43.1572 | (ASP) | 0.700 | Plastic | 1.544 | 56.0 | −8.17 |
| 4 | | 4.0082 | (ASP) | 2.096 | | | | |
| 5 | Lens 3 | 8.7640 | (ASP) | 1.002 | Plastic | 1.669 | 19.5 | 21.58 |
| 6 | | 21.2766 | (ASP) | 0.818 | | | | |
| 7 | Prism | Plano | | 7.158 | Glass | 1.847 | 23.8 | — |
| 8 | | Plano | | 0.270 | | | | |
| 9 | Ape. Stop | Plano | | −0.170 | | | | |
| 10 | Lens 4 | 7.0835 | (ASP) | 0.783 | Glass | 1.589 | 61.2 | 5.92 |
| 11 | | −6.5959 | (ASP) | 0.131 | | | | |
| 12 | Lens 5 | 4.5308 | (ASP) | 0.454 | Plastic | 1.660 | 20.4 | −7.26 |
| 13 | | 2.2352 | (ASP) | 0.139 | | | | |
| 14 | Lens 6 | 3.6155 | (ASP) | 2.007 | Plastic | 1.544 | 56.0 | 4.20 |
| 15 | | −4.9979 | (ASP) | 1.228 | | | | |
| 16 | Stop | Plano | | 1.200 | | | | |
| 17 | Lens 7 | −36.4854 | (ASP) | 0.550 | Plastic | 1.639 | 23.5 | −8.54 |

TABLE 1A-continued (1st embodiment)
f = 2.08 mm, Fno = 1.84, HFOV = 102.2 deg.

| Surface # | | Curvature Radius | | Thickness | Material | Index | Abbe # | Focal Length |
|---|---|---|---|---|---|---|---|---|
| 18 | | 6.4482 | (ASP) | 0.500 | | | | |
| 19 | Filter | Plano | | 0.300 | Glass | 1.517 | 64.2 | — |
| 20 | | Plano | | 0.379 | | | | |
| 21 | Image Surface | Plano | | — | | | | |

Remark: Reference wavelength is d-line 587.6 nm.
* The effective radius of the stop on Surface 16 is 2.430 mm.

TABLE 1B

Aspheric Coefficient

| Surface # | 3 | 4 | 5 | 6 |
|---|---|---|---|---|
| K= | 2.80676E+01 | −7.32757E−02 | −8.67237E+00 | −9.90000E+01 |
| A4= | 4.801501E−03 | 5.710064E−03 | 1.129496E−03 | 1.357507E−03 |
| A6= | −8.643145E−04 | −8.141392E−04 | 3.673942E−04 | 5.895701E−04 |
| A8= | 7.236825E−05 | −9.471533E−06 | −2.309655E−04 | −4.107635E−04 |
| A10= | −3.398618E−06 | −1.489648E−06 | 2.056224E−05 | 8.127508E−05 |
| A12= | 9.434503E−08 | 1.236751E−06 | −1.816893E−07 | −9.610297E−06 |
| A14= | −1.450213E−09 | −1.158320E−07 | −7.476004E−08 | 7.450553E−07 |
| A16= | 9.592690E−12 | 3.463015E−09 | 4.721764E−09 | −3.450231E−08 |
| A18= | | | −9.027795E−11 | 7.245289E−10 |

| Surface # | 10 | 11 | 12 | 13 |
|---|---|---|---|---|
| K= | −3.58173E+00 | 5.96796E+00 | −6.14472E+00 | −9.80446E−02 |
| A4= | 3.797329E−03 | 1.345633E−02 | −2.512962E−02 | −6.681892E−02 |
| A6= | −6.632255E−04 | −4.206753E−03 | 1.113111E−02 | 3.003628E−02 |
| A8= | 2.105273E−04 | 1.262918E−03 | −7.142667E−03 | −1.601651E−02 |
| A10= | −1.411045E−05 | −1.569049E−04 | 2.779388E−03 | 5.289213E−03 |
| A12= | 3.991252E−06 | 9.986004E−06 | −6.782113E−04 | −1.182371E−03 |
| A14= | | | 9.787941E−05 | 1.717607E−04 |
| A16= | | | −7.417862E−06 | −1.474455E−05 |
| A18= | | | | 4.915700E−07 |

| Surface # | 14 | 15 | 17 | 18 |
|---|---|---|---|---|
| K= | −3.12125E−01 | 3.90400E−01 | −9.24857E+01 | 1.61278E+00 |
| A4= | −1.876437E−02 | −3.484088E−03 | −3.846538E−02 | −2.593592E−02 |
| A6= | 9.912977E−03 | 4.700183E−04 | −9.965871E−04 | −4.736738E−03 |
| A8= | −3.086398E−03 | −4.945859E−04 | 1.793441E−03 | 6.609188E−03 |
| A10= | −8.550109E−05 | 3.486000E−04 | 6.181124E−04 | −3.356837E−03 |
| A12= | 2.366262E−04 | −1.356698E−04 | −1.060542E−03 | 1.073998E−03 |
| A14= | −4.385332E−05 | 3.186612E−05 | 5.183554E−04 | −2.367149E−04 |
| A16= | 2.463487E−06 | −4.101753E−06 | −1.373650E−04 | 3.670165E−05 |
| A18= | 1.352659E−08 | 2.493170E−07 | 2.171585E−05 | −3.945244E−06 |
| A20= | | | −2.019606E−06 | 2.801466E−07 |
| A22= | | | 9.978214E−08 | −1.181128E−08 |
| A24= | | | −1.933794E−09 | 2.237213E−10 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:
X is the relative distance between a point on the aspheric surface spaced at a distance Y from the optical axis and the tangential plane at the aspheric surface vertex on the optical axis;
Y is the vertical distance from the point on the aspheric surface profile to the optical axis;
R is the curvature radius;
k is the conic coefficient; and
Ai is the i-th aspheric coefficient.

In the 1st embodiment, the maximum image height of the image capturing system lens assembly is ImgH, and the following condition is satisfied: ImgH=3.49 mm.

In the 1st embodiment, the axial distance between the object-side surface of the first lens element E1 and the image surface IMG is TL, the focal length of the image capturing system lens assembly is f, and the following condition is satisfied: TL/f=11.59.

In the 1st embodiment, the axial distance between the object-side surface of the first lens element E1 and the image surface IMG is TL, the axial distance between the object-side surface of the first lens element E1 and the reflective element E9 is TLR, and the following condition is satisfied: TLR/TL=0.53.

In the 1st embodiment, the axial distance between the third lens element E3 and the fourth lens element E4 is T34, the central thickness of the third lens element E3 along the optical path is CT3, and the following condition is satisfied: T34/CT3=8.06.

In the 1st embodiment, the axial distance between the third lens element E3 and the fourth lens element E4 is T34, the axial distance between the object-side surface of the first lens element E1 and the image-side surface of the seventh lens element E7 is TD, and the following condition is satisfied: T34/TD=0.35.

In the 1st embodiment, the axial distance between the fifth lens element E5 and the sixth lens element E6 is T56, the axial distance between the sixth lens element E6 and the seventh lens element E7 is T67, and the following condition is satisfied: T67/T56=17.47.

In the 1st embodiment, the focal length of the image capturing system lens assembly is f, the focal length of the seventh lens element E7 is f7, and the following condition is satisfied: f/f7=−0.24.

In the 1st embodiment, the focal length of the image capturing system lens assembly is f, the curvature radius of the object-side surface of the fifth lens element E5 is R9, and the following condition is satisfied: f/R9=0.46.

In the 1st embodiment, the composite focal length of the first lens element E1, the second lens element E2 and the third lens element E3 is f123, the composite focal length of the fourth lens element E4, the fifth lens element E5, the sixth lens element E6 and the seventh lens element E7 is f4567, and the following condition is satisfied: f123/f4567=−1.53.

In the 1st embodiment, the focal length of the fourth lens element E4 is f4, the axial distance between the sixth lens element E6 and the seventh lens element E7 is T67, and the following condition is satisfied: f4/T67=2.44.

In the 1st embodiment, the maximum of axial distances between every two adjacent lens elements of the first lens element E1 through the seventh lens element E7 is ATmax1, the focal length of the image capturing system lens assembly is f, and the following condition is satisfied: ATmax1/f=3.88.

In the 1st embodiment, the maximum of axial distances between every two adjacent lens elements of the first lens element E1 through the seventh lens element E7 is ATmax1, the second maximum of axial distances between every two adjacent lens elements is ATmax2, and the following condition is satisfied: ATmax1/ATmax2=2.26.

In the 1st embodiment, the curvature radius of the image-side surface of the second lens element E2 is R4, the curvature radius of the image-side surface of the fifth lens element E5 is R10, the axial distance between the sixth lens element E6 and the seventh lens element E7 is T67, and the following condition is satisfied: (R4+R10)/T67=2.57.

In the 1st embodiment, the curvature radius of the object-side surface of the fifth lens element E5 is R9, the curvature radius of the image-side surface of the fifth lens element E5 is R10, and the following condition is satisfied: (R9+R10)/(R9−R10)=2.95.

In the 1st embodiment, the displacement in parallel with the optical axis from an axial vertex on the object-side surface of the seventh lens element E7 to a boundary of the optically effective area of the object-side surface of the seventh lens element E7 is SAG71, the central thickness of the seventh lens element E7 along the optical path is CT7, and the following condition is satisfied: SAG7R1/CT7=−1.69.

In the 1st embodiment, the maximum effective radius on the object-side surface of the first lens element E1 is Y1R1, the maximum effective radius on the image-side surface of the fifth lens element E5 is Y5R2, and the following condition is satisfied: Y1R1/Y5R2=5.38.

In the 1st embodiment, the maximum effective radius on the object-side surface of the fourth lens element E4 is Y4R1, the maximum effective radius on the image-side surface of the seventh lens element E7 is Y7R2, and the following condition is satisfied: Y7R2/Y4R1=1.83.

In the 1st embodiment, the maximum effective radius on the object-side surface of the first lens element E1 is Y1R1, the maximum effective radius on the image-side surface of the first lens element E1 is Y1R2, the central thickness of the first lens element E1 along the optical path is CT1, and the following condition is satisfied: (Y1R1−Y1R2)/CT1=4.81.

In the 1st embodiment, the refractive index of the first lens element E1 is NI, and the following condition is satisfied: N1=1.804.

In the 1st embodiment, the Abbe number of the second lens element E2 is V2, the Abbe number of the seventh lens element E7 is V7, and the following condition is satisfied: V2/V7=2.38.

In the 1st embodiment, the Abbe number of the sixth lens element E6 is V6, the Abbe number of the seventh lens element E7 is V7, and the following condition is satisfied: V6/V7=2.38.

2nd Embodiment

Figure 2A:
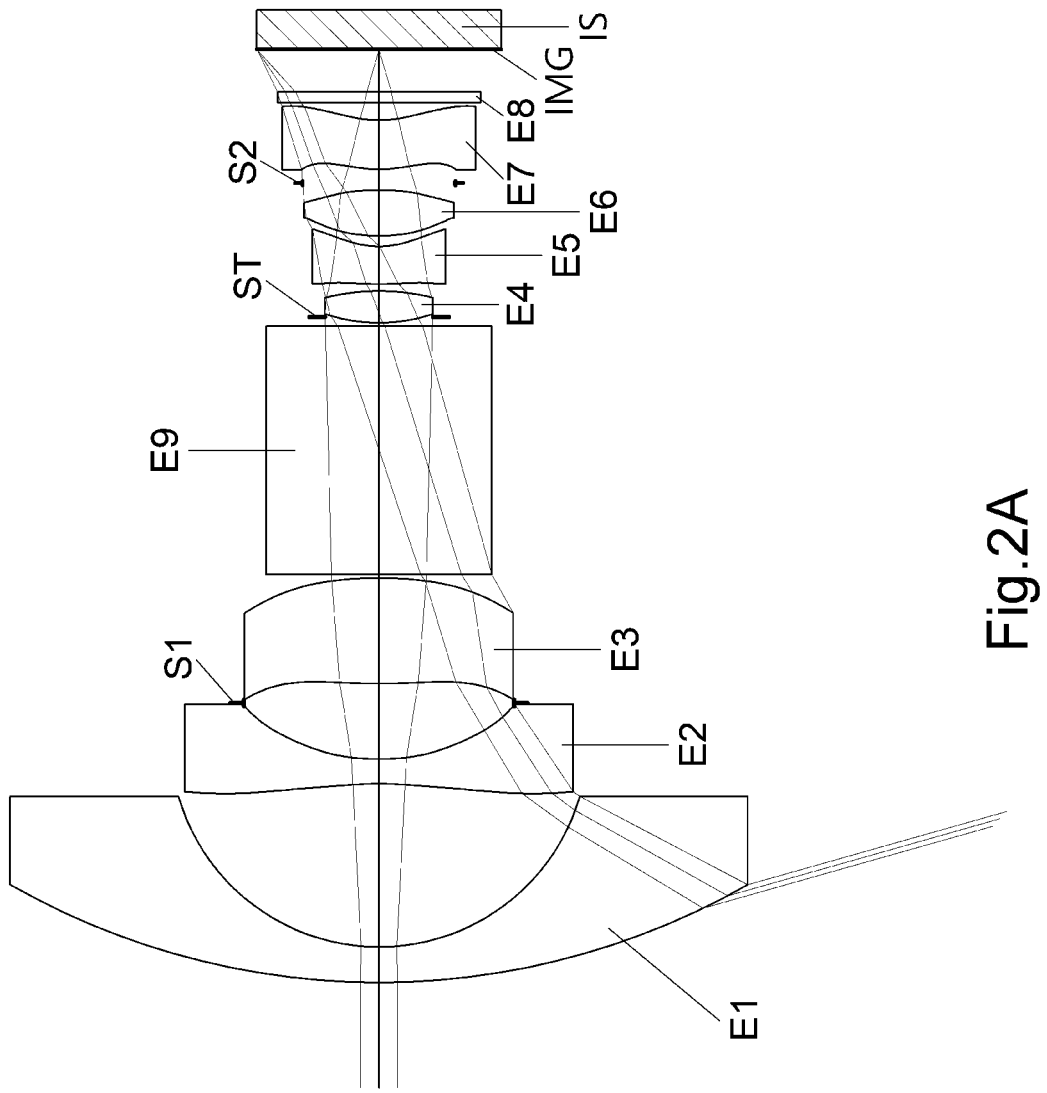
FIG. 2A is a schematic view of an imaging apparatus according to the 2nd embodiment of the present disclosure.
Figure 2B:
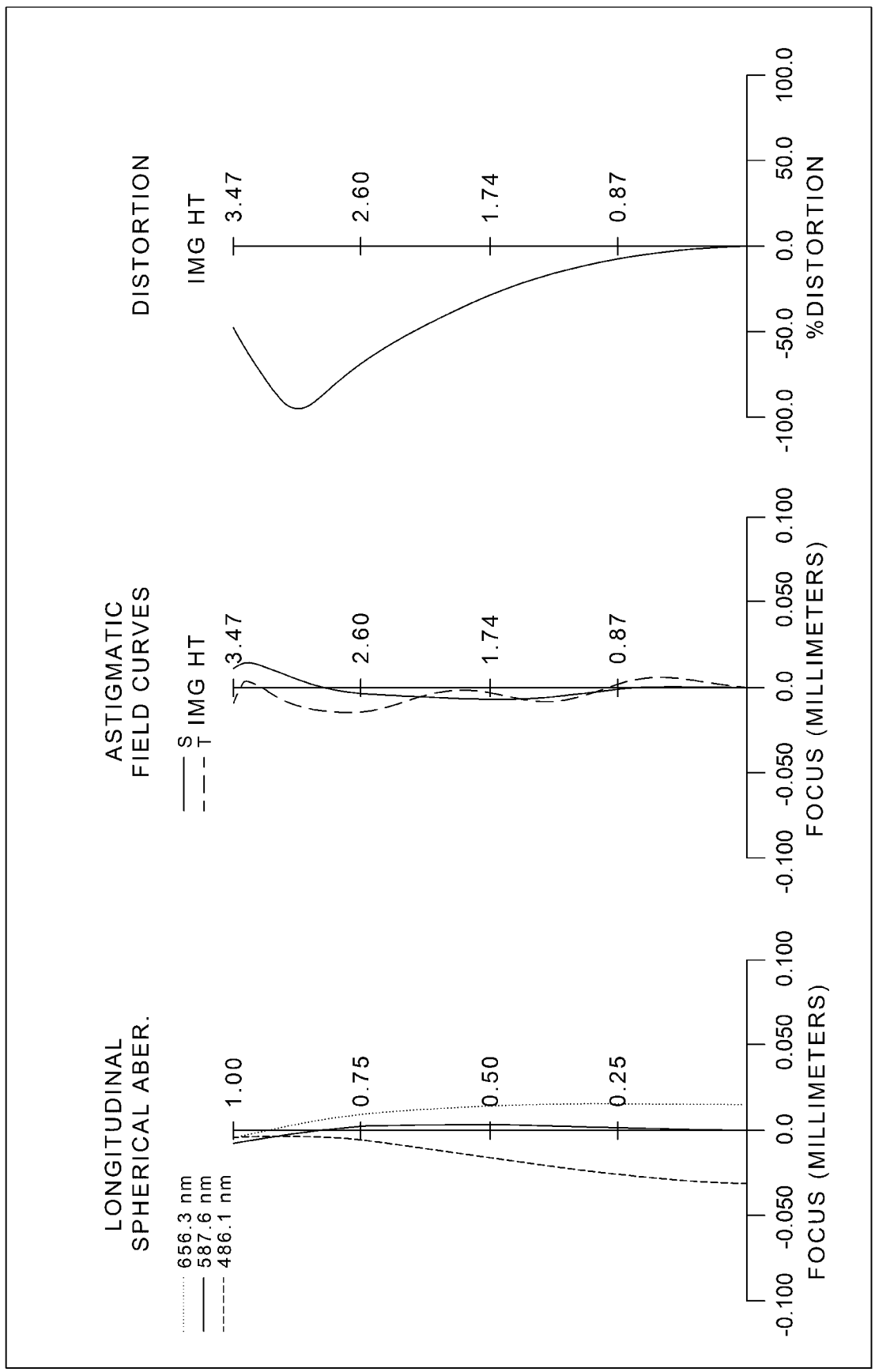
FIG. 2B shows longitudinal spherical aberration curves, astigmatic field curves and a distortion curve of the imaging apparatus according to the 2nd embodiment.

FIG. 2A is a schematic view of an imaging apparatus 2 according to the 2nd embodiment of the present disclosure. FIG. 2B shows, in order from left to right, longitudinal spherical aberration curves, astigmatic field curves and a distortion curve of the imaging apparatus 2 according to the 2nd embodiment.

In FIG. 2A, the imaging apparatus 2 includes an image capturing system lens assembly of the present disclosure and an image sensor IS. The image capturing system lens assembly includes, in order from an object side to an image side along an optical path, a first lens element E1, a second lens element E2, a stop S1, a third lens element E3, a reflective element E9, an aperture stop ST, a fourth lens element E4, a fifth lens element E5, a sixth lens element E6, a stop S2, a seventh lens element E7, a filter E8, and an image surface IMG.

The first lens element E1 has negative refractive power and is made of glass material. The first lens element E1 has an object-side surface being convex in a paraxial region thereof, and an image-side surface being concave in a paraxial region thereof. Both the object-side surface and the image-side surface are spherical.

The second lens element E2 has negative refractive power and is made of plastic material. The second lens element E2 has an object-side surface being concave in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being convex in a paraxial region thereof. Both the object-side surface and the image-side surface are aspheric.

The fifth lens element E5 has negative refractive power and is made of plastic material. The fifth lens element E5 has an object-side surface being convex in a paraxial region thereof, and an image-side surface being concave in a paraxial region thereof. Both the object-side surface and the image-side surface are aspheric.

The sixth lens element E6 has positive refractive power and is made of plastic material. The sixth lens element E6 has an object-side surface being convex in a paraxial region thereof, and an image-side surface being convex in a paraxial region thereof. Both the object-side surface and the image-side surface are aspheric.

The seventh lens element E7 has positive refractive power and is made of plastic material. The seventh lens element E7 has an object-side surface being convex in a paraxial region thereof, and an image-side surface being concave in a paraxial region thereof and convex in an off-axis region thereof. Both the object-side surface and the image-side surface are aspheric.

The filter E8 is disposed between the seventh lens element E7 and the image surface IMG. The filter E8 is made of glass material and does not affect the focal length of the image capturing system lens assembly. The reflective element E9, which is a prism, is disposed between the third lens element E3 and the aperture stop ST. The image sensor IS is disposed on or near the image surface IMG.

The detailed optical data of the 2nd embodiment are shown in TABLE 2A, and the aspheric surface data are shown in TABLE 2B.

TABLE 2A (2nd Embodiment)
f = 1.87 mm, Fno = 1.79, HFOV = 105.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 21.1257 (SPH) | 1.000 | Glass | 1.804 | 46.6 | −10.58 |
| 2 | | 5.9355 (SPH) | 4.646 | | | | |
| 3 | Lens 2 | −9.7465 (ASP) | 0.700 | Plastic | 1.544 | 56.0 | −7.34 |
| 4 | | 6.9299 (ASP) | 1.600 | | | | |
| 5 | Stop | Plano | 0.548 | | | | |
| 6 | Lens 3 | 18.5625 (ASP) | 3.000 | Plastic | 1.639 | 23.5 | 11.77 |
| 7 | | −11.8296 (ASP) | 0.100 | | | | |
| 8 | Prism | Plano | 7.050 | Glass | 1.804 | 46.6 | — |
| 9 | | Plano | 0.263 | | | | |
| 10 | Ape. Stop | Plano | −0.163 | | | | |
| 11 | Lens 4 | 4.6127 (ASP) | 0.901 | Plastic | 1.544 | 56.0 | 5.23 |
| 12 | | −6.9144 (ASP) | 0.200 | | | | |
| 13 | Lens 5 | 8.1180 (ASP) | 1.071 | Plastic | 1.660 | 20.4 | −5.26 |
| 14 | | 2.3044 (ASP) | 0.300 | | | | |
| 15 | Lens 6 | 4.6119 (ASP) | 1.300 | Plastic | 1.544 | 56.0 | 5.96 |
| 16 | | −9.8080 (ASP) | 0.200 | | | | |
| 17 | Stop | Plano | 0.390 | | | | |
| 18 | Lens 7 | 3.2636 (ASP) | 1.400 | Plastic | 1.639 | 23.5 | 37.89 |
| 19 | | 3.1417 (ASP) | 0.500 | | | | |
| 20 | Filter | Plano | 0.300 | Glass | 1.517 | 64.2 | — |
| 21 | | Plano | 1.210 | | | | |
| 22 | Image Surface | Plano | — | | | | |

Remark: Reference wavelength is d-line 587.6 nm.

* The effective radius of the stop on Surface 5 is 3.837 mm.

* The effective radius of the stop on Surface 17 is 2.170 mm.

TABLE 2B

Aspheric Coefficient

| Surface # | 3 | 4 | 6 | 7 |
|---|---|---|---|---|
| K= | 0.00000E+00 | 0.00000E+00 | 0.00000E+00 | 6.70850E+00 |
| A4= | 8.896625E−03 | 6.865797E−03 | −3.931661E−03 | −1.781031E−03 |
| A6= | −1.267926E−03 | −7.123802E−04 | 3.003826E−04 | 1.727944E−04 |
| A8= | 1.132222E−04 | −6.806527E−05 | −1.164083E−04 | −6.218895E−05 |
| A10= | −6.215960E−06 | 2.001524E−05 | 1.518822E−05 | 1.366894E−05 |
| A12= | 2.163596E−07 | −1.719369E−06 | −7.862445E−07 | −1.594372E−06 |
| A14= | −4.685529E−09 | 7.177252E−08 | 1.723944E−09 | 1.060470E−07 |
| A16= | 5.759366E−11 | −1.239284E−09 | 1.289160E−09 | −3.804826E−09 |
| A18= | −3.056610E−13 | | −3.401103E−11 | 5.813090E−11 |

| Surface # | 11 | 12 | 13 | 14 |
|---|---|---|---|---|
| K= | −3.05207E+00 | 1.07387E+01 | −1.37044E+01 | 0.00000E+00 |
| A4= | 3.948954E−03 | −8.517317E−04 | −2.694057E−02 | −4.126876E−02 |
| A6= | −8.220145E−04 | 3.307983E−03 | 4.087835E−03 | 4.945868E−03 |
| A8= | −4.811490E−06 | −1.225497E−03 | −8.016566E−04 | −1.505675E−03 |
| A10= | −3.807537E−05 | 2.759358E−04 | 1.499669E−05 | −1.952128E−04 |
| A12= | | 1.377305E−04 | 3.271479E−04 |
| A14= | | −1.349028E−05 | −3.905487E−05 | −1.532366E−04 |
| A16= | | | 3.146206E−06 | 3.816157E−05 |
| A18= | | | | −5.046356E−06 |
| A20= | | | | 2.646362E−07 |

| Surface # | 15 | 16 | 18 | 19 |
|---|---|---|---|---|
| K= | 0.00000E+00 | 0.00000E+00 | 0.00000E+00 | 0.00000E+00 |
| A4= | −1.343700E−03 | −4.253913E−02 | −5.395678E−02 | −2.701645E−02 |
| A6= | 5.165368E−03 | 2.205385E−02 | 1.244443E−02 | −7.180095E−04 |
| A8= | −2.685407E−03 | −8.359362E−03 | −5.833802E−03 | 1.654291E−03 |
| A10= | 1.047833E−03 | 2.943962E−03 | 2.904706E−03 | −6.435050E−04 |
| A12= | −3.720455E−04 | −7.574378E−04 | −1.081639E−03 | 1.494689E−04 |
| A14= | 9.439707E−05 | 1.319090E−04 | 2.523581E−04 | −2.344785E−05 |
| A16= | −1.422494E−05 | −1.558040E−05 | −3.368902E−05 | 2.366525E−06 |
| A18= | 9.101918E−07 | 9.330806E−07 | 1.937858E−06 | −1.366540E−07 |
| A20= | | | | 3.395892E−09 |

In the 2nd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 2nd embodiment, so an explanation in this regard will not be provided again.

Moreover, these parameters can be calculated from TABLE 2A and TABLE 2B and satisfy the conditions stated in TABLE 2C below.

TABLE 2C

| f [mm] | 1.87 | f4/T67 | 8.86 |
|---|---|---|---|
| Fno | 1.79 | ATmax1/f | 3.87 |
| HFOV [deg.] | 105.8 | ATmax1/ATmax2 | 1.56 |
| ImgH [mm] | 3.47 | (R4 + R10)/T67 | 15.65 |
| TL/f | 14.15 | (R9 + R10)/(R9 − R10) | 1.79 |
| TLR/TL | 0.57 | SAG7R1/CT7 | −0.01 |
| T34/CT3 | 2.42 | Y1R1/Y5R2 | 5.54 |
| T34/TD | 0.30 | Y7R2/Y4R1 | 1.78 |
| T67/T56 | 1.97 | (Y1R1 − Y1R2)/CT1 | 4.77 |
| f/f7 | 0.05 | N1 | 1.804 |
| f/R9 | 0.23 | V2/V7 | 2.38 |
| f123/f4567 | −2.63 | V6/V7 | 2.38 |

3rd Embodiment

Figure 3A:
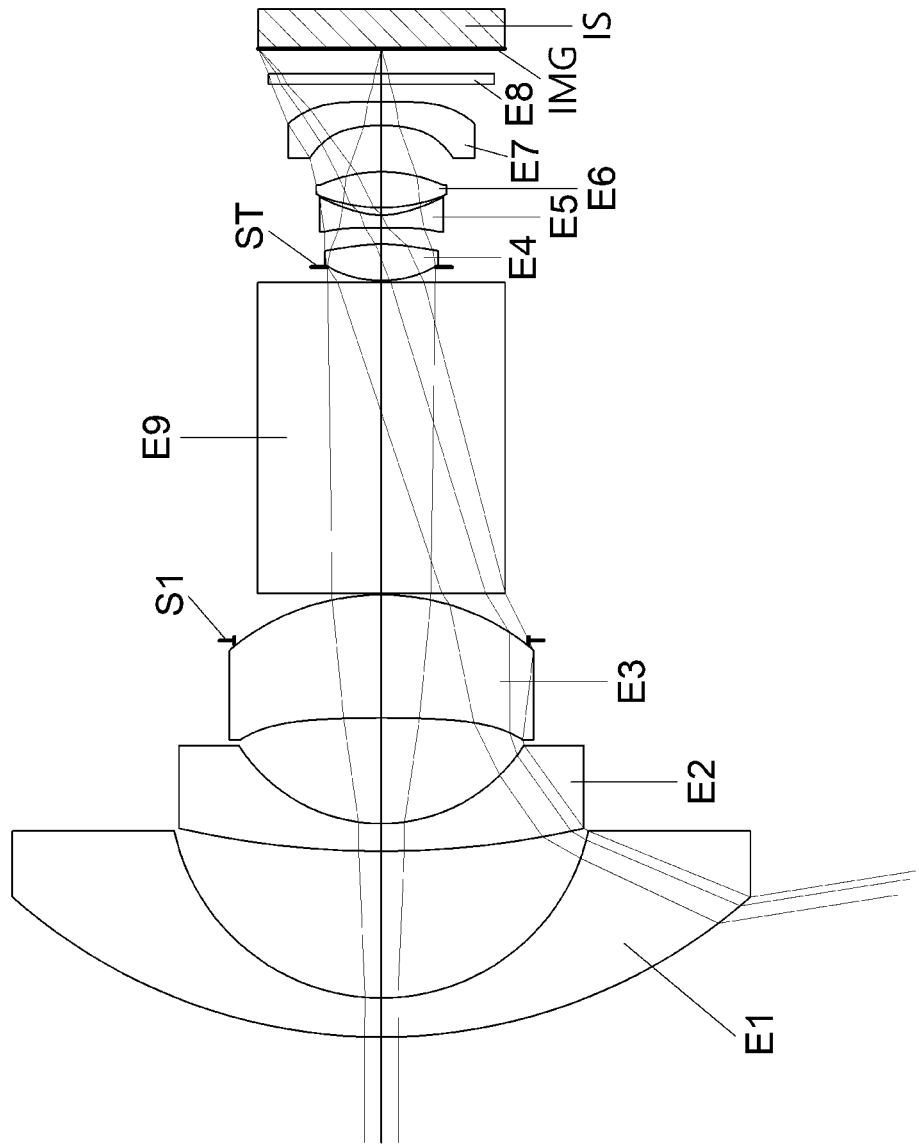
FIG. 3A is a schematic view of an imaging apparatus according to the 3rd embodiment of the present disclosure.
Figure 3B:
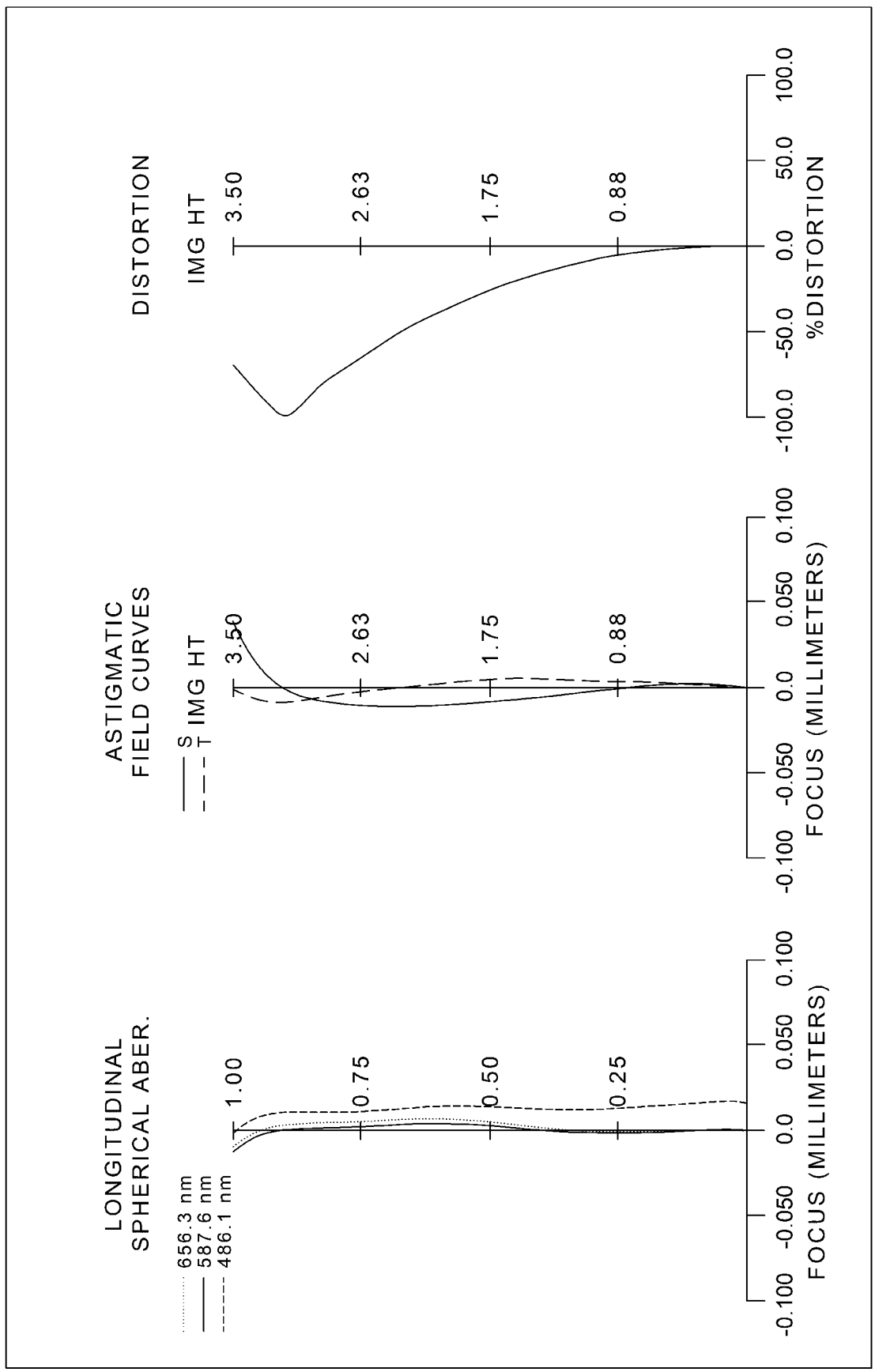
FIG. 3B shows longitudinal spherical aberration curves, astigmatic field curves and a distortion curve of the imaging apparatus according to the 3rd embodiment.

FIG. 3A is a schematic view of an imaging apparatus 3 according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus 3 includes an image capturing system lens assembly of the present disclosure and an image sensor IS. The image capturing system lens assembly includes, in order from an object side to an image side along an optical path, a first lens element E1, a second lens element E2, a third lens element E3, a stop S1, a reflective element E9, an aperture stop ST, a fourth lens element E4, a fifth lens element E5, a sixth lens element E6, a seventh lens element E7, a filter E8, and an image surface IMG.

The first lens element E1 has negative refractive power and is made of glass material. The first lens element E1 has an object-side surface being convex in a paraxial region thereof, and an image-side surface being concave in a paraxial region thereof. Both the object-side surface and the image-side surface are spherical.

The second lens element E2 has negative refractive power and is made of glass material. The second lens element E2 has an object-side surface being convex in a paraxial region thereof, and an image-side surface being concave in a paraxial region thereof. Both the object-side surface and the image-side surface are spherical.

The third lens element E3 has positive refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has positive refractive power and is made of glass material. The fourth lens element E4 has an object-side surface being convex in a paraxial region thereof, and an image-side surface being convex in a paraxial region thereof. Both the object-side surface and the image-side surface are aspheric.

The fifth lens element E5 has negative refractive power and is made of plastic material. The fifth lens element E5 has an object-side surface being concave in a paraxial region thereof, and an image-side surface being concave in a paraxial region thereof. Both the object-side surface and the image-side surface are aspheric.

The sixth lens element E6 has positive refractive power and is made of plastic material. The sixth lens element E6 has an object-side surface being convex in a paraxial region thereof, and an image-side surface being convex in a paraxial region thereof. Both the object-side surface and the image-side surface are aspheric.

The seventh lens element E7 has negative refractive power and is made of plastic material. The seventh lens element E7 has an object-side surface being concave in a paraxial region thereof, and an image-side surface being convex in a paraxial region thereof. Both the object-side surface and the image-side surface are aspheric.

The filter E8 is disposed between the seventh lens element E7 and the image surface IMG. The filter E8 is made of glass material and does not affect the focal length of the image capturing system lens assembly. The reflective element E9, which is a prism, is disposed between the stop S1 and the aperture stop ST. The image sensor IS is disposed on or near the image surface IMG.

The detailed optical data of the 3rd embodiment are shown in TABLE 3A, and the aspheric surface data are shown in TABLE 3B.

TABLE 3A (3rd Embodiment)
f = 1.79 mm, Fno = 1.84, HFOV = 98.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 15.7654 | (SPH) | 1.110 | Glass | 1.904 | 31.4 | −11.39 |
| 2 | | 6.0205 | (SPH) | 4.173 | | | | |
| 3 | Lens 2 | 25.6376 | (SPH) | 0.782 | Glass | 1.850 | 32.2 | −7.07 |
| 4 | | 4.8011 | (SPH) | 3.004 | | | | |
| 5 | Lens 3 | −44.2033 | (ASP) | 3.500 | Plastic | 1.639 | 23.3 | 11.84 |
| 6 | | −6.6589 | (ASP) | −1.300 | | | | |
| 7 | Stop | Plano | | 1.350 | | | | |
| 8 | Prism | Plano | | 8.830 | Glass | 1.762 | 40.1 | — |
| 9 | | Plano | | 0.432 | | | | |
| 10 | Ape. Stop | Plano | | −0.382 | | | | |
| 11 | Lens 4 | 3.1826 | (ASP) | 1.035 | Glass | 1.540 | 59.7 | 3.58 |
| 12 | | −4.3536 | (ASP) | 0.463 | | | | |
| 13 | Lens 5 | −1339.0325 | (ASP) | 0.365 | Plastic | 1.669 | 19.5 | −3.21 |
| 14 | | 2.1545 | (ASP) | 0.209 | | | | |
| 15 | Lens 6 | 4.2819 | (ASP) | 1.015 | Plastic | 1.562 | 44.6 | 4.05 |
| 16 | | −4.4374 | (ASP) | 1.318 | | | | |
| 17 | Lens 7 | −5.3676 | (ASP) | 0.670 | Plastic | 1.614 | 25.6 | −10.07 |
| 18 | | −42.8625 | (ASP) | 0.500 | | | | |
| 19 | Filter | Plano | | 0.300 | Glass | 1.517 | 64.2 | — |
| 20 | | Plano | | 0.716 | | | | |
| 21 | Image Surface | Plano | | — | | | | |

Remark: Reference wavelength is d-line 587.6 nm.
* The effective radius of the stop on Surface 7 is 4.180 mm.

TABLE 3B

Aspheric Coefficient

| Surface # | 5 | 6 | 11 | 12 |
|---|---|---|---|---|
| K= | 9.75736E+01 | 2.43147E−01 | −4.03455E−01 | −5.48941E−01 |
| A4= | −5.332334E−04 | 6.222909E−04 | 3.436805E−03 | 3.278697E−02 |
| A6= | −7.896912E−05 | −7.286737E−05 | 5.625614E−05 | −1.265497E−02 |
| A8= | 1.799208E−06 | 6.174445E−06 | 4.921472E−04 | 4.431935E−03 |
| A10= | −7.607276E−09 | −2.797847E−07 | −3.067723E−04 | −9.676028E−04 |
| A12= | 1.345735E−10 | 1.790042E−09 | 1.015669E−04 | 1.128722E−04 |
| A14= | −5.991538E−11 | 4.987432E−10 | −1.128237E−05 | −5.509822E−06 |
| A16= | | −2.366013E−11 | | |
| A18= | | 3.527298E−13 | | |

| Surface # | 13 | 14 | 15 | 16 |
|---|---|---|---|---|
| K= | −4.92804E+31 | −7.20448E−02 | −1.54656E+00 | 3.59354E−02 |
| A4= | −1.800967E−02 | −6.441320E−02 | −7.619203E−03 | −1.823861E−03 |

TABLE 3B-continued

| Aspheric Coefficient | | | | |
|---|---|---|---|---|
| A6= | −5.140022E−03 | 1.581231E−02 | 1.636856E−03 | −2.069166E−03 |
| A8= | 1.040069E−02 | 3.394802E−03 | 1.468763E−03 | 1.796267E−03 |
| A10= | −8.329216E−03 | −9.999631E−03 | −1.507074E−03 | −8.726363E−04 |
| A12= | 3.631925E−03 | 7.464074E−03 | 7.551572E−04 | 1.321564E−04 |
| A14= | −8.238366E−04 | −3.200748E−03 | −2.480293E−04 | 1.029973E−04 |
| A16= | 7.441301E−05 | 8.334890E−04 | 5.329316E−05 | −5.171388E−05 |
| A18= | | −1.222388E−04 | −4.879726E−06 | 7.565029E−06 |
| A20= | | 7.629394E−06 | | |

| Surface # | 17 | 18 |
|---|---|---|
| K= | 4.77591E+00 | −7.92267E+12 |
| A4= | −1.301186E−02 | −2.844908E−04 |
| A6= | −8.543902E−03 | −1.216119E−02 |
| A8= | −1.186984E−03 | 5.352252E−03 |
| A10= | 5.458328E−03 | −1.444339E−03 |
| A12= | −4.047966E−03 | 2.472642E−04 |
| A14= | 1.603541E−03 | −2.424330E−05 |
| A16= | −3.678830E−04 | 9.808222E−07 |
| A18= | 4.663691E−05 | 2.464625E−08 |
| A20= | −2.567540E−06 | −2.796694E−09 |

In the 3rd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 3rd embodiment, so an explanation in this regard will not be provided again.

Moreover, these parameters can be calculated from TABLE 3A and TABLE 3B and satisfy the conditions stated in TABLE 3C below.

TABLE 3C

| f [mm] | 1.79 | f4/T67 | 2.71 |
|---|---|---|---|
| Fno | 1.84 | ATmax1/f | 5.00 |
| HFOV [deg.] | 98.9 | ATmax1/ATmax2 | 2.14 |
| ImgH [mm] | 3.50 | (R4 + R10)/T67 | 5.28 |
| TL/f | 15.73 | (R9 + R10)/(R9 − R10) | 1.00 |
| TLR/TL | 0.61 | SAG7R1/CT7 | −1.38 |
| T34/CT3 | 2.55 | Y1R1/Y5R2 | 5.96 |
| T34/TD | 0.34 | Y7R2/Y4R1 | 1.69 |
| T67/T56 | 6.31 | (Y1R1 − YIR2)/CT1 | 4.14 |
| f/f7 | −0.18 | N1 | 1.904 |
| f/R9 | 0.00 | V2/V7 | 1.26 |
| f123/f4567 | −5.04 | V6/V7 | 1.75 |

4th Embodiment

Figure 4A:
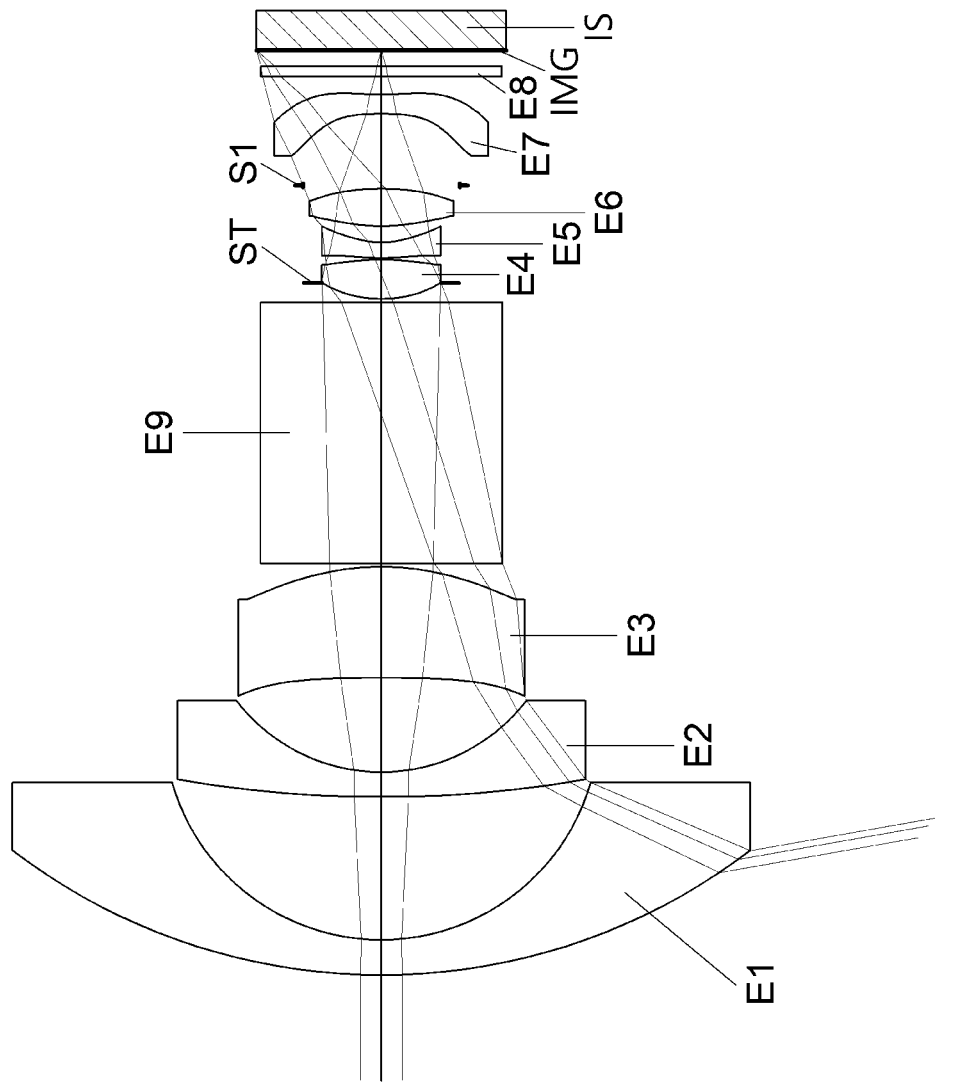
FIG. 4A is a schematic view of an imaging apparatus according to the 4th embodiment of the present disclosure.
Figure 4B:
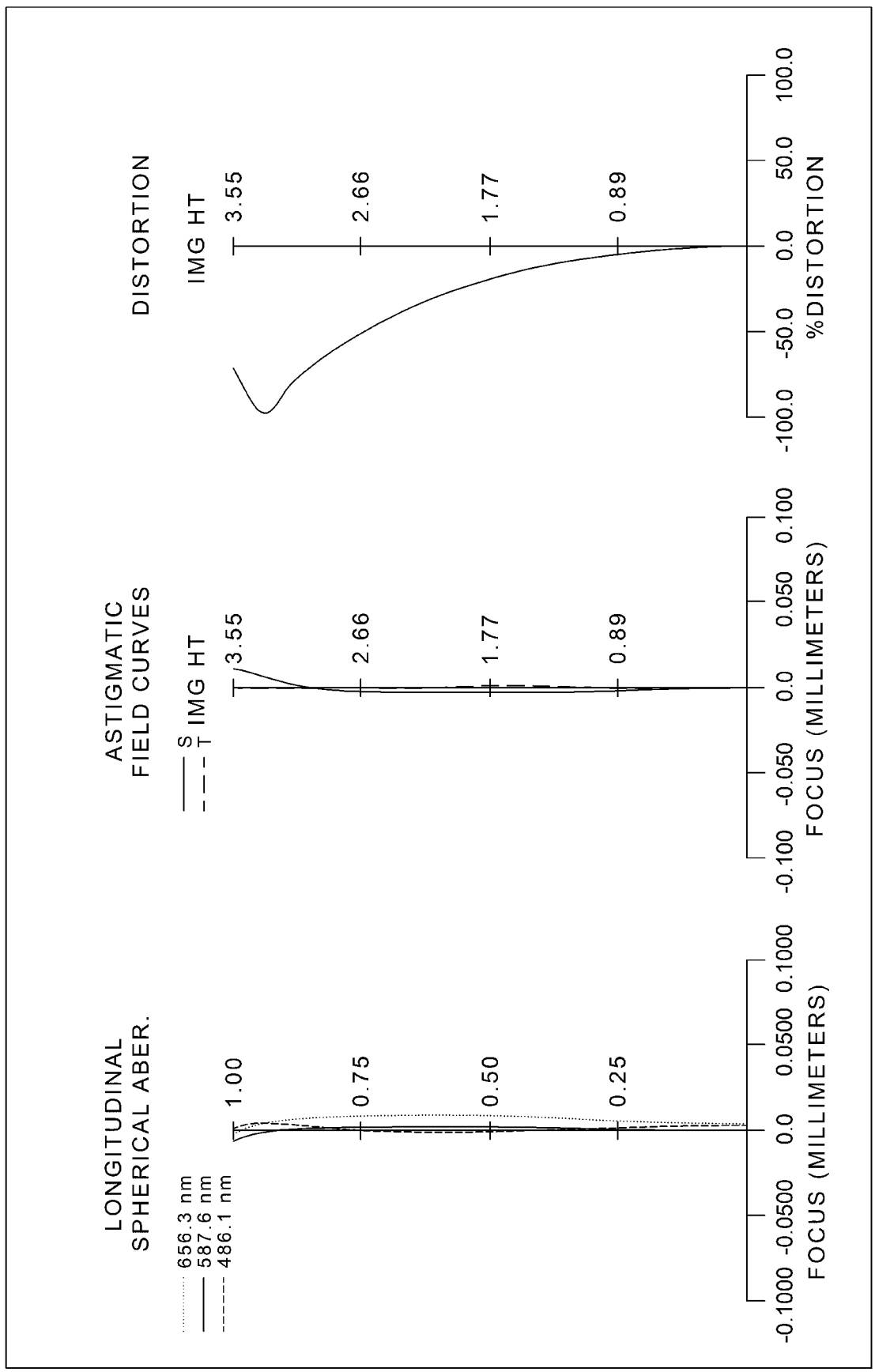
FIG. 4B shows longitudinal spherical aberration curves, astigmatic field curves and a distortion curve of the imaging apparatus according to the 4th embodiment.

FIG. 4A is a schematic view of an imaging apparatus 4 according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus 4 includes an image capturing system lens assembly of the present disclosure and an image sensor IS. The image capturing system lens assembly includes, in order from an object side to an image side along an optical path, a first lens element E1, a second lens element E2, a third lens element E3, a reflective element E9, an aperture stop ST, a fourth lens element E4, a fifth lens element E5, a sixth lens element E6, a stop S1, a seventh lens element E7, a filter E8, and an image surface IMG.

The first lens element E1 has negative refractive power and is made of glass material. The first lens element E1 has an object-side surface being convex in a paraxial region thereof, and an image-side surface being concave in a paraxial region thereof. Both the object-side surface and the image-side surface are spherical.

The second lens element E2 has negative refractive power and is made of glass material. The second lens element E2 has an object-side surface being convex in a paraxial region thereof, and an image-side surface being concave in a paraxial region thereof. Both the object-side surface and the image-side surface are spherical.

The third lens element E3 has positive refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being convex in a paraxial region thereof. Both the object-side surface and the image-side surface are aspheric.

The fifth lens element E5 has negative refractive power and is made of plastic material. The fifth lens element E5 has an object-side surface being convex in a paraxial region thereof, and an image-side surface being concave in a paraxial region thereof. Both the object-side surface and the image-side surface are aspheric.

The sixth lens element E6 has positive refractive power and is made of plastic material. The sixth lens element E6 has an object-side surface being convex in a paraxial region thereof, and an image-side surface being convex in a paraxial region thereof. Both the object-side surface and the image-side surface are aspheric.

The seventh lens element E7 has negative refractive power and is made of plastic material. The seventh lens element E7 has an object-side surface being concave in a paraxial region thereof, and an image-side surface being concave in a paraxial region thereof and convex in an off-axis region thereof. Both the object-side surface and the image-side surface are aspheric.

The filter E8 is disposed between the seventh lens element E7 and the image surface IMG. The filter E8 is made of glass material and does not affect the focal length of the image capturing system lens assembly. The reflective element E9, which is a prism, is disposed between the third lens element E3 and the aperture stop ST. The image sensor IS is disposed on or near the image surface IMG.

The detailed optical data of the 4th embodiment are shown in TABLE 4A, and the aspheric surface data are shown in TABLE 4B.

TABLE 4A (4th Embodiment)
f = 2.16 mm, Fno = 1.83, HFOV = 100.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 17.2648 | (SPH) | 1.000 | Glass | 1.804 | 46.6 | −12.52 |
| 2 | | 6.1941 | (SPH) | 4.063 | | | | |
| 3 | Lens 2 | 33.7025 | (SPH) | 0.700 | Glass | 1.729 | 54.7 | −8.51 |
| 4 | | 5.1919 | (SPH) | 2.688 | | | | |
| 5 | Lens 3 | −55.2886 | (ASP) | 3.155 | Plastic | 1.587 | 28.3 | 14.19 |
| 6 | | −7.3945 | (ASP) | 0.100 | | | | |
| 7 | Prism | Plano | | 7.414 | Glass | 1.804 | 46.6 | — |
| 8 | | Plano | | 0.548 | | | | |
| 9 | Ape. Stop | Plano | | −0.448 | | | | |
| 10 | Lens 4 | 3.4889 | (ASP) | 1.115 | Plastic | 1.544 | 56.0 | 4.22 |
| 11 | | −5.9629 | (ASP) | 0.047 | | | | |
| 12 | Lens 5 | 6.1283 | (ASP) | 0.443 | Plastic | 1.669 | 19.5 | −5.33 |
| 13 | | 2.1899 | (ASP) | 0.463 | | | | |
| 14 | Lens 6 | 4.9979 | (ASP) | 1.058 | Plastic | 1.544 | 56.0 | 5.84 |
| 15 | | −8.0889 | (ASP) | 0.100 | | | | |
| 16 | Stop | Plano | | 2.032 | | | | |
| 17 | Lens 7 | −11.3677 | (ASP) | 0.550 | Plastic | 1.587 | 28.3 | −8.01 |
| 18 | | 8.1731 | (ASP) | 0.500 | | | | |
| 19 | Filter | Plano | | 0.300 | Glass | 1.517 | 64.2 | — |
| 20 | | Plano | | 0.461 | | | | |
| 21 | Image Surface | Plano | | — | | | | |

Remark: Reference wavelength is d-line 587.6 nm.
* The effective radius of the stop on Surface 16 is 2.223 mm.

TABLE 4B

| Aspheric Coefficient | | | | |
|---|---|---|---|---|
| Surface # | 5 | 6 | 10 | 11 |
| K= | 0.00000E+00 | −2.04355E−01 | −3.31064E−01 | 4.58236E+00 |
| A4= | −7.733824E−04 | 6.855372E−04 | 4.851198E−03 | 3.003814E−02 |
| A6= | −4.332684E−05 | −4.293860E−05 | 7.599377E−05 | −1.418554E−02 |
| A8= | −1.384279E−06 | −5.473096E−07 | −3.918014E−04 | 5.809671E−03 |
| A10= | 3.239565E−07 | 8.884316E−07 | 3.127300E−04 | −1.664432E−03 |
| A12= | −3.353060E−08 | −1.423036E−07 | −1.181815E−04 | 3.256102E−04 |
| A14= | 1.898887E−09 | 1.243412E−08 | 2.121725E−05 | −3.713572E−05 |
| A16= | −3.724777E−11 | −5.616649E−10 | −1.453116E−06 | 1.848594E−06 |
| A18= | | 1.070993E−11 | | |

| Surface # | 12 | 13 | 14 | 15 |
|---|---|---|---|---|
| K= | −6.99762E+00 | −5.49180E−02 | 0.00000E+00 | 0.00000E+00 |
| A4= | −3.650234E−02 | −8.100161E−02 | −1.066564E−02 | −5.082474E−03 |
| A6= | 1.775260E−02 | 4.427939E−02 | 1.550347E−03 | 2.719620E−04 |
| A8= | −1.128643E−02 | −3.078004E−02 | −2.766715E−04 | −1.536894E−03 |
| A10= | 5.521944E−03 | 1.833435E−02 | −6.735838E−04 | 2.251251E−03 |
| A12= | −1.693996E−03 | −8.371359E−03 | 6.280387E−04 | −1.981017E−03 |
| A14= | 2.981983E−04 | 2.741388E−03 | −2.659327E−04 | 1.071438E−03 |
| A16= | −2.296792E−05 | −6.022265E−04 | 5.655521E−05 | −3.629559E−04 |
| A18= | | 8.005628E−05 | −4.556922E−06 | 7.536910E−05 |
| A20= | | −4.938773E−06 | | −8.784976E−06 |
| A22= | | | | 4.472580E−07 |

| Surface # | 17 | 18 |
|---|---|---|
| K= | 0.00000E+00 | 0.00000E+00 |
| A4= | −4.047265E−02 | −2.809985E−02 |
| A6= | −2.476386E−05 | −4.263797E−04 |
| A8= | 1.627943E−03 | 2.246400E−03 |
| A10= | −2.824021E−04 | −1.048120E−03 |
| A12= | −1.616145E−04 | 2.895410E−04 |
| A14= | 1.130806E−04 | −5.313940E−05 |
| A16= | −3.151789E−05 | 6.543785E−06 |
| A18= | 4.768326E−06 | −5.206970E−07 |
| A20= | −3.827495E−07 | 2.420275E−08 |
| A22= | 1.273309E−08 | −4.983275E−10 |

In the 4th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 4th embodiment, so an explanation in this regard will not be provided again.

Moreover, these parameters can be calculated from TABLE 4A and TABLE 4B and satisfy the conditions stated in TABLE 4C below.

TABLE 4C

| f [mm] | 2.16 | f4/T67 | 1.98 |
|---|---|---|---|
| Fno | 1.83 | ATmax1/f | 3.52 |
| HFOV [deg.] | 100.0 | ATmax1/ATmax2 | 1.87 |
| ImgH [mm] | 3.55 | (R4 + R10)/T67 | 3.46 |
| TL/f | 12.14 | (R9 + R10)/(R9 − R10) | 2.11 |
| TLR/TL | 0.59 | SAG7R1/CT7 | −2.17 |
| T34/CT3 | 2.41 | Y1R1/Y5R2 | 6.22 |
| T34/TD | 0.30 | Y7R2/Y4R1 | 1.80 |
| T67/T56 | 4.60 | (Y1R1 − Y1R2)/CT1 | 4.53 |
| f/f7 | −0.27 | N1 | 1.804 |
| f/R9 | 0.35 | V2/V7 | 1.93 |
| f123/f4567 | −3.23 | V6/V7 | 1.98 |

5th Embodiment

Figure 5A:
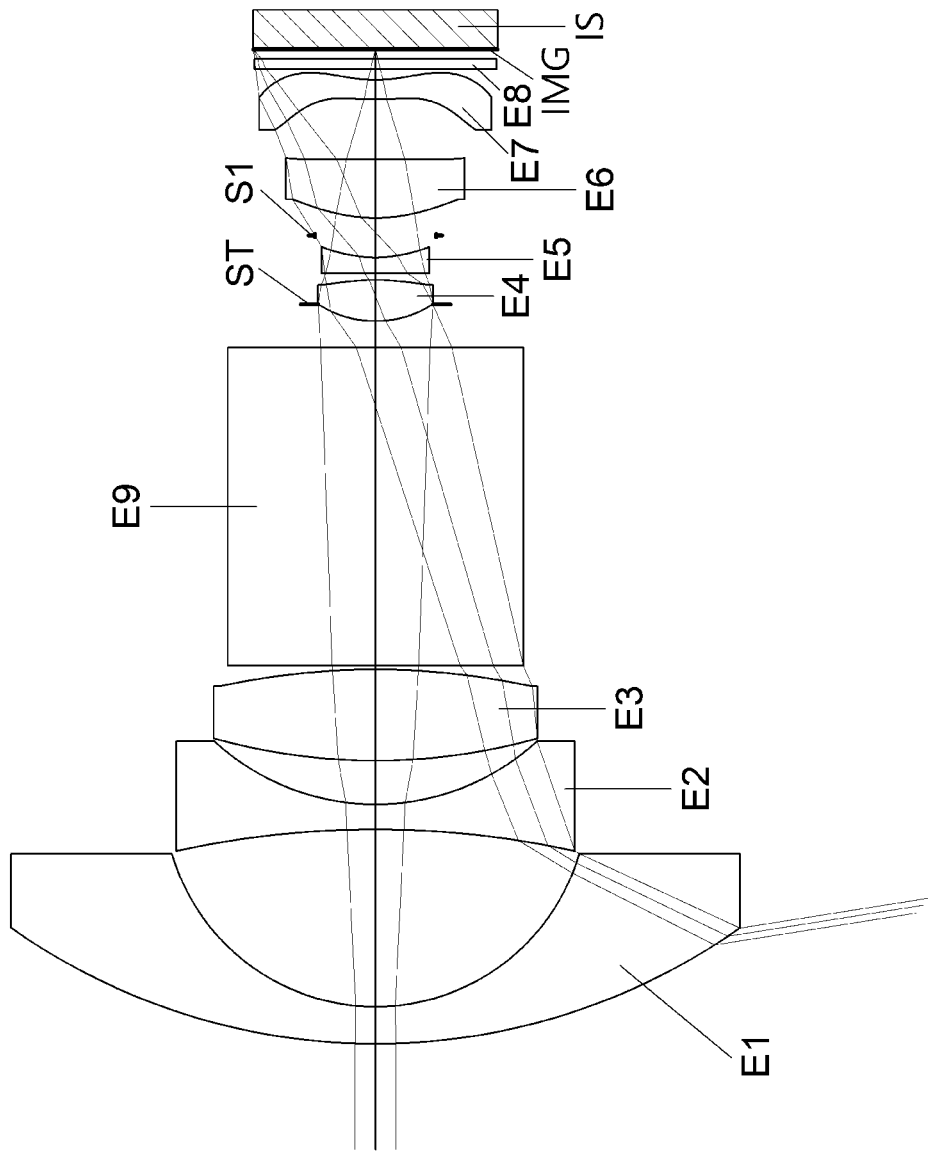
FIG. 5A is a schematic view of an imaging apparatus according to the 5th embodiment of the present disclosure.
Figure 5B:
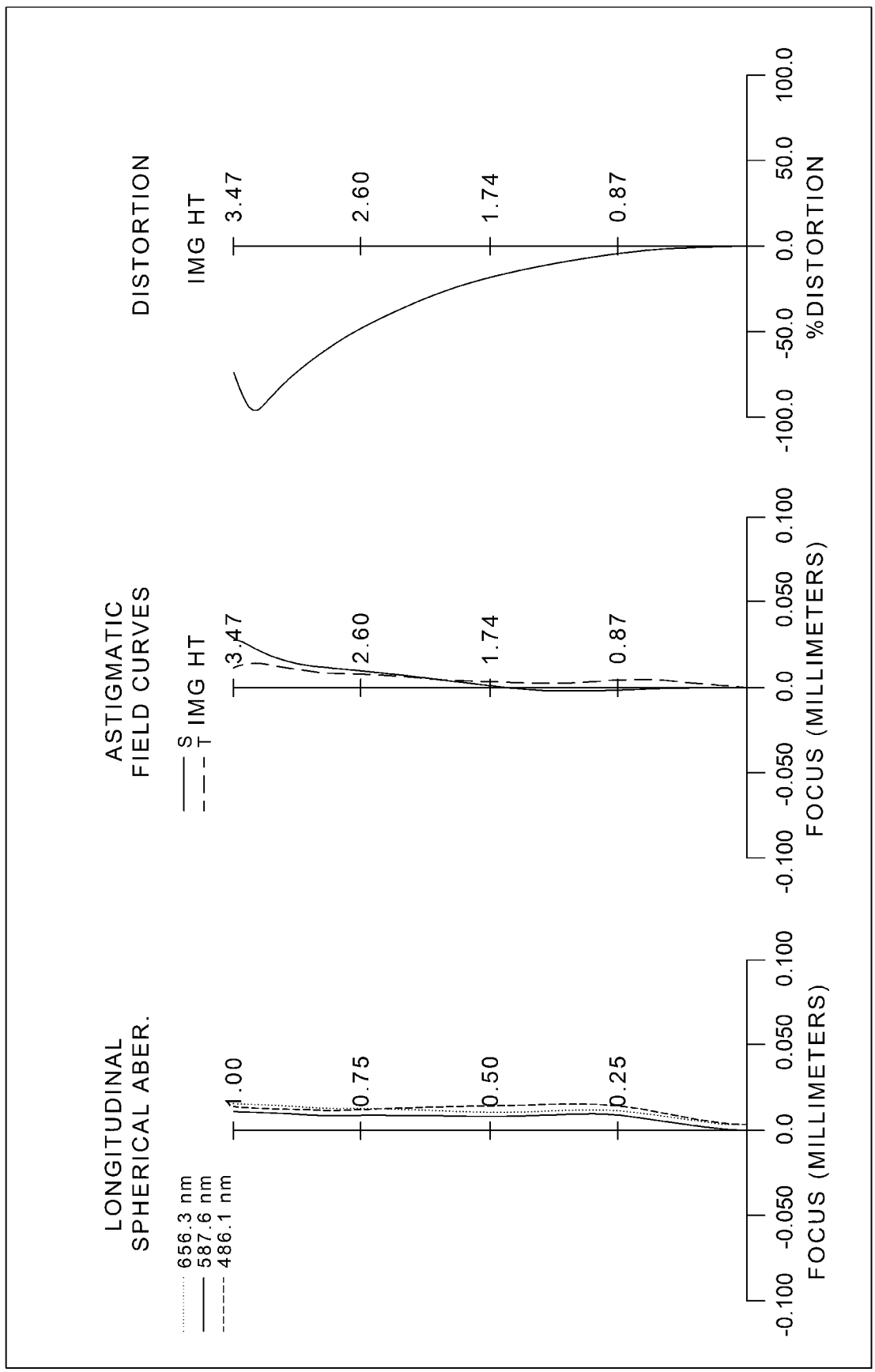
FIG. 5B shows longitudinal spherical aberration curves, astigmatic field curves and a distortion curve of the imaging apparatus according to the 5th embodiment.

FIG. 5A is a schematic view of an imaging apparatus 5 according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus 5 includes an image capturing system lens assembly of the present disclosure and an image sensor IS. The image capturing system lens assembly includes, in order from an object side to an image side along an optical path, a first lens element E1, a second lens element E2, a third lens element E3, a reflective element E9, an aperture stop ST, a fourth lens element E4, a fifth lens element E5, a stop S1, a sixth lens element E6, a seventh lens element E7, a filter E8, and an image surface IMG.

The first lens element E1 has negative refractive power and is made of glass material. The first lens element E1 has an object-side surface being convex in a paraxial region thereof, and an image-side surface being concave in a paraxial region thereof. Both the object-side surface and the image-side surface are spherical.

The second lens element E2 has negative refractive power and is made of glass material. The second lens element E2 has an object-side surface being concave in a paraxial region thereof, and an image-side surface being concave in a paraxial region thereof. Both the object-side surface and the image-side surface are spherical.

The third lens element E3 has positive refractive power and is made of glass material. The third lens element E3 has an object-side surface being convex in a paraxial region thereof, and an image-side surface being convex in a paraxial region thereof. Both the object-side surface and the image-side surface are spherical.

The fourth lens element E4 has positive refractive power and is made of plastic material. The fourth lens element E4 has an object-side surface being convex in a paraxial region thereof, and an image-side surface being convex in a paraxial region thereof. Both the object-side surface and the image-side surface are aspheric.

The fifth lens element E5 has negative refractive power and is made of plastic material. The fifth lens element E5 has an object-side surface being convex in a paraxial region thereof, and an image-side surface being concave in a paraxial region thereof. Both the object-side surface and the image-side surface are aspheric.

The sixth lens element E6 has positive refractive power and is made of glass material. The sixth lens element E6 has an object-side surface being convex in a paraxial region thereof, and an image-side surface being convex in a paraxial region thereof. Both the object-side surface and the image-side surface are aspheric.

The seventh lens element E7 has negative refractive power and is made of plastic material. The seventh lens element E7 has an object-side surface being convex in a paraxial region thereof, and an image-side surface being concave in a paraxial region thereof and convex in an off-axis region thereof. Both the object-side surface and the image-side surface are aspheric.

The filter E8 is disposed between the seventh lens element E7 and the image surface IMG. The filter E8 is made of glass material and does not affect the focal length of the image capturing system lens assembly. The reflective element E9, which is a prism, is disposed between the third lens element E3 and the aperture stop ST. The image sensor IS is disposed on or near the image surface IMG.

The detailed optical data of the 5th embodiment are shown in TABLE 5A, and the aspheric surface data are shown in TABLE 5B.

TABLE 5A (5th Embodiment)
f = 2.10 mm, Fno = 1.82, HFOV = 99.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 17.8995 | (SPH) | 1.050 | Glass | 1.804 | 46.6 | −11.76 |
| 2 | | 6.0243 | (SPH) | 5.053 | | | | |
| 3 | Lens 2 | −26.3056 | (SPH) | 0.700 | Glass | 1.804 | 46.6 | −6.63 |
| 4 | | 6.7583 | (SPH) | 1.243 | | | | |
| 5 | Lens 3 | 16.8868 | (SPH) | 2.600 | Glass | 1.904 | 31.4 | 10.64 |
| 6 | | −20.6908 | (SPH) | 0.100 | | | | |
| 7 | Prism | Plano | | 9.047 | Glass | 1.847 | 23.8 | — |
| 8 | | Plano | | 1.226 | | | | |
| 9 | Ape. Stop | Plano | | −0.477 | | | | |
| 10 | Lens 4 | 3.0094 | (ASP) | 1.168 | Plastic | 1.544 | 56.0 | 3.96 |
| 11 | | −6.5579 | (ASP) | 0.186 | | | | |
| 12 | Lens 5 | 11.1172 | (ASP) | 0.450 | Plastic | 1.660 | 20.4 | −5.96 |
| 13 | | 2.8572 | (ASP) | 0.628 | | | | |

TABLE 5A-continued (5th Embodiment)
f = 2.10 mm, Fno = 1.82, HFOV = 99.0 deg.

| Surface # | | Curvature Radius | Thickness | Material | Index | Abbe # | Focal Length |
|---|---|---|---|---|---|---|---|
| 14 | Stop | Plano | 0.500 | | | | |
| 15 | Lens 6 | 4.3789 (ASP) | 1.669 | Glass | 1.592 | 60.6 | 7.32 |
| 16 | | −333.3340 (ASP) | 1.700 | | | | |
| 17 | Lens 7 | 8.3537 (ASP) | 0.558 | Plastic | 1.587 | 28.3 | −14.32 |
| 18 | | 4.0877 (ASP) | 0.300 | | | | |
| 19 | Filter | Plano | 0.300 | Glass | 1.517 | 64.2 | — |
| 20 | | Plano | 0.267 | | | | |
| 21 | Image Surface | Plano | — | | | | |

Remark: Reference wavelength is d-line 587.6 nm.
* The effective radius of the stop on Surface 14 is 1.721 mm.

TABLE 5B

Aspheric Coefficient

| Surface # | 10 | 11 | 12 | 13 |
|---|---|---|---|---|
| K= | −5.24607E−01 | 7.77247E+00 | 1.98943E+00 | 7.65711E−01 |
| A4= | 2.759421E−03 | −3.444727E−03 | −6.815394E−02 | −7.603557E−02 |
| A6= | 1.808033E−03 | 2.652950E−02 | 6.238607E−02 | 4.778712E−02 |
| A8= | −1.976727E−03 | −2.273539E−02 | −4.265255E−02 | −2.579084E−02 |
| A10= | 1.443476E−03 | 1.207371E−02 | 2.067263E−02 | 8.823986E−03 |
| A12= | −5.680327E−04 | −3.906553E−03 | −6.530466E−03 | −7.530661E−04 |
| A14= | 1.171110E−04 | 7.054438E−04 | 1.187054E−03 | −7.985303E−04 |
| A16= | −9.818452E−06 | −5.417026E−05 | −9.363331E−05 | 3.745347E−04 |
| A18= | | | | −6.823472E−05 |
| A20= | | | | 4.609224E−06 |

| Surface # | 15 | 16 | 17 | 18 |
|---|---|---|---|---|
| K= | 0.00000E+00 | −9.90000E+01 | −3.31120E+01 | −1.61817E+00 |
| A4= | −7.392413E−03 | −6.241191E−05 | −2.059698E−02 | −4.543971E−03 |
| A6= | 8.156135E−04 | −1.208618E−03 | −8.406618E−03 | −1.690376E−02 |
| A8= | 1.850918E−04 | 1.619589E−03 | 3.102643E−03 | 9.116519E−03 |
| A10= | −2.354951E−04 | −1.0643 19E−03 | −1.042327E−04 | −2.870591E−03 |
| A12= | 9.450640E−05 | 4.498858E−04 | −2.217964E−04 | 6.049058E−04 |
| A14= | −2.063132E−05 | −1.286992E−04 | 7.691223E−05 | −8.794044E−05 |
| A16= | 2.418197E−06 | 2.491304E−05 | −1.281103E−05 | 8.716687E−06 |
| A18= | −1.187875E−07 | −3.133469E−06 | 1.188681E−06 | −5.618182E−07 |
| A20= | | 2.319328E−07 | −5.808027E−08 | 2.118139E−08 |
| A22= | | −7.663113E−09 | 1.138265E−09 | −3.537692E−10 |

In the 5th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 5th embodiment, so an explanation in this regard will not be provided again.

Moreover, these parameters can be calculated from TABLE 5A and TABLE 5B and satisfy the conditions stated in TABLE 5C below.

TABLE 5C

| f [mm] | 2.10 | f4/T67 | 2.33 |
|---|---|---|---|
| Fno | 1.82 | ATmax1/f | 4.71 |
| HFOV [deg.] | 99.0 | ATmax1/ATmax2 | 1.96 |
| ImgH [mm] | 3.47 | (R4 + R10)/T67 | 5.66 |
| TL/f | 13.44 | (R9 + R10)/(R9 − R10) | 1.69 |
| TLR/TL | 0.54 | SAG7R1/CT7 | −1.54 |
| T34/CT3 | 3.81 | Y1R1/Y5R2 | 6.79 |
| T34/TD | 0.36 | Y7R2/Y4R1 | 2.02 |
| T67/T56 | 1.51 | (Y1R1 − Y1R2)/CT1 | 4.34 |

TABLE 5C-continued

| f/f7 | −0.15 | N1 | 1.804 |
|---|---|---|---|
| f/R9 | 0.19 | V2/V7 | 1.65 |
| f123/f4567 | −1.99 | V6/V7 | 2.14 |

6th Embodiment

Figure 6A:
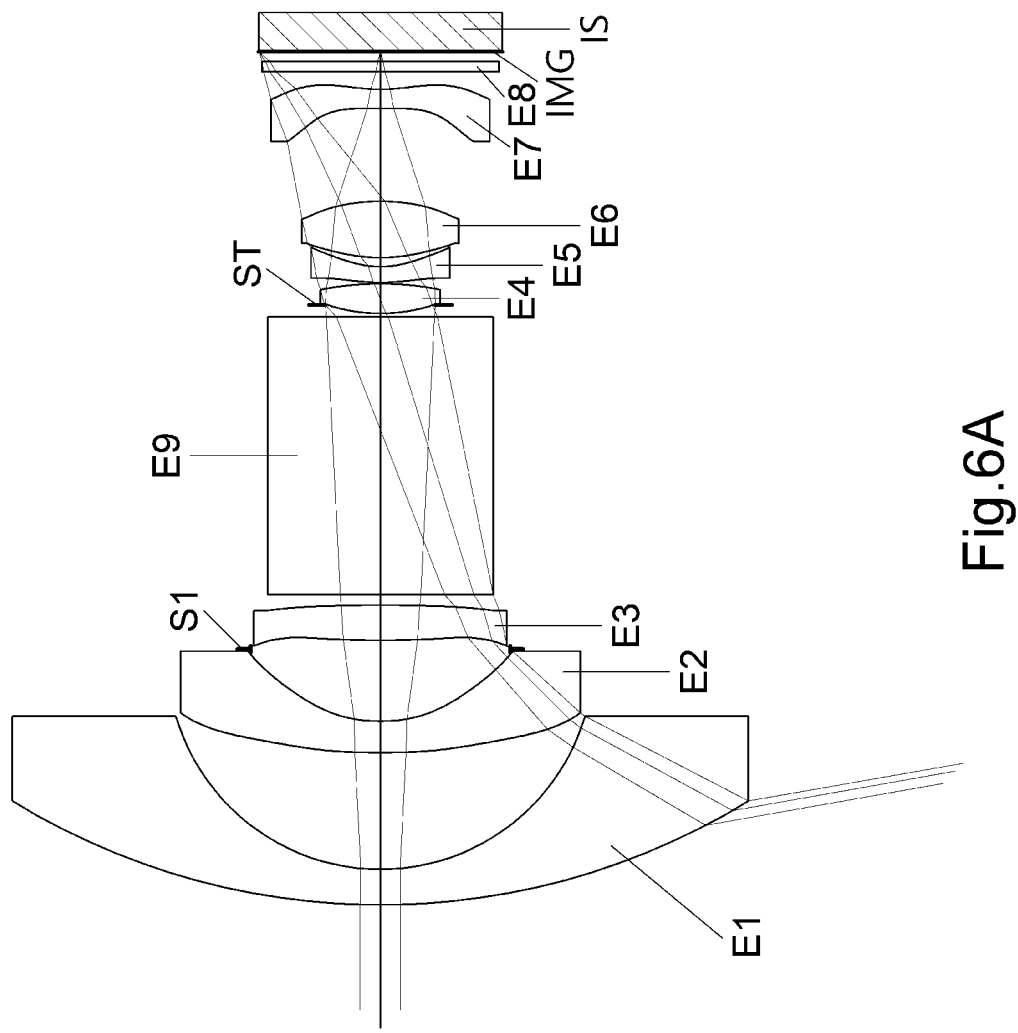
FIG. 6A is a schematic view of an imaging apparatus according to the 6th embodiment of the present disclosure.
Figure 6B:
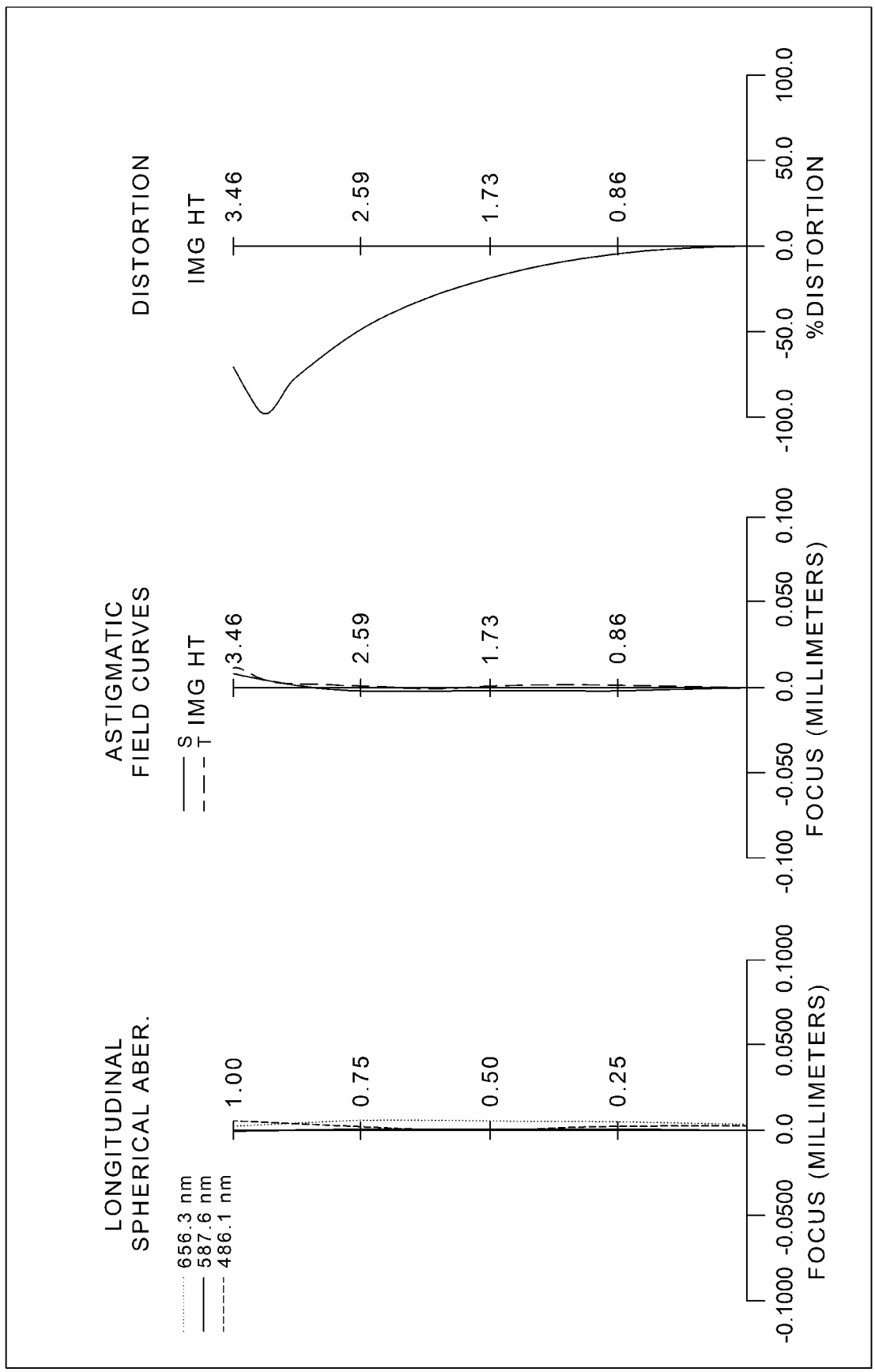
FIG. 6B shows longitudinal spherical aberration curves, astigmatic field curves and a distortion curve of the imaging apparatus according to the 6th embodiment.

FIG. 6A is a schematic view of an imaging apparatus 6 according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus 6 includes an image capturing system lens assembly of the present disclosure and an image sensor IS. The image capturing system lens assembly includes, in order from an object side to an image side along an optical path, a first lens element E1, a second lens element E2, a stop S1, a third lens element E3, a reflective element E9, an aperture stop ST, a fourth lens element E4, a fifth lens element E5, a sixth lens element E6, a seventh lens element E7, a filter E8, and an image surface IMG.

The first lens element E1 has negative refractive power and is made of glass material. The first lens element E1 has an object-side surface being convex in a paraxial region thereof, and an image-side surface being concave in a paraxial region thereof. Both the object-side surface and the image-side surface are spherical.

The second lens element E2 has negative refractive power and is made of plastic material. The second lens element E2 has an object-side surface being convex in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being convex in a paraxial region thereof. Both the object-side surface and the image-side surface are aspheric.

The fifth lens element E5 has negative refractive power and is made of plastic material. The fifth lens element E5 has an object-side surface being convex in a paraxial region thereof, and an image-side surface being concave in a paraxial region thereof. Both the object-side surface and the image-side surface are aspheric.

The sixth lens element E6 has positive refractive power and is made of glass material. The sixth lens element E6 has an object-side surface being convex in a paraxial region thereof, and an image-side surface being convex in a paraxial region thereof. Both the object-side surface and the image-side surface are aspheric.

The seventh lens element E7 has negative refractive power and is made of plastic material. The seventh lens element E7 has an object-side surface being convex in a paraxial region thereof, and an image-side surface being concave in a paraxial region thereof and convex in an off-axis region thereof. Both the object-side surface and the image-side surface are aspheric.

The filter E8 is disposed between the seventh lens element E7 and the image surface IMG. The filter E8 is made of glass material and does not affect the focal length of the image capturing system lens assembly. The reflective element E9, which is a prism, is disposed between the third lens element E3 and the aperture stop ST. The image sensor IS is disposed on or near the image surface IMG.

The detailed optical data of the 6th embodiment are shown in TABLE 6A, and the aspheric surface data are shown in TABLE 6B.

TABLE 6A (6th Embodiment)
f = 2.09 mm, Fno = 1.83, HFOV = 100.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 19.9874 | (SPH) | 1.004 | Glass | 1.804 | 46.6 | −11.16 |
| 2 | | 6.0542 | (SPH) | 3.321 | | | | |
| 3 | Lens 2 | 33.4376 | (ASP) | 0.891 | Plastic | 1.544 | 56.0 | −9.98 |
| 4 | | 4.6289 | (ASP) | 2.050 | | | | |
| 5 | Stop | Plano | | 0.250 | | | | |
| 6 | Lens 3 | 35.5245 | (ASP) | 1.000 | Plastic | 1.669 | 19.5 | 24.99 |
| 7 | | −31.2174 | (ASP) | 0.296 | | | | |
| 8 | Prism | Plano | | 7.892 | Glass | 1.847 | 23.8 | — |
| 9 | | Plano | | 0.343 | | | | |
| 10 | Ape. Stop | Plano | | −0.243 | | | | |
| 11 | Lens 4 | 4.7667 | (ASP) | 0.844 | Plastic | 1.544 | 56.0 | 5.58 |
| 12 | | −7.8330 | (ASP) | 0.032 | | | | |
| 13 | Lens 5 | 4.8236 | (ASP) | 0.450 | Plastic | 1.660 | 20.4 | −6.99 |
| 14 | | 2.2713 | (ASP) | 0.258 | | | | |
| 15 | Lens 6 | 4.2442 | (ASP) | 1.603 | Glass | 1.589 | 61.2 | 4.42 |
| 16 | | −5.7925 | (ASP) | 2.631 | | | | |
| 17 | Lens 7 | 20.7957 | (ASP) | 0.550 | Plastic | 1.639 | 23.5 | −8.64 |
| 18 | | 4.3140 | (ASP) | 0.500 | | | | |
| 19 | Filter | Plano | | 0.300 | Glass | 1.517 | 64.2 | — |
| 20 | | Plano | | 0.274 | | | | |
| 21 | Image Surface | Plano | | — | | | | |

Remark: Reference wavelength is d-line 587.6 nm.

* The effective radius of the stop on Surface 5 is 3.689 mm.

TABLE 6B

Aspheric Coefficient

| Surface # | 3 | 4 | 6 | 7 |
|---|---|---|---|---|
| K= | 0.00000E+00 | 0.00000E+00 | 0.00000E+00 | 0.00000E+00 |
| A4= | 6.659221E−03 | 9.326158E−03 | 2.123896E−03 | 2.088052E−03 |
| A6= | −1.033418E−03 | −1.096249E−03 | −8.599873E−05 | 9.418944E−05 |
| A8= | 8.082765E−05 | −3.971224E−05 | −1.333986E−04 | −1.852506E−04 |
| A10= | −3.673094E−06 | 1.447739E−05 | 2.143852E−05 | 4.230514E−05 |
| A12= | 9.982360E−08 | −1.035113E−06 | −1.631517E−06 | −5.318860E−06 |
| A14= | −1.507106E−09 | 2.953229E−08 | 6.192357E−08 | 4.098390E−07 |
| A16= | 9.801205E−12 | −2.259613E−10 | −6.498643E−10 | −1.795283E−08 |
| A18= |  | | −1.363777E−11 | 3.487868E−10 |

| Surface # | 11 | 12 | 13 | 14 |
|---|---|---|---|---|
| K= | −2.42887E+00 | 7.62903E+00 | −5.78877E+00 | −4.18446E−02 |
| A4= | 5.240696E−03 | 1.346741E−02 | −2.954676E−02 | −6.603430E−02 |
| A6= | −1.243032E−03 | −6.444610E−03 | 1.343025E−02 | 2.914540E−02 |
| A8= | 2.903886E−04 | 1.680679E−03 | −7.814821E−03 | −1.512709E−02 |
| A10= | −1.095560E−04 | −2.296190E−04 | 2.894587E−03 | 5.057251E−03 |
| A12= | 1.254249E−05 | 1.496627E−05 | −5.805498E−04 | −1.022274E−03 |
| A14= |  |  | 5.858208E−05 | 1.008398E−04 |
| A16= |  |  | −2.311672E−06 | −1.434258E−07 |
| A18= |  |  |  | −6.641603E−07 |

| Surface # | 15 | 16 | 17 | 18 |
|---|---|---|---|---|
| K= | 0.00000E+00 | 0.00000E+00 | 0.00000E+00 | 0.00000E+00 |
| A4= | −1.404622E−02 | −3.185840E−03 | −4.341502E−02 | −3.551484E−02 |
| A6= | 3.994048E−03 | −7.375272E−04 | −4.332651E−05 | −4.660991E−04 |
| A8= | −6.696994E−04 | 1.472624E−03 | 2.544052E−03 | 4.186911E−03 |
| A10= | −4.954814E−04 | −1.842225E−03 | −8.464083E−04 | −2.277110E−03 |
| A12= | 3.170852E−04 | 1.384056E−03 | 4.916266E−06 | 7.251349E−04 |
| A14= | −8.673990E−05 | −6.513507E−04 | 8.928316E−05 | −1.542188E−04 |
| A16= | 1.376775E−05 | 1.926879E−04 | −3.272465E−05 | 2.235336E−05 |
| A18= | −9.782200E−07 | −3.477983E−05 | 6.029015E−06 | −2.170404E−06 |
| A20= |  | 3.506167E−06 | −6.317887E−07 | 1.342300E−07 |
| A22= |  | −1.508354E−07 | 3.569805E−08 | −4.732700E−09 |
| A24= |  |  | −8.461505E−10 | 7.124437E−11 |

In the 6th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 6th embodiment, so an explanation in this regard will not be provided again.

Moreover, these parameters can be calculated from TABLE 6A and TABLE 6B and satisfy the conditions stated in TABLE 6C below.

TABLE 6C

| f [mm] | 2.09 | f4/T67 | 2.12 |
|---|---|---|---|
| Fno | 1.83 | ATmax1/f | 3.96 |
| HFOV [deg.] | 100.0 | ATmax1/ATmax2 | 2.50 |
| ImgH [mm] | 3.46 | (R4 + R10)/T67 | 2.62 |
| TL/f | 11.59 | (R9 + R10)/(R9 − R10) | 2.78 |
| TLR/TL | 0.53 | SAG7R1/CT7 | −1.70 |
| T34/CT3 | 8.29 | Y1R1/Y5R2 | 5.31 |
| T34/TD | 0.36 | Y7R2/Y4R1 | 1.95 |
| T67/T56 | 10.20 | (Y1R1 − Y1R2)/CT1 | 4.62 |
| f/f7 | −0.24 | N1 | 1.804 |
| f/R9 | 0.43 | V2/V7 | 2.38 |
| f123/f4567 | −1.71 | V6/V7 | 2.61 |

7th Embodiment

Figure 7A:
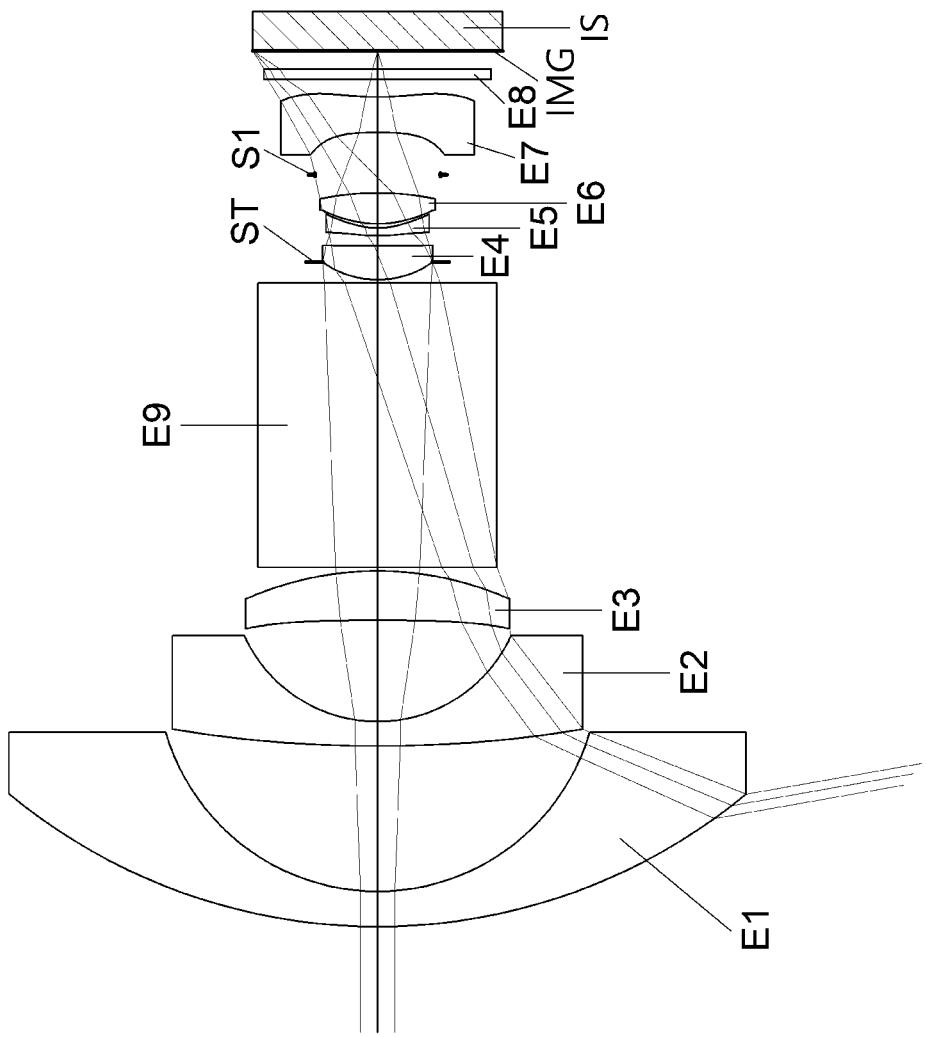
FIG. 7A is a schematic view of an imaging apparatus according to the 7th embodiment of the present disclosure.
Figure 7B:
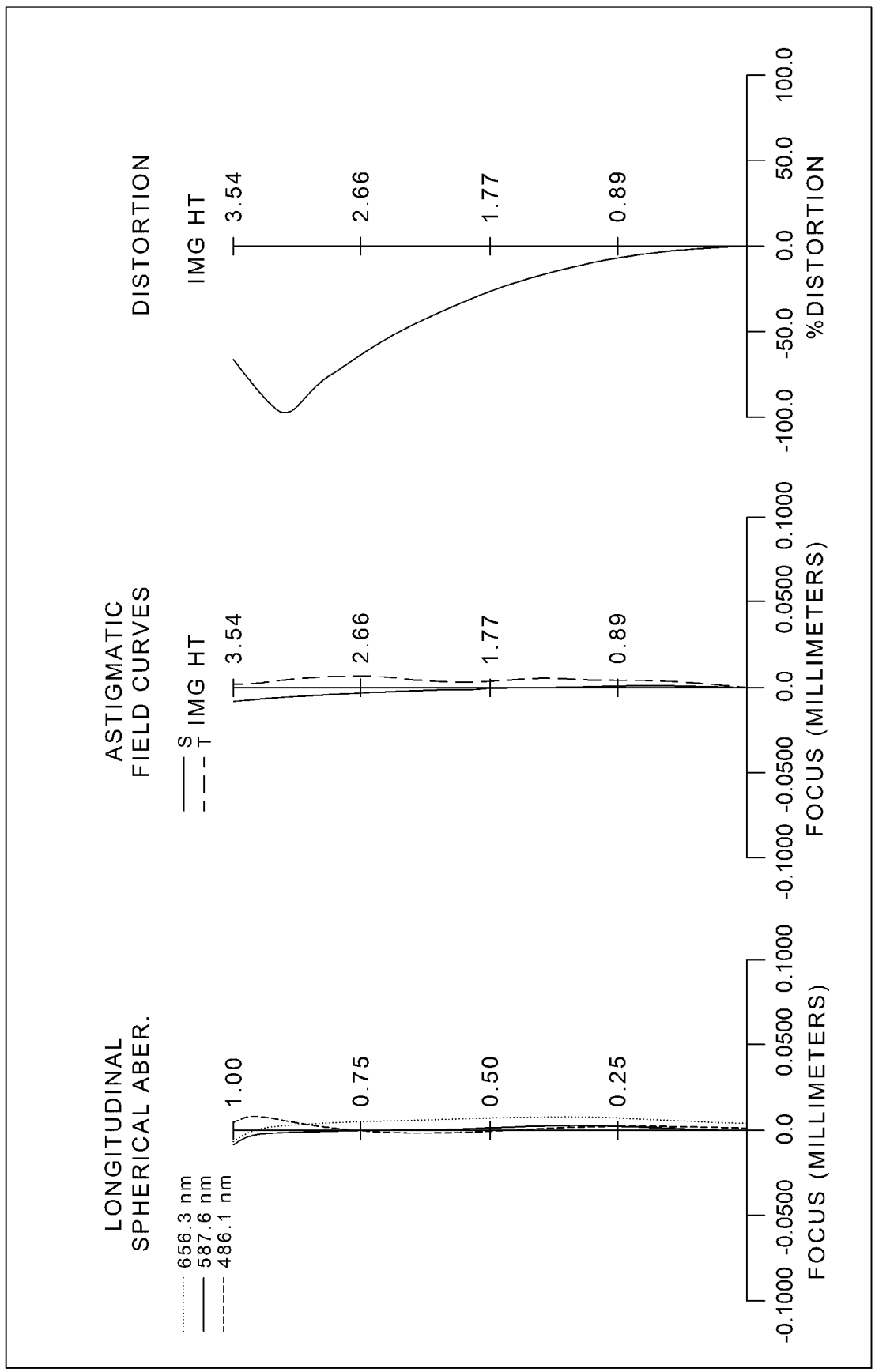
FIG. 7B shows longitudinal spherical aberration curves, astigmatic field curves and a distortion curve of the imaging apparatus according to the 7th embodiment.

FIG. 7A is a schematic view of an imaging apparatus 7 according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus 7 includes an image capturing system lens assembly of the present disclosure and an image sensor IS. The image capturing system lens assembly includes, in order from an object side to an image side along an optical path, a first lens element E1, a second lens element E2, a third lens element E3, a reflective element E9, an aperture stop ST, a fourth lens element E4, a fifth lens element E5, a sixth lens element E6, a stop S1, a seventh lens element E7, a filter E8, and an image surface IMG.

The first lens element E1 has negative refractive power and is made of glass material. The first lens element E1 has an object-side surface being convex in a paraxial region thereof, and an image-side surface being concave in a paraxial region thereof. Both the object-side surface and the image-side surface are spherical.

The second lens element E2 has negative refractive power and is made of glass material. The second lens element E2 has an object-side surface being convex in a paraxial region thereof, and an image-side surface being concave in a paraxial region thereof. Both the object-side surface and the image-side surface are spherical.

The third lens element E3 has positive refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being convex in a paraxial region thereof. Both the object-side surface and the image-side surface are aspheric.

The fifth lens element E5 has negative refractive power and is made of plastic material. The fifth lens element E5 has an object-side surface being convex in a paraxial region thereof, and an image-side surface being concave in a paraxial region thereof. Both the object-side surface and the image-side surface are aspheric.

The sixth lens element E6 has positive refractive power and is made of plastic material. The sixth lens element E6 has an object-side surface being convex in a paraxial region thereof, and an image-side surface being convex in a paraxial region thereof. Both the object-side surface and the image-side surface are aspheric.

The seventh lens element E7 has negative refractive power and is made of plastic material. The seventh lens element E7 has an object-side surface being concave in a paraxial region thereof, and an image-side surface being concave in a paraxial region thereof and convex in an off-axis region thereof. Both the object-side surface and the image-side surface are aspheric.

The filter E8 is disposed between the seventh lens element E7 and the image surface IMG. The filter E8 is made of glass material and does not affect the focal length of the image capturing system lens assembly. The reflective element E9, which is a prism, is disposed between the third lens element E3 and the aperture stop ST. The image sensor IS is disposed on or near the image surface IMG.

The detailed optical data of the 7th embodiment are shown in TABLE 7A, and the aspheric surface data are shown in TABLE 7B.

TABLE 7A (7th Embodiment)
f = 1.85 mm, Fno = 1.85, HFOV = 100.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 16.4090 (SPH) | 1.000 | Glass | 1.804 | 46.6 | −13.21 |
| 2 | | 6.2715 (SPH) | 4.137 | | | | |
| 3 | Lens 2 | 35.5390 (SPH) | 0.700 | Glass | 1.729 | 54.7 | −6.52 |
| 4 | | 4.1608 (SPH) | 2.873 | | | | |
| 5 | Lens 3 | −109.1432 (ASP) | 1.404 | Plastic | 1.614 | 25.6 | 16.18 |
| 6 | | −9.1429 (ASP) | 0.100 | | | | |
| 7 | Prism | Plano | 8.077 | Glass | 1.804 | 46.6 | — |
| 8 | | Plano | 0.599 | | | | |
| 9 | Ape. Stop | Plano | −0.497 | | | | |
| 10 | Lens 4 | 2.7662 (ASP) | 0.966 | Plastic | 1.544 | 56.0 | 4.76 |
| 11 | | −36.0995 (ASP) | 0.279 | | | | |
| 12 | Lens 5 | 4.4930 (ASP) | 0.220 | Plastic | 1.669 | 19.5 | −5.58 |
| 13 | | 1.9988 (ASP) | 0.120 | | | | |
| 14 | Lens 6 | 2.9187 (ASP) | 0.877 | Plastic | 1.544 | 56.0 | 4.15 |
| 15 | | −8.8822 (ASP) | 0.519 | | | | |
| 16 | Stop | Plano | 1.200 | | | | |
| 17 | Lens 7 | −14.5052 (ASP) | 1.006 | Plastic | 1.587 | 28.3 | −7.56 |
| 18 | | 6.5649 (ASP) | 0.500 | | | | |
| 19 | Filter | Plano | 0.300 | Glass | 1.517 | 64.2 | — |
| 20 | | Plano | 0.517 | | | | |
| 21 | Image Surface | Plano | — | | | | |

Remark: Reference wavelength is d-line 587.6 nm.
* The effective radius of the stop on Surface 16 is 1.783 mm.

TABLE 7B

Aspheric Coefficient

| Surface # | 5 | 6 | 10 | 11 |
|---|---|---|---|---|
| K= | 0.00000E+00 | 1.64410E+00 | −1.56064E−01 | 9.89999E+01 |
| A4= | −8.215928E−04 | 3.910284E−04 | 3.437411E−03 | 1.875920E−02 |
| A6= | −3.363377E−05 | −3.399410E−05 | 1.124424E−03 | −1.208208E−02 |
| A8= | 3.823184E−06 | 4.855592E−06 | −8.349833E−04 | 6.307817E−03 |
| A10= | 2.365583E−07 | 3.953207E−07 | 5.040991E−04 | −2.225928E−03 |
| A12= | −8.354685E−08 | −1.593223E−07 | −1.099144E−04 | 4.966422E−04 |
| A14= | 6.926078E−09 | 1.700951E−08 | 1.679475E−06 | −4.969450E−05 |
| A16= | −1.998235E−10 | −7.972584E−10 | 2.992153E−06 | 7.091591E−07 |
| A18= | | 1.359777E−11 | | |

| Surface # | 12 | 13 | 14 | 15 |
|---|---|---|---|---|
| K= | −1.16462E+01 | −1.67250E−01 | 0.00000E+00 | 0.00000E+00 |
| A4= | −3.186297E−02 | −7.990960E−02 | −2.006448E−02 | −3.898615E−03 |
| A6= | 1.075810E−02 | 3.903083E−02 | 1.301574E−02 | 2.073887E−04 |

TABLE 7B-continued

| Aspheric Coefficient | | | | |
|---|---|---|---|---|
| A8= | −1.205607E−02 | −3.452452E−02 | −1.418738E−02 | 1.614821E−03 |
| A10= | 1.143127E−02 | 2.446985E−02 | 8.685801E−03 | −3.575251E−04 |
| A12= | −5.939267E−03 | −9.516006E−03 | −2.008169E−03 | −2.401585E−03 |
| A14= | 1.605405E−03 | 1.326607E−03 | −2.954399E−04 | 3.444040E−03 |
| A16= | −1.779283E−04 | 2.453543E−04 | 2.122782E−04 | −2.231303E−03 |
| A18= | | −8.862080E−05 | −2.538101E−05 | 7.936262E−04 |
| A20= | | 5.475187E−06 | | −1.522981E−04 |
| A22= | | | | 1.252010E−05 |

| Surface # | 17 | 18 |
|---|---|---|
| K= | 0.00000E+00 | 0.00000E+00 |
| A4= | −3.572648E−02 | −1.724397E−02 |
| A6= | 9.154149E−03 | −1.668341E−03 |
| A8= | −2.356060E−02 | 2.108079E−03 |
| A10= | 3.244489E−02 | −8.930643E−04 |
| A12= | −2.756702E−02 | 2.340978E−04 |
| A14= | 1.499935E−02 | −4.030026E−05 |
| A16= | −5.262838E−03 | 4.464840E−06 |
| A18= | 1.152482E−03 | −2.959913E−07 |
| A20= | −1.433403E−04 | 9.824031E−09 |
| A22= | 7.729121E−06 | −9.143854E−11 |

In the 7th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 7th embodiment, so an explanation in this regard will not be provided again.

Moreover, these parameters can be calculated from TABLE 7A and TABLE 7B and satisfy the conditions stated in TABLE 7C below.

TABLE 7C

| f [mm] | 1.85 | f4/T67 | 2.77 |
|---|---|---|---|
| Fno | 1.85 | ATmax1/f | 4.48 |
| HFOV [deg.] | 100.0 | ATmax1/ATmax2 | 2.00 |
| ImgH [mm] | 3.54 | (R4 + R10)/T67 | 3.58 |
| TL/f | 13.48 | (R9 + R10)/(R9 − R10) | 2.60 |
| TLR/TL | 0.57 | SAG7R1/CT7 | −0.63 |
| T34/CT3 | 5.90 | Y1R1/Y5R2 | 7.14 |
| T34/TD | 0.35 | Y7R2/Y4R1 | 1.76 |
| T67/T56 | 14.33 | (Y1R1 − Y1R2)/CT1 | 4.44 |
| f/f7 | −0.24 | N1 | 1.804 |
| f/R9 | 0.41 | V2/V7 | 1.93 |
| f123/f4567 | −1.83 | V6/V7 | 1.98 |

8th Embodiment

Figure 8A:
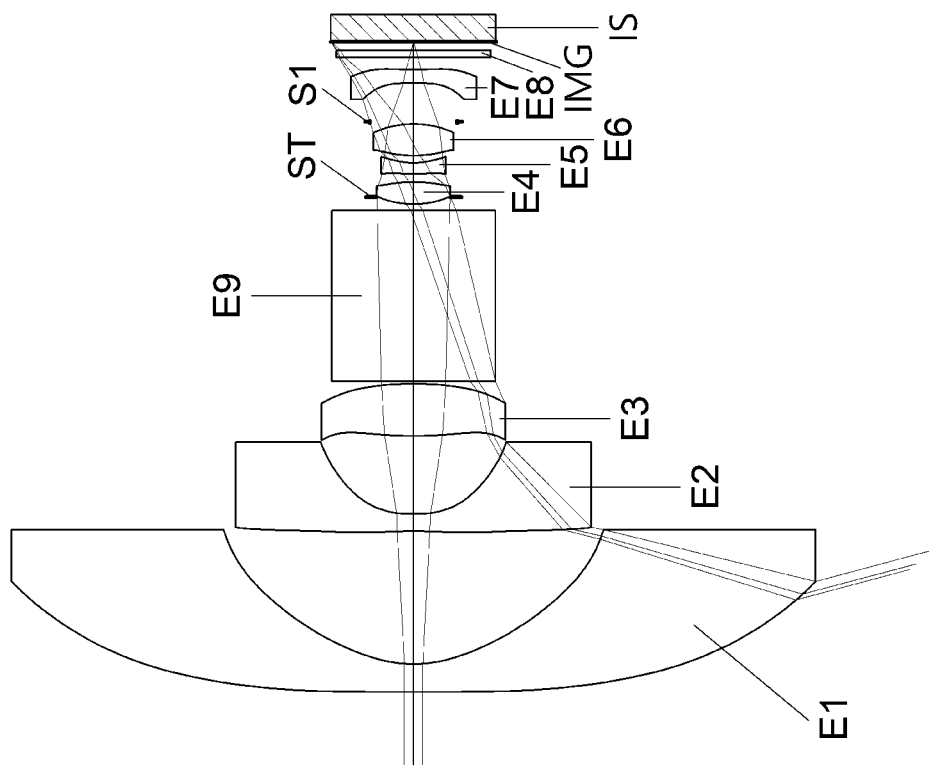
FIG. 8A is a schematic view of an imaging apparatus according to the 8th embodiment of the present disclosure.
Figure 8B:
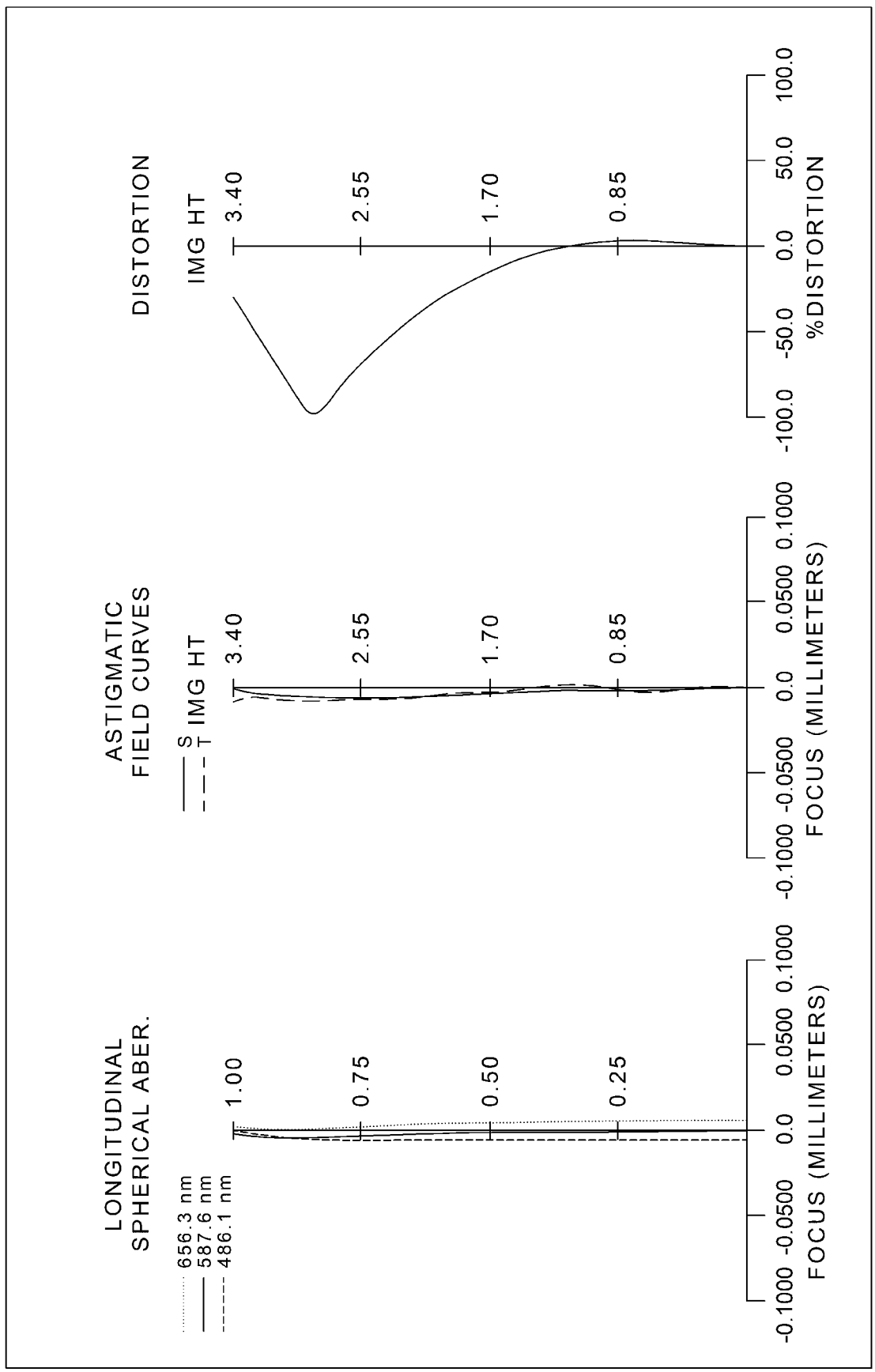
FIG. 8B shows longitudinal spherical aberration curves, astigmatic field curves and a distortion curve of the imaging apparatus according to the 8th embodiment.

FIG. 8A is a schematic view of an imaging apparatus 8 according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus 8 includes an image capturing system lens assembly of the present disclosure and an image sensor IS. The image capturing system lens assembly includes, in order from an object side to an image side along an optical path, a first lens element E1, a second lens element E2, a third lens element E3, a reflective element E9, an aperture stop ST, a fourth lens element E4, a fifth lens element E5, a sixth lens element E6, a stop S1, a seventh lens element E7, a filter E8, and an image surface IMG.

The first lens element E1 has negative refractive power and is made of glass material. The first lens element E1 has an object-side surface being concave in a paraxial region thereof, and an image-side surface being concave in a paraxial region thereof. Both the object-side surface and the image-side surface are aspheric.

The second lens element E2 has negative refractive power and is made of plastic material. The second lens element E2 has an object-side surface being concave in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being convex in a paraxial region thereof. Both the object-side surface and the image-side surface are aspheric.

The fifth lens element E5 has negative refractive power and is made of plastic material. The fifth lens element E5 has an object-side surface being convex in a paraxial region thereof, and an image-side surface being concave in a paraxial region thereof. Both the object-side surface and the image-side surface are aspheric.

The sixth lens element E6 has positive refractive power and is made of plastic material. The sixth lens element E6 has an object-side surface being convex in a paraxial region thereof, and an image-side surface being convex in a paraxial region thereof. Both the object-side surface and the image-side surface are aspheric.

The seventh lens element E7 has negative refractive power and is made of plastic material. The seventh lens element E7 has an object-side surface being concave in a paraxial region thereof, and an image-side surface being concave in a paraxial region thereof and convex in an off-axis region thereof. Both the object-side surface and the image-side surface are aspheric.

The filter E8 is disposed between the seventh lens element E7 and the image surface IMG. The filter E8 is made of glass material and does not affect the focal length of the image capturing system lens assembly. The reflective element E9, which is a prism, is disposed between the third lens element E3 and the aperture stop ST. The image sensor IS is disposed on or near the image surface IMG.

The detailed optical data of the 8th embodiment are shown in TABLE 8A, and the aspheric surface data are shown in TABLE 8B.

TABLE 8A (8th Embodiment)
f = 1.30 mm, Fno = 1.70, HFOV = 104.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −8264.4628 (ASP) | 1.150 | Glass | 1.697 | 48.5 | −7.18 |
| 2 | | 5.0094 (ASP) | 5.478 | | | | |
| 3 | Lens 2 | −17.5617 (ASP) | 0.700 | Plastic | 1.544 | 56.0 | −7.63 |
| 4 | | 5.5134 (ASP) | 3.221 | | | | |
| 5 | Lens 3 | 15.5259 (ASP) | 2.151 | Plastic | 1.639 | 23.5 | 12.03 |
| 6 | | −14.3857 (ASP) | 0.100 | | | | |
| 7 | Prism | Plano | 7.050 | Glass | 1.804 | 46.6 | — |
| 8 | | Plano | 0.558 | | | | |
| 9 | Ape. Stop | Plano | −0.298 | | | | |
| 10 | Lens 4 | 3.8465 (ASP) | 0.907 | Plastic | 1.544 | 56.0 | 4.37 |
| 11 | | −5.7025 (ASP) | 0.340 | | | | |
| 12 | Lens 5 | 9.9169 (ASP) | 0.450 | Plastic | 1.680 | 18.2 | −5.18 |
| 13 | | 2.5518 (ASP) | 0.300 | | | | |
| 14 | Lens 6 | 4.5941 (ASP) | 1.300 | Plastic | 1.530 | 55.8 | 4.45 |
| 15 | | −4.3669 (ASP) | 0.100 | | | | |
| 16 | Stop | Plano | 1.600 | | | | |
| 17 | Lens 7 | −12.3027 (ASP) | 0.550 | Plastic | 1.656 | 21.3 | −13.23 |
| 18 | | 29.9930 (ASP) | 0.500 | | | | |
| 19 | Filter | Plano | 0.300 | Glass | 1.517 | 64.2 | — |
| 20 | | Plano | 0.345 | | | | |
| 21 | Image Surface | Plano | — | | | | |

Remark: Reference wavelength is d-line 587.6 nm.
* The effective radius of the stop on Surface 16 is 1.799 mm.

TABLE 8B

Aspheric Coefficient

| Surface # | 1 | 2 | 3 | 4 | 5 |
|---|---|---|---|---|---|
| K= | −1.00000E+00 | −1.33314E+00 | 0.00000E+00 | 0.00000E+00 | 0.00000E+00 |
| A4= | 1.318310E+01 | −1.748393E−03 | 4.977381E−03 | 1.149561E−02 | −1.802369E−04 |
| A6= | −3.797270E+01 | 8.685420E−05 | −3.601085E−04 | −7.448412E−04 | −3.862860E−04 |
| A8= | 7.467903E+01 | −2.384278E−06 | 1.464131E−05 | 7.208969E−05 | 5.718987E−05 |
| A10= | −7.858465E+01 | 4.388413E−08 | −3.634570E−07 | −9.369239E−06 | −1.068842E−05 |
| A12= | 4.179131E+01 | −5.181332E−10 | 5.708275E−09 | 8.026207E−07 | 1.268710E−06 |
| A14= | −8.688750E+00 | 3.093081E−12 | −5.617117E−11 | −3.762256E−08 | −9.187869E−08 |
| A16= | | | 3.221816E−13 | 8.629615E−10 | 3.689972E−09 |
| A18= | | | −8.379682E−16 | | −6.133779E−11 |

| Surface # | 6 | 10 | 11 | 12 | 13 |
|---|---|---|---|---|---|
| K= | 8.97975E+00 | −9.62277E−01 | 1.54974E+00 | −6.21022E+01 | 0.00000E+00 |
| A4= | 3.742392E−05 | 3.559521E−03 | 9.381987E−03 | −3.460639E−02 | −5.568691E−02 |
| A6= | −1.798088E−04 | 1.658897E−04 | −1.031964E−03 | 8.169773E−03 | 1.404123E−02 |
| A8= | 9.599751E−06 | 1.011195E−04 | 3.364217E−04 | −7.338017E−04 | −1.306853E−03 |
| A10= | 8.865886E−07 | 2.078056E−05 | −4.647596E−05 | −7.743525E−04 | −2.156553E−03 |
| A12= | −2.372298E−07 | | 2.333050E−06 | 2.562088E−04 | 1.551313E−03 |
| A14= | 2.304885E−08 | | | −1.805483E−05 | −5.884509E−04 |
| A16= | −1.087550E−09 | | | −3.035794E−06 | 1.313158E−04 |
| A18= | 2.164771E−11 | | | | −1.503177E−05 |
| A20= | | | | | 5.731734E−07 |

| Surface # | 14 | 15 | 17 | 18 |
|---|---|---|---|---|
| K= | 0.00000E+00 | 0.00000E+00 | 0.00000E+00 | 0.00000E+00 |
| A4= | −3.728993E−03 | −3.114315E−03 | −1.250683E−02 | 2.199233E−02 |
| A6= | −2.391132E−03 | −4.931000E−04 | −2.461958E−02 | −3.529772E−02 |
| A8= | 2.122541E−03 | −5.929000E−04 | 1.888166E−02 | 2.021524E−02 |
| A10= | −1.461060E−03 | 7.947089E−04 | −9.068071E−03 | −7.316436E−03 |
| A12= | 7.365868E−04 | −4.951687E−04 | 2.768482E−03 | 1.727922E−03 |

TABLE 8B-continued

| Aspheric Coefficient | | | | |
|---|---|---|---|---|
| A14= | −2.437273E−04 | 1.772051E−04 | −5.171610E−04 | −2.641754E−04 |
| A16= | 4.480992E−05 | −3.437520E−05 | 5.453172E−05 | 2.516254E−05 |
| A18= | −3.265135E−06 | 2.873241E−06 | −2.479435E−06 | −1.352974E−06 |
| A20= | | | | 3.126272E−08 |

In the 8th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 8th embodiment, so an explanation in this regard will not be provided again.

Moreover, these parameters can be calculated from TABLE 8A and TABLE 8B and satisfy the conditions stated in TABLE 8C below.

TABLE 8C

| f [mm] | 1.30 | f4/T67 | 2.57 |
|---|---|---|---|
| Fno | 1.70 | ATmax1/f | 5.72 |
| HFOV [deg.] | 104.9 | ATmax1/ATmax2 | 1.35 |
| ImgH [mm] | 3.40 | (R4 + R10)/T67 | 4.74 |
| TL/f | 20.68 | (R9 + R10)/(R9 − R10) | 1.69 |
| TLR/TL | 0.61 | SAG7R1/CT7 | −1.24 |
| T34/CT3 | 3.44 | Y1R1/Y5R2 | 12.45 |
| T34/TD | 0.29 | Y7R2/Y4R1 | 1.71 |
| T67/T56 | 5.67 | (Y1R1 − Y1R2)/CT1 | 7.59 |
| f/f7 | −0.10 | N1 | 1.697 |
| f/R9 | 0.13 | V2/V7 | 2.63 |
| f123/f4567 | −2.29 | V6/V7 | 2.62 |

9th Embodiment

Figure 12:
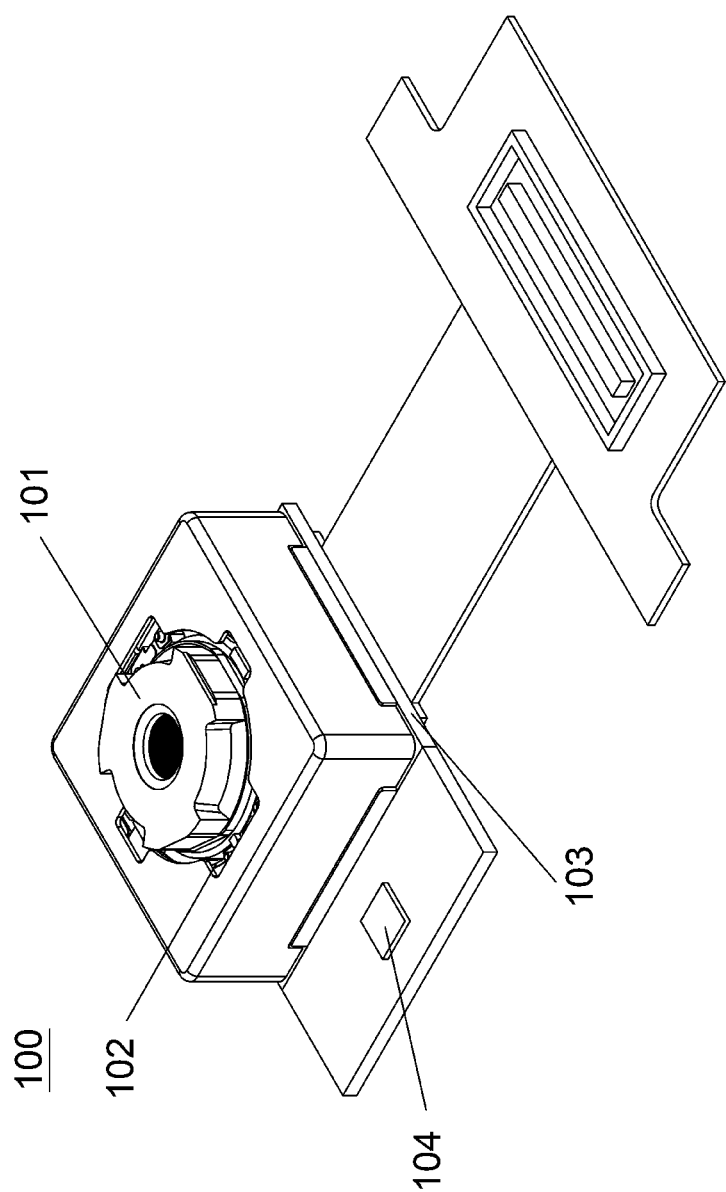
FIG. 12 is a 3-dimensional schematic view of an imaging apparatus according to the 1st embodiment of the present disclosure.

Please refer to FIG. 12. FIG. 12 is a 3-dimensional schematic view of an imaging apparatus 100 according to the 9th embodiment of the present disclosure. In the present embodiment, the imaging apparatus 100 is a camera module. The imaging apparatus 100 includes a photographing optical lens system 101, a driving device 102, and an image sensor 103. The photographing optical lens system 101 includes the image capturing system lens assembly of the 1st embodiment described above and a lens barrel (not otherwise herein labeled) for carrying the image capturing system lens assembly. The imaging apparatus 100 obtains an image from light convergence in the photographing optical lens system 101, and focusing by the driving device 102 so as to form the image on the image sensor 103 (the image sensor IS in the 1st embodiment), and outputs the image data thereafter.

The driving device 102 may be an auto-focus module that can be driven by a voice coil motor (VCM), a micro electro-mechanical system (MEMS), a piezoelectric system, shape memory alloys or other driving systems. The driving device 102 allows the photographing optical lens system 101 to obtain a better imaging position so as to obtain a clear image at different object distances.

The imaging apparatus 100 may be equipped with an image sensor 103 (e.g., CMOS, CCD) with high sensitivity and low noise on the image surface to provide accurate and satisfactory image quality from the photographing optical lens system 101.

In addition, the imaging apparatus 100 may further include an image stabilizer 104, which may be a motion sensing element such as an accelerometer, a gyro sensor or a Hall Effect sensor. The image stabilizer 104 in the 9th embodiment is a gyro sensor but is not limited thereto. By adjusting the photographing optical lens system 101 in different axial directions to provide compensation for image blurs due to motion during exposures, the image quality under dynamic and low-light circumstances can be further improved, and enhanced image compensation functions such as optical image stabilization (OIS) or electronic image stabilization (EIS) can also be provided.

The imaging apparatus 100 of the present disclosure is not limited to being applied to smartphones. The imaging apparatus 100 may be used in focus adjusting systems depending on the needs, while it features excellent aberration correction and provides satisfactory image quality. For example, the imaging apparatus 100 may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual reality, motion devices, home intelligent auxiliary systems and other electronic devices.

10th Embodiment

Figure 13A:
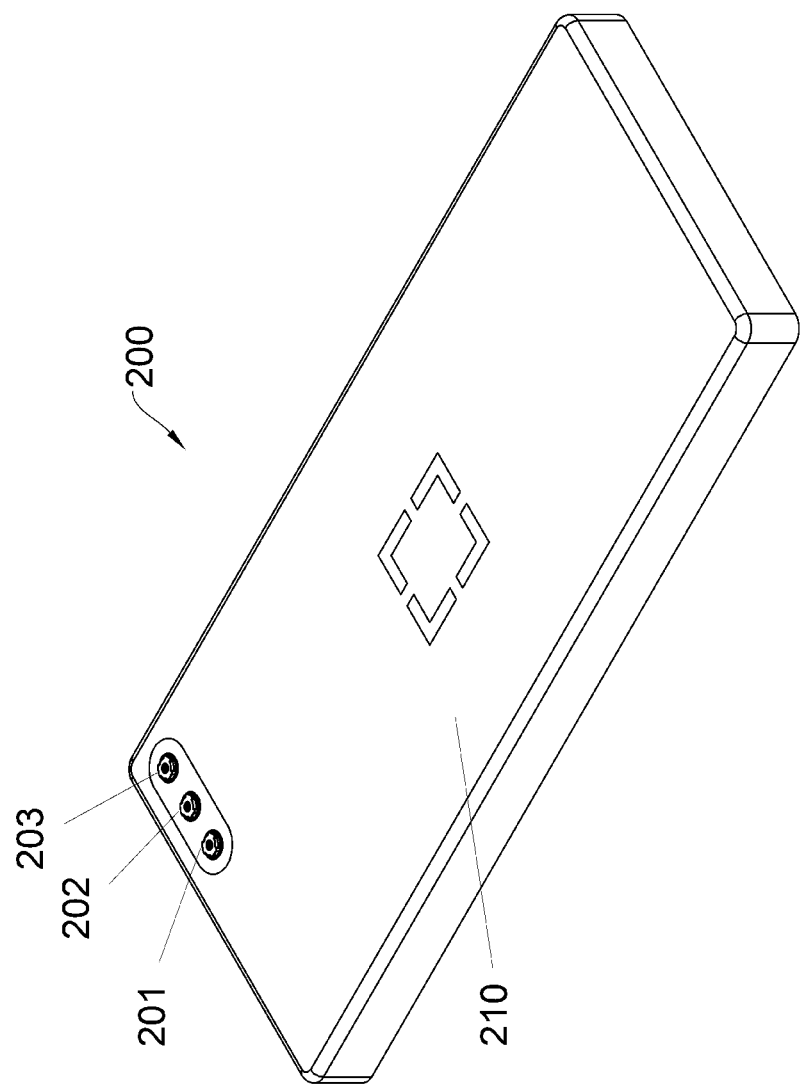
FIG. 13A is a front view of an electronic device according to the 9th embodiment of the present disclosure.
Figure 13B:
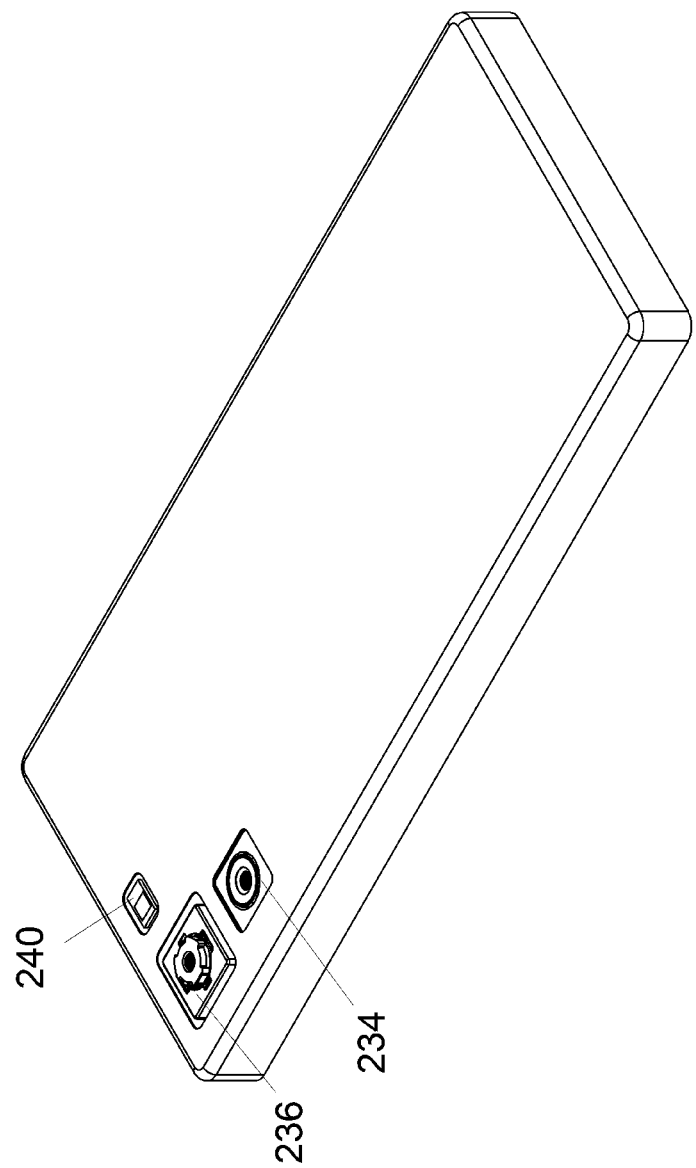
FIG. 13B is a rear view of the electronic device according to the 9th embodiment of the present disclosure.

Please refer to FIG. 13A and FIG. 13B. FIG. 13A is a front view of an electronic device 200 according to the 10th embodiment. FIG. 13B is a rear view of the electronic device 200 shown in FIG. 13A. In the present embodiment, the electronic device 200 is a smartphone. As shown in FIG. 13A, the electronic device 200 includes a display 210, a TOF (Time of Flight) module 201, an imaging apparatus 202, and an imaging apparatus 203 on the front side of the electronic device 200. The imaging apparatus 202 and the imaging apparatus 203 are located above the display 210, facing the same direction and arranged horizontally on the upper edge of electronic device 200. The imaging apparatus 202 is an ultra-wide angle configuration, and the imaging apparatus 203 is a wide-angle configuration. The field of view of the imaging apparatus 202 is larger than that of the imaging apparatus 203 by at least 30 degrees.

As shown in FIG. 13B, the electronic device 200 includes a flash module 240, an imaging apparatus 234 and an imaging apparatus 236 on the back side of the electronic device 200. The imaging apparatus 234 and the imaging apparatus 236 face the same direction, and are vertically arranged on the upper edge of the back side of the electronic device 200. The imaging apparatus 234 is an ultra-wide angle configuration, and the imaging apparatus 236 is a wide-angle configuration utilizing the image capturing system lens assembly of the present disclosure. The field of view of the imaging apparatus 234 is larger than that of the imaging apparatus 236 by at least 20 degrees.

11th Embodiment

Figure 14:
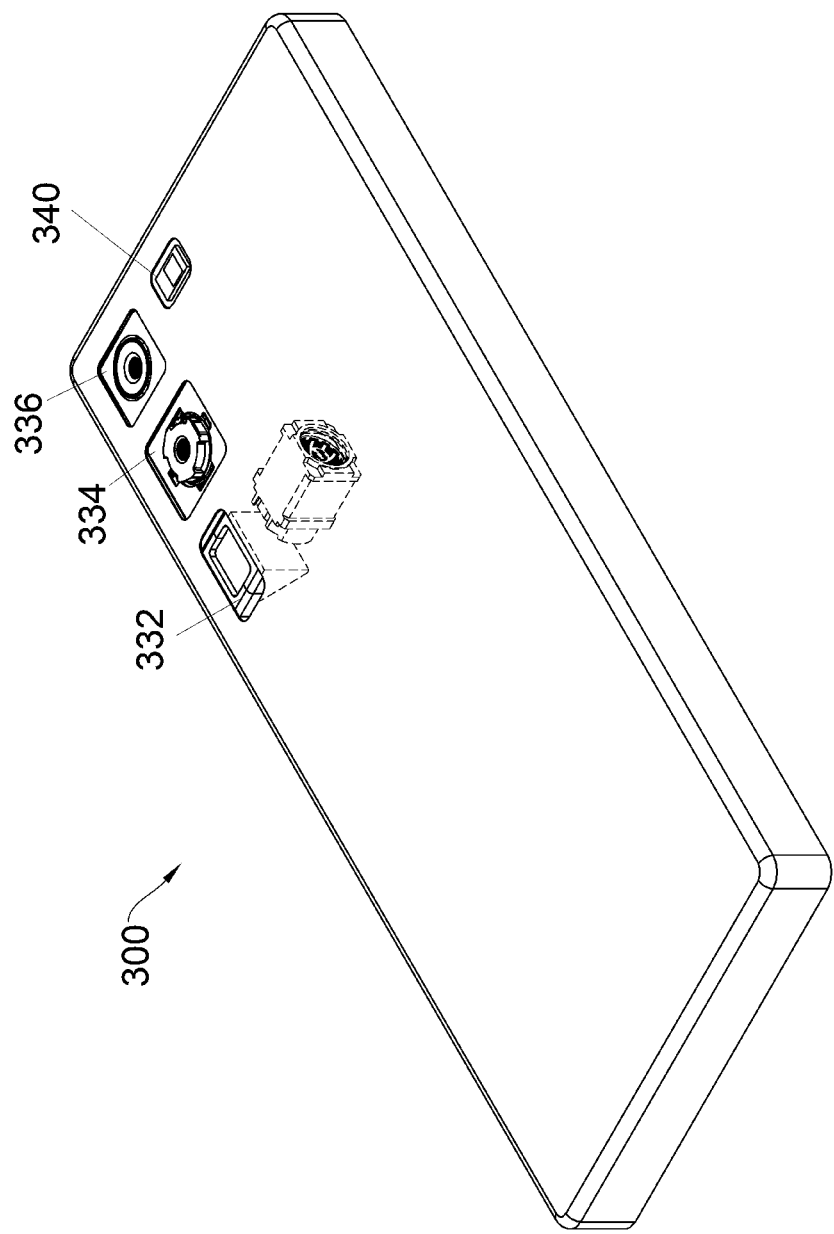
FIG. 14 is a rear view of an electronic device according to the 10th embodiment of the present disclosure.

Please refer to FIG. 14. FIG. 14 is a rear view of an electronic device 300 according to the 11th embodiment. As shown in FIG. 14, the electronic device 300 includes a flash module 340, an imaging apparatus 332, an imaging apparatus 334, and an imaging apparatus 336 on the back side of the electronic device 300. The imaging apparatus 332, the imaging apparatus 334, and the imaging apparatus 336 face the same direction, and are vertically arranged on the back side of the electronic device 300. The flash module 340 is disposed on the upper edge of the back side of the electronic device 300, at the proximity of the imaging apparatus 336. The imaging apparatus 336 is an ultra-wide angle configuration, and the imaging apparatus 334 is a wide-angle configuration utilizing the image capturing system lens assembly of the present disclosure, and the imaging apparatus 332 is a telephoto configuration. The field of view of the imaging apparatus 336 is larger than that of the imaging apparatus 334 by at least 20 degrees, and the field of view of the imaging apparatus 334 is larger than that of the imaging apparatus 332 by at least 20 degrees, so that for the imaging apparatuses disposed on the back side of the electronic device 300, the largest field of view with the imaging apparatus 336 is larger than the smallest field of view with the imaging apparatus 332 by at least 40 degrees.

12th Embodiment

Figure 15:
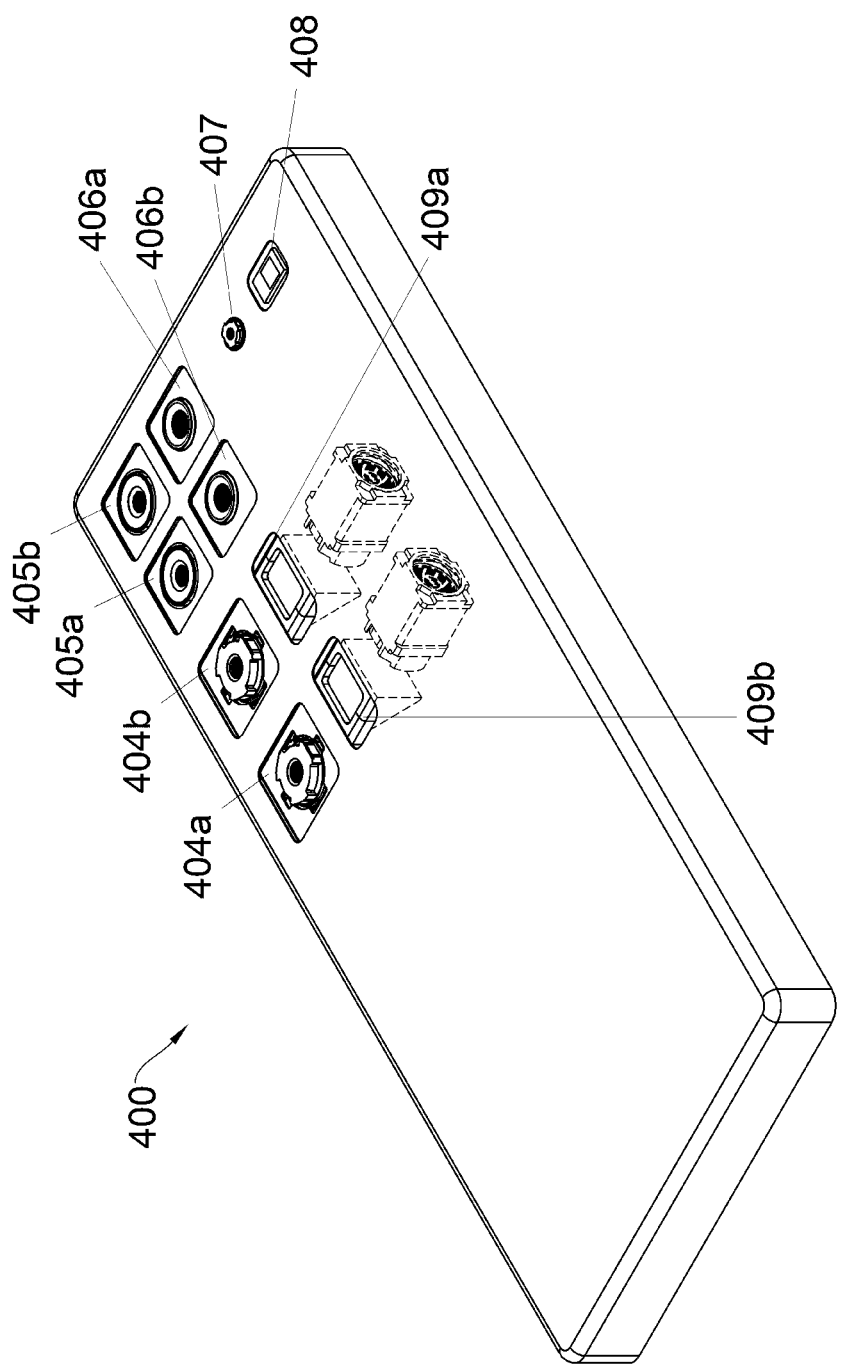
FIG. 15 is a rear view of an electronic device according to the 11th embodiment of the present disclosure.

Please refer to FIG. 15. FIG. 15 is a rear view of an electronic device 400 according to the 12th embodiment. As shown in FIG. 15, the electronic device 400 includes a TOF (Time of Flight) module 407, a flash module 408, an imaging apparatus 404a, an imaging apparatus 404b, an imaging apparatus 405a, an imaging apparatus 405b, an imaging apparatus 406a, an imaging apparatus 406b, an imaging apparatus 409a, and an imaging apparatus 409b on the back side of the electronic device 400. The imaging apparatus 404a, the imaging apparatus 404b, the imaging apparatus 405a, the imaging apparatus 405b, the imaging apparatus 406a, the imaging apparatus 406b, the imaging apparatus 409a, and the imaging apparatus 409b face the same direction, and are divided into two rows vertically arranged on the back side of the electronic device 400. The TOF (Time of Flight) module 407 and the flash module 408 are disposed on the upper edge of the back side of the electronic device 400, at the proximity of the imaging apparatus 406a. The imaging apparatuses 405a and 405b are ultra-wide angle configurations. The imaging apparatuses 404a and 404b are wide-angle configurations utilizing the image capturing system lens assembly of the present disclosure. The imaging apparatuses 406a and 406b are telephoto configurations. The imaging apparatuses 409a and 409b are telephoto configurations with folded optical paths. The fields of view of the imaging apparatuses 405a, 405b are larger than those of the imaging apparatuses 404a, 404b by at least 30 degrees. The fields of view of the imaging apparatuses 404a, 404b are larger than those of the imaging apparatuses 406a, 406b, 409a, and 409b by at least 30 degrees.

13th Embodiment

Figure 16A:
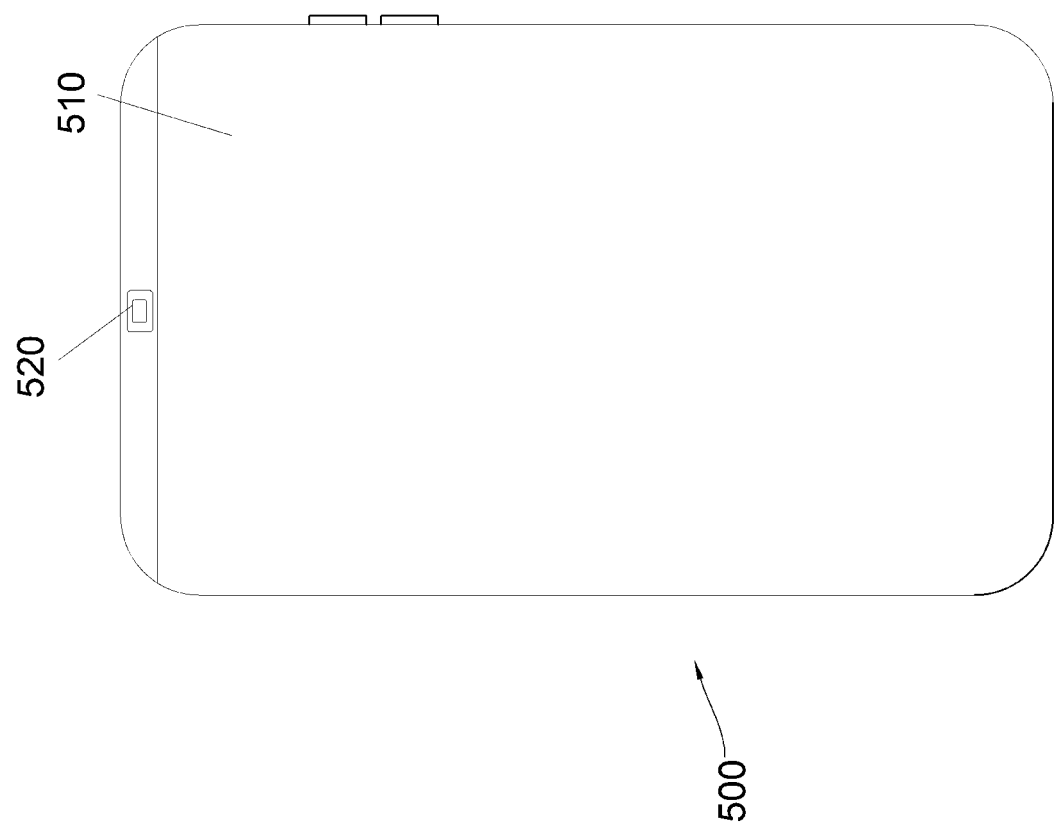
FIG. 16A is a front view of an electronic device according to the 12th embodiment of the present disclosure.
Figure 16B:
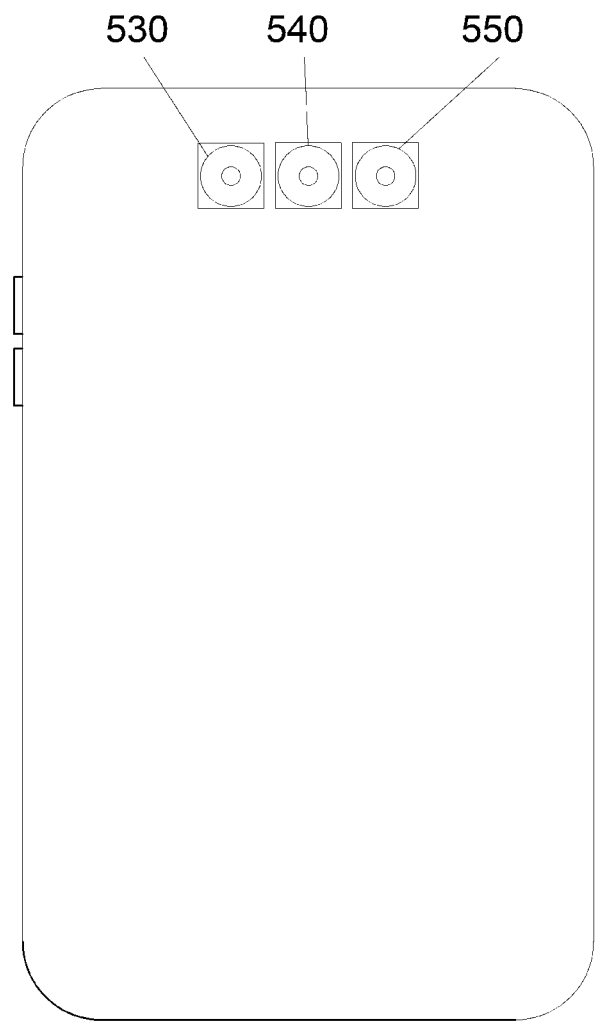
FIG. 16B is a rear view of the electronic device according to the 12th embodiment of the present disclosure.

Please refer to FIG. 16A and FIG. 16B. FIG. 16A is a front view of an electronic device 500 according to the 13th embodiment. FIG. 16B is a rear view of the electronic device 500 shown in FIG. 16A. In the present embodiment, the electronic device 500 is a smartphone.

As shown in FIG. 16A, the front of the electronic device 500 includes a display 510 and an imaging apparatus 520, wherein the imaging apparatus 520 utilizes the image capturing system lens assembly of the present disclosure. As shown in FIG. 16B, the back of the electronic device 500 includes a telephoto configuration 530, a wide-angle configuration 540, and an ultra-wide configuration 550.

14th Embodiment

Figure 17:
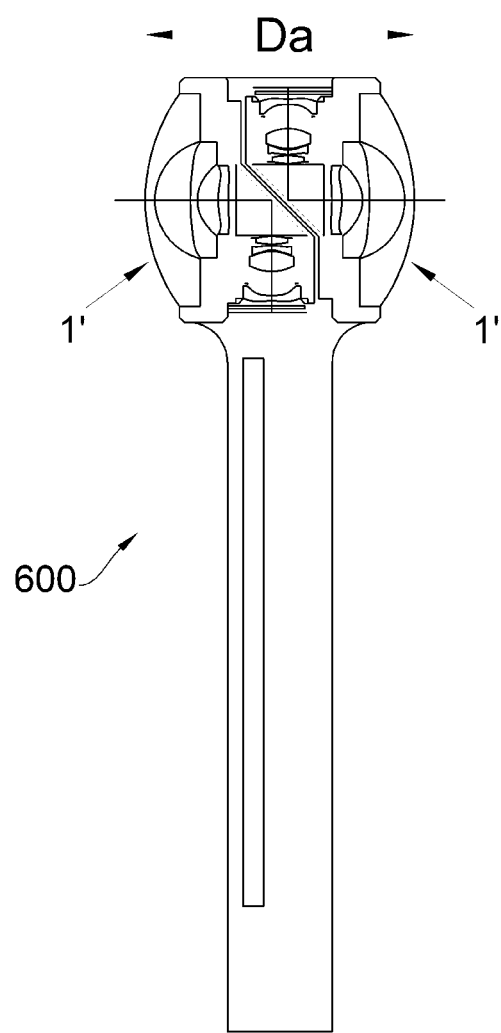
FIG. 17 is a schematic side sectional view of an electronic device according to the 13th embodiment of the present disclosure.

Please refer to FIG. 17, which is a schematic side sectional view of an electronic device 600 according to the 14th embodiment of the present disclosure. The electronic device 600 comprises two imaging apparatuses 1' arranged opposite to each other. This configuration is favorable for shooting 360-degree panoramic images and can be used for sports photography or daily life video recording, etc. The distance from the center of the object-side surface of the first lens element of one imaging apparatus 1' to the center of the object-side surface of the first lens element of the other imaging apparatus 1' is Da, and the following condition is satisfied: Da<40 [mm].

The aforementioned electronic devices are merely exemplary of practical use of the present disclosure and do not limit the scope of application of the imaging apparatus of the present disclosure. Preferably, an electronic device of the present disclosure can further include a control unit, a display unit, a storage unit, a random access memory unit (RAM) or a combination thereof.

The foregoing description, for purpose of explanation, has been described with reference to specific embodiments. It is to be noted that TABLES 1A-8C show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing system lens assembly comprising seven lens elements, the seven lens elements being, in order from an object side to an image side along an optical path: a first lens element, a second lens element, a third lens element, a fourth lens element, a fifth lens element, a sixth lens element and a seventh lens element, each of the first through seventh lens elements having an object-side surface facing the object side and an image-side surface facing the image side;

wherein the fifth lens element has negative refractive power, a focal length of the image capturing system lens assembly is f, a focal length of the seventh lens element is f7, an axial distance between the object-side surface of the first lens element and an image surface is TL, an axial distance between the third lens element and the fourth lens element is T34, an axial distance between the object-side surface of the first lens element and the image-side surface of the seventh lens element is TD, a curvature radius of the object-side surface of the fifth lens element is R9, and the following conditions are satisfied:

$$7.50 < TL/f < 23.00;$$
$$-2.50 < f/f7 < 0.16;$$
$$0.18 < T34/TD < 0.60; \text{ and}$$
$$-0.03 < f/R9 < 1.50.$$

2. The image capturing system lens assembly of claim 1, wherein the third lens element has positive refractive power, the object-side surface of the fourth lens element is convex in a paraxial region thereof, and the image-side surface of the seventh lens element is aspheric and convex in an off-axis region thereof.

3. The image capturing system lens assembly of claim 1, wherein a f-number of the image capturing system lens assembly is Fno, half of a maximum field of view of the image capturing system lens assembly is HFOV, and the following conditions are satisfied:

$$1.00 < Fno < 2.20; \text{ and}$$
$$65.0 \text{ degrees} < HFOV < 140.0 \text{ degrees}.$$

4. The image capturing system lens assembly of claim 1, wherein every two adjacent lens elements of the first through seventh lens elements have an air gap therebetween, a maximum of axial distances between every two adjacent lens elements of the first through seventh lens elements is ATmax1, a second maximum of axial distances between every two adjacent lens elements of the first through seventh lens elements is ATmax2, and the following condition is satisfied:

$$1.25 < AT\text{max}1/AT\text{max}2.$$

5. The image capturing system lens assembly of claim 1, wherein a maximum effective radius on the object-side surface of the first lens element is Y1R1, a maximum effective radius on the image-side surface of the fifth lens element is Y5R2, and the following condition is satisfied:

$$2.80 < Y1R1/Y5R2 < 20.00.$$

6. The image capturing system lens assembly of claim 1, wherein an Abbe number of the sixth lens element is V6, an Abbe number of the seventh lens element is V7, and the following condition is satisfied:

$$1.25 < V6/V7 < 4.00.$$

7. The image capturing system lens assembly of claim 1, wherein an axial distance between the fifth lens element and the sixth lens element is T56, an axial distance between the sixth lens element and the seventh lens element is T67, and the following condition is satisfied:

$$1.30 < T67/T56 < 30.00.$$

8. The image capturing system lens assembly of claim 1, wherein a maximum image height of the image capturing system lens assembly is ImgH, the axial distance between the object-side surface of the first lens element and the image surface is TL, the focal length of the image capturing system lens assembly is f, and the following conditions are satisfied:

$$2.70[\text{mm}] < ImgH < 7.00[\text{mm}]; \text{ and}$$
$$8.80 < TL/f < 22.00.$$

9. The image capturing system lens assembly of claim 1, wherein a displacement in parallel with the optical axis from an axial vertex on the object-side surface of the seventh lens element to a boundary of the optically effective area of the object-side surface of the seventh lens element is SAG71, a central thickness of the seventh lens element along the optical path is CT7, and the following condition is satisfied:

$$-6.00 < SAG71/CT7 < 0.01.$$

10. An imaging apparatus, comprising the image capturing system lens assembly of claim 1, a reflective element, and an image sensor.

11. The imaging apparatus of claim 10, wherein the axial distance between the object-side surface of the first lens element and the image surface is TL, an axial distance between the object-side surface of the first lens element and the reflective element is TLR, and the following condition is satisfied:

$$TLR/TL < 0.75.$$

12. An electronic device, comprising the imaging apparatus of claim 10.

13. An electronic device, comprising two imaging apparatuses of claim 10 arranged opposite to each other, wherein a distance from a center of the object-side surface of the first lens element of one imaging apparatus to a center of the object-side surface of the first lens element of the other imaging apparatus is Da, and the following condition is satisfied:

$$Da < 40[\text{mm}].$$

14. An image capturing system lens assembly comprising seven lens elements, the seven lens elements being, in order from an object side to an image side along an optical path: a first lens element, a second lens element, a third lens element, a fourth lens element, a fifth lens element, a sixth lens element and a seventh lens element, each of the first through seventh lens elements having an object-side surface facing the object side and an image-side surface facing the image side;

wherein the seventh lens element has negative refractive power, the image-side surface of the fifth lens element is concave in a paraxial region thereof, an axial distance between the object-side surface of the first lens element and an image surface is TL, a focal length of the image capturing system lens assembly is f, half of a maximum field of view of the image capturing system lens assembly is HFOV, a maximum of axial distances between every two adjacent lens elements of the first through seventh lens elements is ATmax1, a composite focal length of the first lens element, the second lens element and the third lens element is f123, a composite focal length of the fourth lens element, the fifth lens element, the sixth lens element and the seventh lens element is f4567, and the following conditions are satisfied:

$$8.80 < TL/f < 23.00;$$
$$80.0 \text{ degrees} < HFOV < 140.0 \text{ degrees};$$
$$2.30 < AT\text{max}1/f < 15.00; \text{ and}$$
$$-10.00 < f123/f4567 < 0.20.$$

15. The image capturing system lens assembly of claim 14, wherein the third lens element has positive refractive power, an axial distance between the third lens element and the fourth lens element is T34, a central thickness of the third lens element along the optical path is CT3, and the following condition is satisfied:

$$0.30 < T34/CT3 < 20.00.$$

16. The image capturing system lens assembly of claim 14, wherein a curvature radius of the object-side surface of the fifth lens element is R9, a curvature radius of the image-side surface of the fifth lens element is R10, and the following condition is satisfied:

$$0.90 < (R9 + R10)/(R9 - R10) < 5.00.$$

17. The image capturing system lens assembly of claim 14, wherein a f-number of the image capturing system lens assembly is Fno, and the following conditions are satisfied:

$$1.30 < Fno < 2.20.$$

18. The image capturing system lens assembly of claim 14, wherein a focal length of the fourth lens element is f4, an axial distance between the sixth lens element and the seventh lens element is T67, and the following condition is satisfied:

$$0.20 < f4/T67 < 20.00.$$

19. The image capturing system lens assembly of claim 14, wherein the first lens element is made of glass material, a refractive index of the first lens element is N1, and the following condition is satisfied:

$$1.680 < N1 < 2.500.$$

20. The image capturing system lens assembly of claim 14, wherein a maximum effective radius on the object-side surface of the fourth lens element is Y4R1, a maximum effective radius on the image-side surface of the seventh lens element is Y7R2, and the following condition is satisfied:

$$1.30 < Y7R2/Y4R1 < 4.50.$$

21. The image capturing system lens assembly of claim 14, further comprising a reflective element disposed between the first lens element and the seventh lens element.

22. The image capturing system lens assembly of claim 21, further comprising an aperture stop disposed between the reflective element and the image surface, wherein the aperture stop has a long axis and a short axis in different directions perpendicular to the optical axis, and an effective radius of the long axis is larger than an effective radius of the short axis.

23. An image capturing system lens assembly comprising seven lens elements, the seven lens elements being, in order from an object side to an image side along an optical path: a first lens element, a second lens element, a third lens element, a fourth lens element, a fifth lens element, a sixth lens element and a seventh lens element, each of the first through seventh lens elements having an object-side surface facing the object side and an image-side surface facing the image side:

wherein the second lens element has negative refractive power, the image-side surface of the fifth lens element is concave in a paraxial region thereof, an axial distance between the third lens element and the fourth lens element is the maximum axial distance between two adjacent lens elements, a reflective element is arranged between the third lens element and the fourth lens element, a focal length of the image capturing system lens assembly is f, a focal length of the seventh lens element is f7, an axial distance between the object-side surface of the first lens element and an image surface is TL, a maximum effective radius on the object-side surface of the fourth lens element is Y4R1, a maximum effective radius on the image-side surface of the seventh lens element is Y7R2, a f-number of the image capturing system lens assembly is Fno, and the following conditions are satisfied:

$$6.00 < TL/f < 28.00;$$
$$-3.00 < f/f7 < 0.22;$$
$$1.30 < Y7R2/Y4R1 < 4.50; \text{ and}$$
$$1.00 < Fno < 2.60.$$

24. The image capturing system lens assembly of claim 23, wherein the image-side surface of the second lens element is concave in a paraxial region thereof, the object-side surface of the fifth lens element is convex in a paraxial region thereof, and the image-side surface of the seventh lens element is convex in an off-axis region thereof.

25. The image capturing system lens assembly of claim 23, wherein every two adjacent lens elements of the first through seventh lens elements have an air gap therebetween, half of a maximum field of view of the image capturing system lens assembly is HFOV, and the following condition is satisfied:

$$55.0 \text{ degrees} < HFOV < 140.0 \text{ degrees}.$$

26. The image capturing system lens assembly of claim 23, wherein a curvature radius of the image-side surface of the second lens element is R4, a curvature radius of the image-side surface of the fifth lens element is R10, an axial distance between the sixth lens element and the seventh lens element is T67, and the following condition is satisfied:

$$1.00 < (R4 + R10)/T67 < 18.00.$$

27. The image capturing system lens assembly of claim 23, wherein the seventh lens element is made of plastic material, both of the object-side surface and the image-side surface of the seventh lens element are aspheric, an Abbe number of the second lens element is V2, an Abbe number of the seventh lens element is V7, and the following condition is satisfied:

$$1.10 < V2/V7 < 3.50.$$

28. The image capturing system lens assembly of claim 23, wherein a maximum effective radius on the object-side surface of the first lens element is Y1R1, a maximum effective radius on the image-side surface of the first lens element is Y1R2, a central thickness of the first lens element along the optical path is CT1, and the following condition is satisfied:

$$2.50 < (Y1R1 - Y1R2)/CT1 < 15.00.$$

* * * * *